US010913808B2

(12) United States Patent
Holtcamp et al.

(10) Patent No.: US 10,913,808 B2
(45) Date of Patent: Feb. 9, 2021

(54) MIXED CATALYSTS WITH UNBRIDGED HAFNOCENES WITH -CH2-SIME3 MOIETIES

(71) Applicant: ExxonMobil Chemical Patents Inc., Baytown, TX (US)

(72) Inventors: Matthew W. Holtcamp, Huffman, TX (US); Laughlin G. McCullough, League City, TX (US); Matthew S. Bedoya, Humble, TX (US); David F. Sanders, Beaumont, TX (US); Charles J. Harlan, Houston, TX (US); Ching-Tai Lue, Sugarland, TX (US); Subramaniam Kuppuswamy, Mont Belvieu, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 40 days.

(21) Appl. No.: 16/016,060

(22) Filed: Jun. 22, 2018

(65) Prior Publication Data

US 2019/0040167 A1 Feb. 7, 2019

Related U.S. Application Data

(60) Provisional application No. 62/541,372, filed on Aug. 4, 2017.

(51) Int. Cl.
*C08F 210/16* (2006.01)
*C08F 4/659* (2006.01)
*C08F 4/6592* (2006.01)

(52) U.S. Cl.
CPC ........ *C08F 210/16* (2013.01); *C08F 4/65908* (2013.01); *C08F 4/65912* (2013.01); *C08F 4/65916* (2013.01); *C08F 4/65925* (2013.01)

(58) Field of Classification Search
None
See application file for complete search history.

(56) References Cited

U.S. PATENT DOCUMENTS

| | | | |
|---|---|---|---|
| 4,701,432 A | 10/1987 | Welborn, Jr. | |
| 5,032,562 A | 7/1991 | Lo et al. | |
| 5,077,255 A | 12/1991 | Welborn, Jr. | |
| 5,135,526 A | 8/1992 | Zinnanti et al. | |
| 5,183,867 A | 2/1993 | Welborn, Jr. | |
| 5,382,630 A | 1/1995 | Stehling et al. | |
| 5,382,631 A | 1/1995 | Stehling et al. | |
| 5,516,848 A | 5/1996 | Canich et al. | |
| 5,525,678 A | 6/1996 | Mink et al. | |
| 6,069,213 A | 5/2000 | Nemzek et al. | |
| 6,207,606 B1 | 3/2001 | Lue et al. | |
| 6,380,311 B1 | 4/2002 | Razavi et al. | |
| 6,410,659 B1 | 6/2002 | Maddox et al. | |
| 6,537,943 B1 | 3/2003 | Fritze et al. | C08F 10/00 |
| 6,656,866 B2 | 12/2003 | Wenzel et al. | |
| 6,828,394 B2 | 12/2004 | Vaughan et al. | |
| 6,861,485 B2 | 3/2005 | Wang | |
| 6,956,094 B2 | 10/2005 | Mawson et al. | |
| 6,964,937 B2 | 11/2005 | Mink et al. | |
| 6,995,109 B2 | 2/2006 | Mink et al. | |
| 7,041,617 B2 | 5/2006 | Jensen et al. | |
| 7,119,153 B2 | 10/2006 | Jensen et al. | |
| 7,129,302 B2 | 10/2006 | Mink et al. | |
| 7,141,632 B2 | 11/2006 | Vaughan et al. | |
| 7,172,987 B2 | 2/2007 | Kao et al. | |
| 7,179,876 B2 | 2/2007 | Szul et al. | |
| 7,192,902 B2 | 3/2007 | Brinen et al. | |
| 7,199,072 B2 | 4/2007 | Crowther et al. | |
| 7,199,073 B2 | 4/2007 | Martin et al. | |
| 7,226,886 B2 | 6/2007 | Jayaratne et al. | |
| 7,285,608 B2 | 10/2007 | Schottek et al. | |
| 7,312,283 B2 | 12/2007 | Martin et al. | |
| 7,355,058 B2 | 4/2008 | Luo et al. | |
| 7,385,015 B2 | 6/2008 | Holtcamp | |
| 7,396,888 B2 | 7/2008 | Razavi | |
| 7,547,754 B2 | 6/2009 | McDaniel et al. | |
| 7,572,875 B2 | 8/2009 | Jensen et al. | |
| 7,595,364 B2 | 9/2009 | Shannon et al. | |
| 7,619,047 B2 | 11/2009 | Yang et al. | |
| 7,625,982 B2 | 12/2009 | Martin et al. | |
| 7,662,894 B2 | 2/2010 | Hamed et al. | |
| 7,829,495 B2 | 11/2010 | Floyd et al. | |
| 7,855,253 B2 | 12/2010 | Shannon et al. | |
| 8,088,867 B2 | 1/2012 | Jiang et al. | |

(Continued)

FOREIGN PATENT DOCUMENTS

| | | |
|---|---|---|
| EP | 0705851 | 4/1996 |
| EP | 0729387 | 9/1996 |

(Continued)

OTHER PUBLICATIONS

Stadelhofer et al., "Darstellung und eigenshaften von alkylmetallcyclopentadienderivaten des aluminums, galliums und indiums," J. Organomet. Chem. 1975, vol. 84, No. 1, pp. C1-C4.

Sheu, "Enhanced bimodal PE makes the impossible possible", 2006, TAPPI Conference, Shanghai, China, http://www.tappi.org/content/06asiaplace/pdfs-english/enhanced.pdf.

Iedema et al., "Predicting the Molecular Weight Distribution of Polyethylene for Mixed Systems with a Constrained-Geometry Metallocene Catalyst in a Semibatch Reactor," Ind. Eng. Chem. Res., 2004, vol. 43, No. 1, pp. 36-50.

Kim et al., "Copolymerization of Ethylene and α-Olefins with Combined Metallocene Catalysts. III. Production of Polyolefins with Controlled Microstructures," Journal of Polymer Science Part A: Polymer Chemistry, 2000, vol. 38, pp. 1427-1432.

Calhoun, et al., Chapter 5: Molecular Characterization of Polymers, Polymer Chemistry, pp. 77-87.

(Continued)

*Primary Examiner* — Yun Qian

(57) ABSTRACT

The present disclosure provides a supported catalyst system and process for use thereof. In particular, the catalyst system includes an unbridged metallocene compound, an additional unbridged metallocene compound having a structure different than the first unbridged metallocene compound, a support material and an activator. The catalyst system may be used for preparing polyolefins.

27 Claims, No Drawings

(56) References Cited

U.S. PATENT DOCUMENTS

| | | | |
|---|---|---|---|
| 8,110,518 | B2 | 2/2012 | Marin et al. |
| 8,138,113 | B2 | 3/2012 | Yang et al. |
| 8,268,944 | B2 | 9/2012 | Yang et al. |
| 8,288,487 | B2 | 10/2012 | Yang et al. |
| 8,329,834 | B2 | 12/2012 | Masino et al. |
| 8,378,029 | B2 | 2/2013 | Liu et al. |
| 8,383,754 | B2 | 2/2013 | Yang et al. |
| 8,575,284 | B2 | 11/2013 | Luo et al. |
| 8,598,061 | B2 | 12/2013 | Yang et al. |
| 8,680,218 | B1 | 3/2014 | Yang et al. |
| 8,785,551 | B2 | 7/2014 | Arriola et al. |
| 8,815,357 | B1 | 8/2014 | Inn et al. |
| 8,846,841 | B2 | 9/2014 | Yang et al. |
| 8,940,842 | B2 | 1/2015 | Yang et al. |
| 8,957,167 | B2 | 2/2015 | Hussein et al. |
| 8,957,168 | B1 | 2/2015 | Yang et al. |
| 9,006,367 | B2 | 4/2015 | McDaniel et al. |
| 9,079,993 | B1 | 7/2015 | St. Jean et al. |
| 9,096,745 | B2 | 8/2015 | Lam et al. |
| 9,163,098 | B2 | 10/2015 | Mcdaniel et al. |
| 9,181,370 | B2 | 11/2015 | Sukhadia et al. |
| 9,217,049 | B2 | 12/2015 | Yang et al. |
| 9,284,389 | B2 | 3/2016 | St. Jean et al. |
| 9,303,099 | B2 | 4/2016 | Yang et al. |
| 9,447,265 | B2 | 9/2016 | Lam et al. |
| 9,487,607 | B2 | 11/2016 | Sohn et al. |
| 9,926,396 | B2 | 3/2018 | St. Jean et al. |
| 2006/0275571 | A1 | 12/2006 | Mure et al. |
| 2014/0031504 | A1 | 1/2014 | Jacobsen et al. |
| 2014/0127427 | A1 | 5/2014 | Vantomme et al. |
| 2015/0284490 | A1 | 10/2015 | Nagy et al. ........... C08F 210/16 |
| 2015/0322184 | A1 | 11/2015 | Hlavinka et al. |
| 2016/0075803 | A1 | 3/2016 | St. Jean et al. |
| 2016/0362510 | A1* | 12/2016 | Rix ....................... C08F 210/02 |
| 2018/0237558 | A1* | 8/2018 | McCullough ........... C08F 10/02 |

FOREIGN PATENT DOCUMENTS

| | | | |
|---|---|---|---|
| EP | 1706437 | 10/2006 | ............ C08F 10/02 |
| EP | 2003166 | 12/2008 | |
| EP | 2374822 | 10/2011 | |
| KR | 101132180 | 4/2012 | |
| KR | 101691628 | 1/2017 | |
| WO | 97/35891 | 10/1997 | |
| WO | 98/49209 | 11/1998 | |
| WO | 00/12565 | 3/2000 | |
| WO | 2001/09200 | 2/2001 | |
| WO | 02/060957 | 8/2002 | |
| WO | 2004/046214 | 6/2004 | |
| WO | 2006/080817 | 8/2006 | |
| WO | 2007/067259 | 6/2007 | |
| WO | 2007/080365 | 7/2007 | |
| WO | 2009/146167 | 12/2009 | |
| WO | 2012/006272 | 1/2012 | |
| WO | 2012/158260 | 11/2012 | |
| WO | 2015/123168 | 8/2015 | |
| WO | 2016/171807 | 10/2016 | |
| WO | 2016/171810 | 10/2016 | |
| WO | 2016/172099 | 10/2016 | |
| WO | WO2016/172279 | 10/2016 | ............ C08F 210/02 |

OTHER PUBLICATIONS

Chen et al., "Modeling and Simulation of Borstar Bimodal Polyethylene Process Based on Rigorous PC-SAFT Equation of State Model", Industrial & Engineering Chemistry Research, 2014, 53, pp. 19905-19915.

Hong et al., "Immobilized Me2Si(C5Me4)(N-t-Bu)TiCl2./(nBuCp)2ZrCl2 Hybrid Metallocene Catalyst System for the Production of Poly(ethylene-co-hexene) with Pseudo-bimodal Molecular Weight and Inverse Comonomer Distribution," Polymer Engineering and Science, 2007, vol. 47, No. 2, pp. 131-139, published online in Wiley InterScience (www.interscience.wiley.com) 2007 Society of Plastics Engineers.

Fritz et al., "Spektroskopische Untersuchungen an organometallischen Verbindungen XXVI. 1H-NMR-Spektren von Cyclopentadienylverbindungen des vierbindigen Zinns," Journal of Organometallic Chemistry, 1964, vol. 1, pp. 323-327.

Lund et al., "Rapid and efficient procedure for the synthesis of monocyclopentadienyl complexes of hafnium and zirconium," Organometallics, 1990, vol. 9, No. 9, pp. 2426-2427.

Leino et al., "Syndiospecific Propylene Polymerization with C1 Symmetric Group 4 ansa-Metallocene Catalysts," Macromolecules, 2001, vol. 34, No. 7, pp. 2072-2082.

Broussier, Roland et al. (1999) "Group 4 and Group 8 Unbridged Metallocene Derivatives with a Pendant Fluorenyl Group. X-Ray Structure of 1,1'-bis[2-(2-fluorenyl)propyl]ferrocene," *Jrnl. of Organ. Chem.*, v.574, pp. 267-275.

Davies, Michael J. et al. (2006) "Studies on 1,2-phenylenedioxoborylcyclopentadienes and Some of Their Metal (Ti, Zr, Fe) Complexes," *Polyhedron*, v.25, pp. 397-405.

Siedle, A. R. et al. (1995) "Stereochemical Nonrigidity in Metallocenium Ions," *Jrnl. of Organ. Chem.*, v.497, pp. 119-125.

\* cited by examiner

MIXED CATALYSTS WITH UNBRIDGED HAFNOCENES WITH -CH2-SIME3 MOIETIES

PRIORITY CLAIM

This application claims priority to and the benefit of U.S. Ser. No. 62/541,372, filed Aug. 4, 2017 and is incorporated by reference in its entirety.

FIELD OF THE INVENTION

The present invention relates to a dual catalyst system and processes for use thereof. In particular, the catalyst system includes an unbridged group 4 metallocene compound, an additional unbridged group 4 metallocene compound having a structure different than the first unbridged group 4 metallocene compound, a support material, and an activator. The catalyst system may be used for olefin polymerization processes.

BACKGROUND OF THE INVENTION

Polyolefins are widely used commercially because of their robust physical properties. For example, various types of polyethylenes, including high density, low density, and linear low density polyethylenes, are some of the most commercially useful. Polyolefins are typically prepared with a catalyst that polymerizes olefin monomers.

Low density polyethylene is generally prepared at high pressure using free radical initiators. Low density polyethylene typically has a density at about 0.916-0.930 g/cm$^3$. Typical low density polyethylene produced using free radical initiators is known in the industry as "LDPE." LDPE is also known as "branched" or "heterogeneously branched" polyethylene because of the relatively large number of long chain branches extending from the main polymer backbone. Polyethylene with a similar density that does not contain long chain branches is known as "linear low density polyethylene" ("LLDPE") and is typically produced with conventional Ziegler-Natta catalysts or with metallocene catalysts. "Linear" means that the polyethylene has few, if any, long chain branches and typically has a g'vis value of 0.97 or above, such as 0.98 or above. Polyethylenes having still greater density are the high density polyethylenes ("HDPEs"), e.g., polyethylenes having densities greater than 0.940 g/cm$^3$ and are generally prepared with Ziegler-Natta or chrome catalysts. Very low density polyethylenes ("VLDPEs") can be produced by a number of different processes yielding polyethylenes typically having a density 0.890 to 0.915 g/cm$^3$.

Copolymers of polyolefins, such as polyethylene, have a comonomer, such as hexene, incorporated into the polyethylene backbone. These copolymers provide varying physical properties compared to polyethylene alone and are typically produced in a low pressure reactor, utilizing, for example, solution, slurry, or gas phase polymerization processes. Polymerization may take place in the presence of catalyst systems such as those employing a Ziegler-Natta catalyst, a chromium based catalyst, or a metallocene catalyst.

A copolymer composition has a composition distribution, which refers to the distribution of comonomer in the copolymer, typically along the copolymer backbone. When the amount of comonomer varies among the copolymer molecules, the composition is said to have a "broad" composition distribution. When the amount of comonomer per 1000 carbons is similar among the copolymer molecules of different chain lengths, the composition distribution is said to be "narrow."

The composition distribution influences the properties of a copolymer composition, for example, stiffness, toughness, environmental stress crack resistance, and heat sealing, among other properties. The composition distribution of a polyolefin composition may be readily measured by, for example, Temperature Rising Elution Fractionation (TREF) or Crystallization Analysis Fractionation (CRYSTAF).

A composition distribution of a copolymer composition is influenced by the identity of the catalyst used to form the polyolefins of the composition. Ziegler-Natta catalysts and chromium based catalysts produce compositions with broad composition distributions, whereas metallocene catalysts typically produce compositions with narrow composition distributions.

Furthermore, polyolefins, such as polyethylenes, which have high molecular weight, generally have desirable mechanical properties over their lower molecular weight counterparts. However, high molecular weight polyolefins can be difficult to process and can be costly to produce. Polyolefin compositions having a bimodal molecular weight distribution are desirable because they can combine the advantageous mechanical properties of a high molecular weight fraction of the composition with the improved processing properties of a low molecular weight fraction of the composition. Unless otherwise indicated, as used herein, "high molecular weight" is defined as a weight average molecular weight (Mw) value of 150,000 g/mol or more. "Low molecular weight" is defined as an Mw value of less than 150,000 g/mol.

For example, useful bimodal polyolefin compositions include a first polyolefin having low molecular weight and high comonomer content (i.e., comonomer incorporated into the polyolefin backbone) while a second polyolefin has a high molecular weight and low comonomer content. As used herein, "low comonomer content" is defined as a polyolefin having 6 wt % or less of comonomer based upon the total weight of the polyolefin. The high molecular weight fraction produced by the second catalyst compound may have a high comonomer content. As used herein, "high comonomer content" is defined as a polyolefin having greater than 6 wt % of comonomer based upon the total weight of the polyolefin.

There are several methods for producing bimodal or broad molecular weight distribution polyolefins, e.g., melt blending, polymerization in reactors in series or parallel configuration, or single reactor with bimetallic catalysts. However, these methods, such as melt blending, suffer from the disadvantages brought by the need for complete homogenization of polyolefin compositions and high cost.

Furthermore, synthesizing these bimodal polyolefin compositions in a mixed catalyst system would involve a first catalyst to catalyze the polymerization of, for example, ethylene under substantially similar conditions as that of a second catalyst while not interfering with the catalysis of polymerization of the second catalyst. For example, two different metallocene catalysts may interfere with the polymerization catalysis of each other, resulting in reduced catalytic activity, reduced molecular weight polyolefins, and reduced comonomer incorporation.

There exists a need for catalyst systems that provide polyolefin compositions having novel combinations of comonomer content fractions and molecular weights. There is further a need for novel catalyst systems where a first catalyst does not negatively impact the polymerization catalysis of a second catalyst or vice versa.

Useful catalysts for olefin polymerization are often based on cyclopentadienyl transition metal catalyst compounds (metallocenes) as catalyst precursors combined with activators, typically an alumoxane or with an activator containing a non-coordinating anion. A typical metallocene catalyst system includes metallocene catalyst, activator, and optional support. Supported catalyst systems are used in many polymerization processes, often in slurry or gas phase polymerization processes.

Catalysts for olefin polymerization are often based on substituted metallocenes as catalyst precursors, which are activated either with the help of an alumoxane, or with an activator containing a non-coordinating anion.

For example U.S. Pat. No. 7,829,495 discloses $Me_2Si$ (fluorenyl)(3-nPr-Cp)$ZrCl_2$ and U.S. Pat. No. 7,179,876 discloses supported (nPrCp)$_2$HfMe$_2$.

Likewise, $Me_2C(Cp)(Me_3SiCH_2—Ind)MCl_2$ and $Me_2C$ (Cp)(Me, $Me_3SiCH_2$—Ind)$MCl_2$, where M is Zr or Hf have been synthesized and screened for the syndiospecific polymerization of propylene; see Leino, R., Gomez, F.; Cole, A.; Waymouth, R. *Macromolecules* 2001, 34, 2072-2082.

Additional references of interest include: Hong et al. in Immobilized $Me_2Si(C_5Me_4)(N\text{-}t\text{-}Bu)TiCl_2/(nBuCp)_2ZrCl_2$ Hybrid Metallocene Catalyst System for the Production of Poly(ethylene-co-hexene) with Pseudo-bimodal Molecular Weight and Inverse Comonomer Distribution, (Polymer Engineering and Science-2007, DOI 10.1002/pen, pages 131-139, published online in Wiley InterScience (www.interscience.wiley.com) 2007 Society of Plastics Engineers); Kim, J. D. et al., J. Polym. Sci. Part A: Polym Chem., 38, 1427 (2000); Iedema, P. D. et al., Ind. Eng. Chem. Res., 43, 36 (2004); U.S. Pat. Nos. 4,701,432; 5,032,562; 5,077,255; 5,135,526; 5,183,867; 5,382,630; 5,382,631; 5,516,848; 5,525,678; 6,069,213; 6,207,606; 6,380,311; 6,656,866; 6,828,394; 6,964,937; 6,956,094; 6,995,109; 7,041,617; 7,119,153; 7,129,302; 7,141,632; 7,172,987; 7,179,876; 7,192,902; 7,199,072; 7,199,073; 7,226,886; 7,285,608; 7,312,283; 7,355,058; 7,385,015; 7,396,888; 7,547,754; 7,572,875; 7,595,364; 7,619,047; 7,625,982; 7,662,894; 7,829,495; 7,855,253; 8,088,867; 8,110,518; 8,138,113; 8,268,944; 8,288,487; 8,329,834; 8,378,029; 8,383,754; 8,575,284; 8,598,061; 8,680,218; 8,785,551; 8,815,357; 8,846,841; 8,940,842; 8,957,168; 9,006,367; 9,079,993; 9,096,745; 9,163,098; 9,181,370; 9,217,049; 9,303,099; 9,447,265; U.S. Publications 2004/259722; 2006/275571; 2012/130032; 2014/031504; 2014/127427; 2015/322184; 2015/299352; 2016/032027; 2016/075803; 2017/114167; PCT Publications WO 97/35891; WO 98/49209; WO 00/12565; WO 2001/09200; WO 02/060957; WO 2004/046214; WO 2006/080817; WO 2007/067259; WO 2007/080365; WO 2009/146167; WO 2012/006272; WO 2012/158260; WO 2015/123168; WO 2016/172099; WO 2016/171807; WO 2016/171810; EP 2 374 822; EP 2 003 166; EP 0 729 387; EP 0 676 418; EP 0 705 851; KR 20150058020; KR 101132180; Sheu, S., 2006, "Enhanced bimodal PE makes the impossible possible", http://www.tappi.org/content/06asiaplace/pdfs-english/enhanced.pdf; Chen et al., "Modeling and Simulation of Borstar Bimodal Polyethylene Process Based on Rigorous PC-SAFT Equation of State Model", Industrial & Engineering Chemical Research, 53, pp. 19905-19915, (2014); A. Calhoun, et al. "Polymer Chemistry", Chapter 5, pages 77-87; and Stadelhofer, et al., J. Organomet. Chem, 1975, 84, pp. $C_1$-$C_4$.

There is still a need in the art for new and improved catalyst systems for the polymerization of olefins, in order to achieve increased activity or enhanced polymer properties, to increase conversion or comonomer incorporation, or to alter comonomer distribution. There is also a need for supported catalyst systems and processes for the polymerization of olefins (such as ethylene) using such catalyst systems to provide ethylene polymers having the unique properties of high stiffness, high toughness and good processability.

SUMMARY OF THE INVENTION

The present invention relates to a supported catalyst system including an unbridged group 4 metallocene compound; an additional unbridged group 4 metallocene compound having a structure different than the first metallocene compound; a support material; and an activator; wherein the first unbridged group 4 metallocene compound is represented by the formula (A):

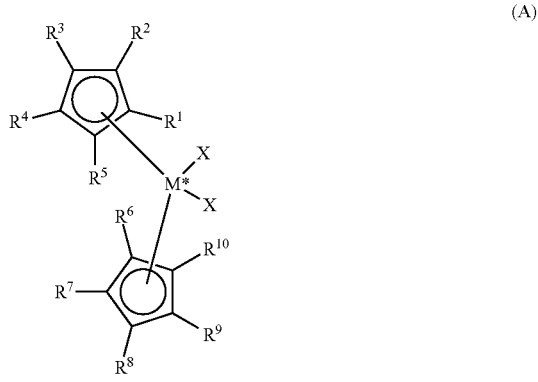

where
M* is a group 4 metal
each of $R^1$, $R^2$, $R^4$ and $R^5$ is independently hydrogen, alkoxide, or $C_1$ to $C_{40}$ substituted or unsubstituted hydrocarbyl;
$R^3$ is independently hydrogen, alkoxide, $C_1$ to $C_{40}$ substituted or unsubstituted hydrocarbyl, or —$R^{11}$—SiR'$_3$ or —$R^{11}$—CR'$_3$ where $R^{11}$ is $C_1$ to $C_4$ hydrocarbyl, and each R' is independently $C_1$ to $C_{20}$ substituted or unsubstituted hydrocarbyl;
each $R^6$, $R^7$, $R^8$, and $R^{10}$ is independently hydrogen, halide, alkoxide, or $C_1$ to $C_{40}$ substituted or unsubstituted hydrocarbyl;
$R^9$ is —$R^{11}$—SiR'$_3$ or —$R^{11}$—CR'$_3$ where $R^{11}$ is $C_1$ to $C_4$ hydrocarbyl, and each R' is independently $C_1$ to $C_{20}$ substituted or unsubstituted hydrocarbyl; and
each X is independently a univalent anionic ligand, or two Xs are joined to form a metallocyclic ring, or two Xs are joined to form a chelating ligand, a diene ligand, or an alkylidene ligand; and
the second unbridged group 4 metallocene compound is represented by formula (B):

wherein each Cp is independently substituted or unsubstituted cyclopentadienyl, indenyl or fluorenyl, M is zirconium or hafnium, X' is a leaving group, such as a halide, hydride, alkyl, alkenyl or arylalkyl, and m=2 or 3, q=0, 1, 2, or 3, and the sum of m+q is equal to the oxidation state of the transition metal, typically 2, 3, or 4, preferably 4, and each Cp and X' is bound to M.

The present invention also provides a process for polymerization of monomers (such as olefin monomers) comprising contacting one or more monomers with the above supported catalyst systems.

The present invention also provides a process to produce ethylene polymer compositions comprising: i) contacting in a single reaction zone, in the gas phase or slurry phase, ethylene and $C_3$ to $C_{20}$ comonomer with a catalyst system comprising a support, an activator, and the catalyst system described above, and ii) obtaining an in-situ ethylene polymer composition having at least 50 mol % ethylene and a density of 0.91 g/cc or more, alternatively 0.935 g/cc or more.

The present invention also provides a process to produce ethylene polymer compositions comprising: i) contacting in a single reaction zone, in the gas phase or slurry phase, ethylene and $C_3$ to $C_{20}$ comonomer with a catalyst system comprising a support, an activator, and the catalyst system described above, and obtaining an ethylene polymer having: a) an RCI,m greater than 20 and less than 35, and an Mw/Mn of 3 to 4; or b) an RCI,m greater than 50 and an Mw/Mn of greater than 5.

The present invention also provides polymer compositions produced by the methods and catalyst systems described herein.

DETAILED DESCRIPTION

The present invention provides a dual catalyst systems and processes for use thereof. In particular, the catalyst system comprises an unbridged group 4 metallocene compound, an additional unbridged group 4 metallocene compound having a structure different than the first unbridged group 4 metallocene compound, a support material, and an activator. The catalyst system may be used for olefin polymerization processes. Catalyst systems of the present invention can provide increased activity or enhanced polymer properties, to increase conversion or comonomer incorporation, or to alter comonomer distribution. Catalyst systems and processes of the present invention can provide ethylene polymers having the unique properties of high stiffness, high toughness and good processability.

For purposes of the present invention, a "catalyst system" is a combination of at least two catalyst compounds, an activator, and a support material. The catalyst systems may further comprise one or more additional catalyst compounds. The terms "mixed catalyst system," "dual catalyst system," "mixed catalyst," and "supported catalyst system" may be used interchangeably herein with "catalyst system." For purposes of the present invention, when catalyst systems are described as comprising neutral stable forms of the components, it is well understood by one of ordinary skill in the art, that the ionic form of the component is the form that reacts with the monomers to produce polymers.

As used in this specification and the claims thereto, the term "metallocene compound" includes compounds having two or three Cp ligands (cyclopentadienyl and ligands isolobal to cyclopentadienyl) bound to at least one Zr or Hf metal atom, and one or more leaving group(s) bound to the at least one metal atom.

For purposes of the present disclosure and claims thereto, in relation to all metallocene catalyst compounds, the term "substituted" means that a hydrogen group has been replaced with a hydrocarbyl group, a heteroatom, or a heteroatom containing group. For example, methyl cyclopentadiene (Cp) is a Cp substituted with a methyl group.

For purposes of the present disclosure, the term "alkoxide(s)" includes those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

The term "complex" is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization function using an activator which is believed to create a cation as a result of the removal of an anionic group, often referred to as a leaving group, from the transition metal. "Complex," as used herein, is also often referred to as "catalyst precursor," "pre-catalyst," "catalyst," "catalyst compound," "metal compound," "metal catalyst compound", "transition metal compound," or "transition metal complex." These words are used interchangeably. "Activator" and "cocatalyst" are also used interchangeably.

The terms "hydrocarbyl radical," "hydrocarbyl" and "hydrocarbyl group" are used interchangeably throughout this document. Likewise the terms "group," "radical," and "substituent" are also used interchangeably in this document. For purposes of the present invention, "hydrocarbyl radical" is defined to be $C_1$-$C_{100}$ radicals, that may be linear, branched, or cyclic, and when cyclic, aromatic or non-aromatic.

For purposes of the present invention, unless otherwise indicated, the term "substituted" means that a hydrogen group has been replaced with a heteroatom, or a heteroatom containing group. For example, substituted hydrocarbyl radicals are radicals in which at least one hydrogen atom of the hydrocarbyl radical has been substituted with at least one functional group such as Cl, Br, F, I, NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like (where R* is H or a $C_1$ to $C_{20}$ hydrocarbyl group), or where at least one heteroatom has been inserted within a hydrocarbyl ring.

The term "ring atom" means an atom that is part of a cyclic ring structure. By this definition, a benzyl group has six ring atoms and tetrahydrofuran has 5 ring atoms.

A "ring carbon atom" is a carbon atom that is part of a cyclic ring structure. By this definition, a benzyl group has six ring carbon atoms and para-methylstyrene also has six ring carbon atoms.

The term "aryl" or "aryl group" means a six carbon aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, preferably, N, O, or S.

The term "arylalky" is an aryl-substituted alkyl radical and may be used interchangeably with the term "aralkyl." Examples of aralkyl include benzyl, diphenylmethyl, triphenylmethyl, phenylethyl, and diphenylethyl.

A "heterocyclic ring" is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

As used herein the term "aromatic" also refers to pseudo-aromatic heterocycles which are heterocyclic substituents that have similar properties and structures (nearly planar) to aromatic heterocyclic ligands, but are not by definition aromatic; likewise, the term aromatic also refers to substituted aromatics.

The term "continuous" means a system that operates without interruption or cessation. For example, a continuous process to produce a polymer would be one where the reactants are continually introduced into one or more reactors and polymer product is continually withdrawn.

As used herein, the numbering scheme for the Periodic Table groups is the new notation as set out in Chemical and Engineering News, 63(5), 27, (1985).

An "olefin," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For purposes of the present invention, an ethylene polymer having a density of 0.86 g/cm³ or less is referred to as an ethylene elastomer or elastomer; an ethylene polymer having a density of more than 0.86 to less than 0.910 g/cm³ is referred to as an ethylene plastomer or plastomer; an ethylene polymer having a density of 0.910 to 0.940 g/cm³ is referred to as a low density polyethylene; and an ethylene polymer having a density of more than 0.940 g/cm³ is referred to as a high density polyethylene (HDPE). Density is determined according to ASTM D 1505 using a density-gradient column on a compression-molded specimen that has been slowly cooled to room temperature (i.e., over a period of 10 minutes or more) and allowed to age for a sufficient time that the density is constant within +/−0.001 g/cm³).

Polyethylene in an overlapping density range, i.e., 0.890 to 0.930 g/cm³, typically from 0.915 to 0.930 g/cm³, which is linear and does not contain long chain branching is referred to as "linear low density polyethylene" (LLDPE) and has been produced with conventional Ziegler-Natta catalysts, vanadium catalysts, or with metallocene catalysts in gas phase reactors and/or in slurry reactors and/or in solution reactors. "Linear" means that the polyethylene has no long chain branches, typically referred to as a branching index ($g'_{vis}$) of 0.97 or above, preferably 0.98 or above. Branching index, $g'_{vis}$, is measured by GPC-4D as described below.

For purposes of the present invention, ethylene shall be considered an alpha-olefin (α-olefin).

As used herein, $M_n$ is number average molecular weight, $M_w$ is weight average molecular weight, and $M_z$ is z average molecular weight, wt % is weight percent, and mol % is mole percent. Unless otherwise noted, all average molecular weights (e.g., Mw, Mn, Mz) are reported in units of g/mol. Molecular weight distribution (MWD), also referred to as polydispersity index (PDI), is defined to be Mw divided by Mn.

The following abbreviations may be used herein: Me is methyl, Et is ethyl, t-Bu and tBu are tertiary butyl, iPr and $^i$Pr are isopropyl, Cy is cyclohexyl, THF (also referred to as thf) is tetrahydrofuran, Bn is benzyl, Ph is phenyl, Cp is cyclopentadienyl, Cp* is pentamethyl cyclopentadienyl, Ind is indenyl, Flu is fluorenyl, and MAO is methylalumoxane.

The present invention provides a supported catalyst system comprising: (i) a first unbridged metallocene compound; (ii) a second unbridged metallocene compound; (iii) a support material; and (iv) an activator; wherein the first unbridged metallocene compound is represented by formula (A):

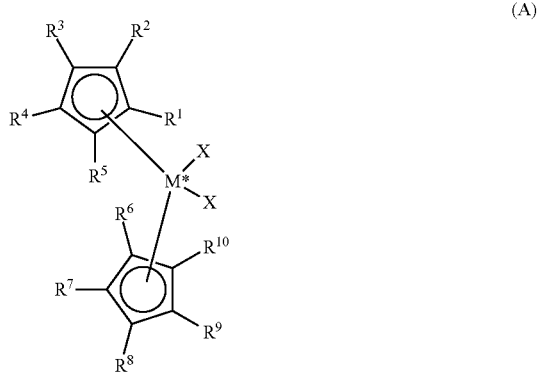

where
M* is a group 4 metal, preferably Hf;
each of $R^1$, $R^2$, $R^4$, and $R^5$ is independently hydrogen, alkoxide, or $C_1$ to $C_{40}$ substituted or unsubstituted hydrocarbyl;
$R^3$ is independently hydrogen, alkoxide, $C_1$ to $C_{40}$ substituted or unsubstituted hydrocarbyl, or —$R^{11}$—$SiR'_3$ or —$R^{11}$—$CR'_3$ where $R^{11}$ is a $C_1$ to $C_4$ hydrocarbyl, and each R' is independently $C_1$ to $C_{20}$ substituted or unsubstituted hydrocarbyl;
each $R^6$, $R^7$, $R^8$, and $R^{10}$ is independently hydrogen, halide, alkoxide, or $C_1$ to $C_{40}$ substituted or unsubstituted hydrocarbyl;
$R^9$ is —$R^{11}$—$SiR'_3$ or —$R^{11}$—$CR'_3$ where $R^{11}$ is a $C_1$ to $C_4$ hydrocarbyl, and each R' is independently $C_1$ to $C_{20}$ substituted or unsubstituted hydrocarbyl; and
each X is independently a univalent anionic ligand, or two Xs are joined to form a metallocyclic ring, or two Xs are joined to form a chelating ligand, a diene ligand, or an alkylidene ligand; and
the second unbridged metallocene compound represented by formula (B):

$$Cp_mMX'_q \qquad (B)$$

wherein each Cp is independently substituted or unsubstituted cyclopentadienyl, indenyl or fluorenyl, M is zirconium or hafnium (preferably Zr), X' is a leaving group, such as a halide, hydride, alkyl, alkenyl or arylalkyl, and m=2 or 3, q=0, 1, 2, or 3, and the sum of m+q is equal to the oxidation state of the transition metal, and each Cp and X' is bound to M.

The present invention further provides a process for polymerization of olefin monomers comprises contacting one or more monomers with the above supported catalyst systems.

The above two catalyst components can have different hydrogen responses (each having a different reactivity toward hydrogen) during the polymerization process. Hydrogen is often used in olefin polymerization to control the final properties of the polyolefin. The first catalyst component can show a more negative response to changes of hydrogen concentration in reactor than the second catalyst component. Owing to the differing hydrogen response of the catalyst components in the supported catalyst systems, the properties of resulting polymer are controllable. Changes of hydrogen concentration in the reactor may affect molecular weight, molecular weight distributions, and other properties of the resulting polyolefin when using a combination of such two catalyst components. Thus, the present invention further provides a multi-modal polyolefin obtained from polymerizations using the above supported catalyst systems.

In useful embodiments, catalyst A is a good comonomer (such as hexene) incorporator (e.g., provides comonomer content of 6% or greater) and yields polyethylene with higher molecular weight than catalyst B which under similar conditions yields lower molecular weight than catalyst A. Catalyst B can also incorporate less comonomer (such as hexene) under similar reaction conditions. When catalyst A and catalyst B are combined on one support, an in-reactor blend (also referred to as an in-situ blend) of polyethylene is produced with a mix of low and high density resins in which the higher density resin (typically having a higher melting point) is combined with lower density, higher molecular weight resin. Catalyst A may be a single isomer or a combination of isomers, e.g., 2, 3, 4, 5, or 6 isomers, typically 2 isomers. Catalyst B may be a single isomer or a combination of isomers, e.g., 2, 3, 4, 5, or 6 isomers, typically 2 isomers.

The two transition metal compounds may be used in any ratio. Preferred molar ratios of (A) the first unbridged transition metal catalyst to (B) the second unbridged transition metal catalyst fall within the range of (A):(B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact catalyst compounds chosen, the method of activation, and the end product desired. In a particular embodiment, when using the two catalyst compounds, where both are activated with the same activator, useful mole percents, based upon the molecular weight of the catalyst compounds, are (10 to 99.9% A):(0.1 to 90% B), alternatively (25 to 99% A):(0.5 to 50% B), alternatively (50 to 99% A):(1 to 25% B), and alternatively (75 to 99% A):(1 to 10% B).

For purposes of the present invention, one metallocene catalyst compound is considered different from another if they differ by at least one atom. For example "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes of the present invention, e.g., rac-bis(1-methylindenyl)hafnium dimethyl is considered to be the same as meso-bis(1-methyl-indenyl)hafnium dimethyl. Thus, as used herein, a single metallocene catalyst component having a racemic and/or meso isomer does not, itself, constitute two different metallocene catalyst components.

The present invention provides a process to produce ethylene polymer compositions comprising: i) contacting in a single reaction zone, in the gas phase or slurry phase, ethylene and $C_3$ to $C_{20}$ comonomer with a catalyst system comprising a support, an activator, and the catalysts described above, and obtaining an ethylene polymer having: a) an RCI,m greater than 30 and an Mw/Mn of greater than 3; or b) an RCI,m greater than 50 and an Mw/Mn of greater than 5. Without wishing to be bound by theory, it is believed that the ethylene polymer produced herein (i.e., an in-situ ethylene polymer composition) has at least two polymer components where the first component is derived from the catalyst represented by formula A and has more comonomer (such as hexene) and higher Mw as compared to the second component derived from the catalyst represented by formula B which has less comonomer (such as hexene) and lower Mw as compared to the first component as determined by 4D GPC.

The First Unbridged Metallocene

In at least one embodiment, the supported catalyst systems comprise a transition metal complex represented by formula (A):

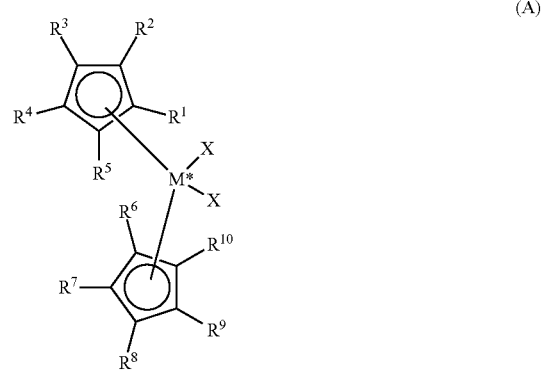

where
M* is a group 4 metal, such as Zr, Hf, or Ti, most preferably Hf;
each of $R^1$, $R^2$, $R^4$, and $R^5$ is independently hydrogen, alkoxide, or $C_1$ to $C_{40}$ substituted or unsubstituted hydrocarbyl;
$R^3$ is independently hydrogen, alkoxide, $C_1$ to $C_{40}$ substituted or unsubstituted hydrocarbyl, or —$R^{11}$—$SiR'_3$ or —$R^{11}$—$CR'_3$ where $R^{11}$ is a $C_1$ to $C_4$ hydrocarbyl, and each R' is independently $C_1$ to $C_{20}$ substituted or unsubstituted hydrocarbyl;
each $R^6$, $R^7$, $R^8$, and $R^{10}$ is independently hydrogen, halide, alkoxide, or $C_1$ to $C_{40}$ substituted or unsubstituted hydrocarbyl;
$R^9$ is —$R^{11}$—$SiR'_3$ or —$R^{11}$—$CR'_3$ where $R^{11}$ and R' are defined above; and
each X is independently a univalent anionic ligand, or two Xs are joined to form a metallocyclic ring, or two Xs are joined to form a chelating ligand, a diene ligand, or an alkylidene ligand.

In a preferred embodiment, each $R^1$, $R^2$, $R^4$ and $R^5$ is independently hydrogen, or a substituted $C_1$ to $C_{12}$ hydrocarbyl group or an unsubstituted $C_1$ to $C_{12}$ hydrocarbyl group, preferably each $R^1$, $R^2$, $R^4$ and $R^5$ is independently a $C_1$ to $C_{20}$ alkyl group), preferably hydrogen, methyl, ethyl, propyl, butyl, pentyl, hexyl, or an isomer thereof, preferably hydrogen or methyl.

In a preferred embodiment, $R^3$ is hydrogen, or a substituted $C_1$ to $C_{12}$ hydrocarbyl group or an unsubstituted $C_1$ to $C_{12}$ hydrocarbyl group, preferably $R^3$ is a $C_1$ to $C_{20}$ alkyl group, preferably hydrogen, methyl, ethyl, propyl, butyl, pentyl, hexyl, or an isomer thereof, preferably hydrogen or methyl, or $R^3$ is —$R^{20}$—$SiR'_3$ or is —$R^{20}$—$CR'_3$ where $R^{20}$ is hydrogen or a $C_1$ to $C_4$ hydrocarbyl (preferably $CH_2$; $CH_2CH_2$, (Me)$CHCH_2$, (Me)CH), and each R' is independently hydrogen or a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, phenyl, biphenyl, or an isomer thereof, R' is a $C_1$ to $C_{20}$ alkyl or aryl, such as methyl, methyl phenyl, phenyl, biphenyl, pentamethylphenyl, tetramethylphenyl, or di-t-butylphenyl, provided that at least one R' is not H, alternatively 2 of R' are not H, alternatively 3 of R' are not H.

Alternatively, $R^3$ is —$CH_2$—$SiMe_3$, —$CH_2$—$SiEt_3$, —$CH_2$—$SiPr_3$, —$CH_2$—$SiBu_3$, —$CH_2$—$SiCy_3$, —$CH_2$—$C(CH_3)_3$, —$CH_2$—$CH(CH_3)_2$, —$CH_2CPh_3$, —$CH_2(C_6Me_5)$, —$CH_2$—$C(CH_3)_2Ph$, —$CH_2$—$C(Cy)Ph_2$. —$CH_2$—$SiH(CH_3)_2$, —$CH_2SiPh_3$, —$CH_2$—$Si(CH_3)_2Ph$, —$CH_2$—$Si(CH_3)Ph$, —$CH_2$—$Si(CH_3)Ph_2$, —$CH_2$—$Si(Et)_2Ph$, —$CH_2$—$Si(Et)Ph_2$, —$CH_2$—$Si(CH_2)_3Ph$, —$CH_2$—$Si(CH_2)_4Ph$, —$Si(Cy)Ph_2$, or —$CH_2$—$Si(Cy)_2Ph$.

Alternatively, each of $R^1$, $R^2$, $R^3$, and $R^4$ is not H.

In a preferred embodiment, each $R^6$, $R^7$, $R^8$, and $R^{10}$ is independently hydrogen, or a substituted $C_1$ to $C_{12}$ hydrocarbyl group or an unsubstituted $C_1$ to $C_{12}$ hydrocarbyl group, preferably a $C_1$ to $C_{20}$ alkyl group, preferably hydrogen, methyl, ethyl, propyl, butyl, pentyl, hexyl, or an isomer thereof, preferably a hydrogen or methyl.

In a preferred embodiment, $R^9$ is —$R^{20}$—$SiR'_3$ or is —$R^{20}$—$CR'_3$ where $R^{20}$ is a $C_1$ to $C_4$ hydrocarbyl (preferably —$CH_2$—, —$CH_2CH_2$—, -(Me)$CHCH_2$—, -(Me)CH—, and each R' is independently hydrogen or a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, phenyl, biphenyl, or an isomer thereof, R' is a $C_1$ to $C_{20}$ alkyl or aryl, such as methyl, methyl phenyl, phenyl, biphenyl, pentamethylphenyl, tetramethylphenyl, or di-t-butylphenyl, provided that at least one R' is not H, alternatively 2 of R' are not H, alternatively 3 of R' are not H;

Alternatively, $R^9$ is —$CH_2$—$SiMe_3$, —$CH_2$—$SiEt_3$, —$CH_2$—$SiPr_3$, —$CH_2$—$SiBu_3$, —$CH_2$—$SiCy_3$, —$CH_2(C_6Me_5)$, —$CH_2$—$C(CH_3)_2Ph$, —$CH_2$—$C(Cy)Ph_2$. —$CH_2$—$SiH(CH_3)_2$, —$CH_2SiPh_3$, —$CH_2$—$Si(CH_3)_2Ph$, —$CH_2$—$Si(CH_3)Ph_2$, —$CH_2$—$Si(Et)_2Ph$, —$CH_2$—$Si(Et)Ph_2$, —$CH_2$—$Si(CH_2)_3Ph$, —$CH_2$—$Si(CH_2)_4Ph$, —$CH_2$—$Si(Cy)Ph_2$, or —$CH_2$—$Si(Cy)_2Ph$.

Alternatively, $R^3$ and $R^9$ are independently —$R^{20}$—$SiR'_3$ or is —$R^{20}$—$CR'_3$ where $R^{20}$ is a $C_1$ to $C_4$ hydrocarbyl (preferably —$CH_2$—, —$CH_2CH_2$—, -(Me)$CHCH_2$—, -(Me)CH—, and each R' is independently hydrogen, or a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, phenyl, biphenyl, or an isomer thereof, R' is a $C_1$ to $C_{20}$ alkyl or aryl, such as methyl, methyl phenyl, phenyl, biphenyl, pentamethylphenyl, tetramethylphenyl, or di-t-butylphenyl; alternatively $R^3$ and $R^9$ are selected from the group consisting of: —$CH_2$—$SiMe_3$, —$CH_2$—$SiEt_3$, —$CH_2$—$SiPr_3$, —$CH_2$—$SiBu_3$, —$CH_2$—$SiCy_3$, —$CH_2$—$C(CH_3)_3$, —$CH_2$—$CH(CH_3)_2$, —$CH_2CPh_3$, —$CH_2(C_6Me_5)$, —$CH_2$—$C(CH_3)_2Ph$, —$CH_2$—$C(Cy)Ph_2$. —$CH_2$—$SiH(CH_3)_2$, —$CH_2SiPh_3$, —$CH_2$—$Si(CH_3)_2Ph$, —$CH_2$—$Si(CH_3)Ph_2$, —$CH_2$—$Si(Et)_2Ph$, —$CH_2$—$Si(Et)Ph_2$, —$CH_2$—$Si(CH_2)_3Ph$, —$CH_2$—$Si(CH_2)_4Ph$, —$CH_2$—$Si(Cy)Ph_2$, or —$CH_2$—$Si(Cy)_2Ph$.

Alternatively, each X may be, independently, a halide, a hydride, an alkyl group, an alkenyl group or an arylalkyl group.

Alternatively, each X is independently selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof, (two Xs may form a part of a fused ring or a ring system), preferably each X is independently selected from halides, aryls and $C_1$ to $C_5$ alkyl groups, preferably each X is a phenyl, methyl, ethyl, propyl, butyl, pentyl, or chloro group.

Useful asymmetric catalysts are preferably such that a mirror plane can not be drawn through the metal center and the cyclopentadienyl moieties bridged to the metal center are structurally different.

Catalyst compounds represented by formula (A) can be one or more of: (Cp)(3-$CH_2$—$SiMe_3$-Cp)$HfMe_2$; (MeCp)(3-$CH_2$—$SiMe_3$-Cp)$HfMe_2$; (EtCp)(3-$CH_2$—$SiMe_3$-Cp)$HfMe_2$; (PrCp)(3-$CH_2$—$SiMe_3$-Cp)$HfMe_2$; (BuCp)(3-$CH_2$—$SiMe_3$-Cp)$HfMe_2$; (BzCp)(3-$CH_2$—$SiMe_3$-Cp)$HfMe_2$; (3-$CH_2$—$SiMe_3$-Cp)$_2HfMe_2$; (Me$_3$Cp)(3-$CH_2$—$SiMe_3$-Cp)$HfMe_2$; (Me$_4$Cp)(3-$CH_2$—$SiMe_3$-Cp)$HfMe_2$; (Me$_5$Cp)(3-$CH_2$—$SiMe_3$-Cp)$HfMe_2$; (1-Me, 3-Bu-Cp)(3-$CH_2$—$SiMe_3$-Cp)$HfMe_2$; (1-Me, 3-Ph-Cp)(3-$CH_2$—$SiMe_3$-Cp)$HfMe_2$; (Me$_4$Cp-Pr)(3-$CH_2$—$SiMe_3$-Cp)$HfMe_2$; (Me$_4$Cp-$CH_2$—$SiMe_3$)(3-$CH_2$—$SiMe_3$-Cp)$HfMe_2$; (2-Me, 3-$CH_2$—$SiMe_3$-Ind)$_2HfMe_2$; (2-Et, 3-$CH_2$—$SiMe_3$-Ind)$_2HfMe_2$; (2-Pr, 3-$CH_2$—$SiMe_3$-Ind)$_2HfMe_2$; (2-Bu, 3-$CH_2$—$SiMe_3$-Ind)$_2HfMe_2$; (2-Ph, 3-$CH_2$—$SiMe_3$-Ind)$_2HfMe_2$; (3-$CH_2$—$SiMe_3$-Ind)$_2HfMe_2$; (3-$CH_2$—$SiMe_3$-Ind)(3-$CH_2$—$SiMe_3$-Cp)$HfMe_2$; (3-Me-Ind)(3-$CH_2$—$SiMe_3$-Cp)$HfMe_2$; (3-Et-Ind)(3-$CH_2$—$SiMe_3$-Cp)$HfMe_2$; (3-Pr-Ind)(3-$CH_2$—$SiMe_3$-Cp)$HfMe_2$; (3-Bu-Ind)(3-$CH_2$—$SiMe_3$-Cp)$HfMe_2$; (Cp)(3-$CH_2$—$SiMe_3$-Ind)$HfMe_2$; (MeCp)(3-$CH_2$—$SiMe_3$-Ind)$HfMe_2$; (EtCp)(3-$CH_2$—$SiMe_3$-Ind)$HfMe_2$; (PrCp)(3-$CH_2$—$SiMe_3$-Ind)$HfMe_2$; (BuCp)(3-$CH_2$—$SiMe_3$-Ind)$HfMe_2$; (Me$_3$Cp)(3-$CH_2$—$SiMe_3$-Ind)$HfMe_2$; (Me$_4$Cp)(3-$CH_2$—$SiMe_3$-Ind)$HfMe_2$; (Me$_5$Cp)(3-$CH_2$—$SiMe_3$-Ind)$HfMe_2$; (1-Me, 3-Bu-Cp)(3-$CH_2$—$SiMe_3$-Ind)$HfMe_2$; (1-Me, 3-Ph-Cp)(3-$CH_2$—$SiMe_3$-Ind)$HfMe_2$, (Cp)(3-$CH_2$—$SiMe_3$-Cp)$HfMe_2$; (MeCp)(3-$CH_2$—$SiMe_3$-Cp)$HfMe_2$; (EtCp)(3-$CH_2$—$SiMe_3$-Cp)$HfMe_2$; (PrCp)(3-$CH_2$—$SiMe_3$-Cp)$HfMe_2$; (BuCp)(3-$CH_2$—$SiMe_3$-Cp)$HfMe_2$; (BzCp)(3-$CH_2$—$SiMe_3$-Cp)$HfMe_2$; (3-$CH_2$—$SiMe_3$-Cp)$_2HfMe_2$; (Me$_2$Cp)(3-$CH_2$—$SiMe_3$-Cp)$HfMe_2$; (Me$_3$Cp)(3-$CH_2$—$SiMe_3$-Cp)$HfMe_2$; (Me$_4$Cp)(3-$CH_2$—$SiMe_3$-Cp)$HfMe_2$; (Me$_5$Cp)(3-$CH_2$—$SiMe_3$-Cp)$HfMe_2$; (Et$_2$Cp)(3-$CH_2$—$SiMe_3$-Cp)$HfMe_2$; (Et$_3$Cp)(3-$CH_2$—$SiMe_3$-Cp)$HfMe_2$; (Et$_4$Cp)(3-$CH_2$—$SiMe_3$-Cp)$HfMe_2$; (Et$_5$Cp)(3-$CH_2$—$SiMe_3$-Cp)$HfMe_2$; (Pr$_2$Cp)(3-$CH_2$—$SiMe_3$-Cp)$HfMe_2$; (Pr$_3$Cp)(3-$CH_2$—$SiMe_3$-Cp)$HfMe_2$; (Pr$_4$Cp)(3-$CH_2$—$SiMe_3$-Cp)$HfMe_2$; (Pr$_5$Cp)(3-$CH_2$—$SiMe_3$-Cp)$HfMe_2$; (Bu$_2$Cp)(3-$CH_2$—$SiMe_3$-Cp)$HfMe_2$; (Bu$_3$Cp)(3-$CH_2$—$SiMe_3$-Cp)$HfMe_2$; (Bu$_4$Cp)(3-$CH_2$—$SiMe_3$-Cp)$HfMe_2$; (Bu$_5$Cp)(3-$CH_2$—$SiMe_3$-Cp)$HfMe_2$; (Bz$_2$Cp)(3-$CH_2$—$SiMe_3$-Cp)$HfMe_2$; (Bz$_3$Cp)(3-$CH_2$—$SiMe_3$-Cp)$HfMe_2$; (Bz$_4$Cp)(3-$CH_2$—$SiMe_3$-Cp)

HfMe₂; (Bz₅Cp)(3-CH₂—SiMe₃-Cp)HfMe₂; (EtMe₄Cp)(3-CH₂—SiMe₃-Cp)HfMe₂; (PrMe₄Cp)(3-CH₂—SiMe₃-Cp)HfMe₂; (BuMe₄Cp)(3-CH₂—SiMe₃-Cp)HfMe₂; (PnMe₄Cp)(3-CH₂—SiMe₃-Cp)HfMe₂; (HxMe₄Cp)(3-CH₂—SiMe₃-Cp)HfMe₂; (BzMe₄Cp)(3-CH₂—SiMe₃-Cp)HfMe₂; (Me₄Cp-CH₂—SiMe₃)(3-CH₂—SiMe₃-Cp)HfMe₂; (Me₄Cp-CH₂—SiMe₂Ph)(3-CH₂—SiMe₃-Cp)HfMe₂; (Me₄Cp-CH₂—SiMePh₂)(3-CH₂—SiMe₃-Cp)HfMe₂; (Me₄Cp-CH₂—SiPh₃)(3-CH₂—SiMe₃-Cp)HfMe₂; (Me₄Cp-CH₂—SiMe₂Cy)(3-CH₂—SiMe₃-Cp)HfMe₂; (Me₄Cp-CH₂—SiMeCy₂)(3-CH₂—SiMe₃-Cp)HfMe₂; (Me₄Cp-CH₂—SiCy₃)(3-CH₂—SiMe₃-Cp)HfMe₂; (EtMe₃Cp)(3-CH₂—SiMe₃-Cp)HfMe₂; (PrMe₃Cp)(3-CH₂—SiMe₃-Cp)HfMe₂; (BuMe₃Cp)(3-CH₂—SiMe₃-Cp)HfMe₂; (BzMe₃Cp)(3-CH₂—SiMe₃-Cp)HfMe₂; (Me₃Cp-CH₂—SiMe₃)(3-CH₂—SiMe₃-Cp)HfMe₂; (Me₃Cp-CH₂—SiMe₂Ph)(3-CH₂—SiPh₃-Cp)HfMe₂; (Me₃Cp-CH₂—SiMePh₂)(3-CH₂—SiMe₃-Cp)HfMe₂; (Me₃Cp-CH₂—SiPh₃)(3-CH₂—SiMe₃-Cp)HfMe₂; (Me₃Cp-CH₂—SiMe₂Cy)(3-CH₂—SiMe₃-Cp)HfMe₂; (Me₃Cp-CH₂—SiMeCy₂)(3-CH₂—SiMe₃-Cp)HfMe₂; (Me₃Cp-CH₂—SiCy₃)(3-CH₂—SiMe₃-Cp)HfMe₂; (MeEtCp)(3-CH₂—SiMe₃-Cp)HfMe₂; (MePrCp)(3-CH₂—SiMe₃-Cp)HfMe₂; MeBuCp)(3-CH₂—SiMe₃-Cp)HfMe₂; (BzMeCp)(3-CH₂—SiMe₃-Cp)HfMe₂; (EtPrCp)(3-CH₂—SiMe₃-Cp)HfMe₂; (EtBuCp)(3-CH₂—SiMe₃-Cp)HfMe₂; (BzEtCp)(3-CH₂—SiMe₃-Cp)HfMe₂; (PrBuCp)(3-CH₂—SiMe₃-Cp)HfMe₂; (BzPrCp)(3-CH₂—SiMe₃-Cp)HfMe₂; (BuBzCp)(3-CH₂—SiMe₃-Cp)HfMe₂; (Cp)(3-CH₂—SiMe₂Ph-Cp)HfMe₂; (MeCp)(3-CH₂—SiMe₂Ph-Cp)HfMe₂; (EtCp)(3-CH₂—SiMe₂Ph-Cp)HfMe₂; (PrCp)(3-CH₂—SiMe₂Ph-Cp)HfMe₂; (BuCp)(3-CH₂—SiMe₂Ph-Cp)HfMe₂; (BzCp)(3-CH₂—SiMe₂Ph-Cp)HfMe₂; (3-CH₂—SiMe₂Ph-Cp)₂HfMe₂; (Me₂Cp)(3-CH₂—SiMe₂Ph-Cp)HfMe₂; (Me₃Cp)(3-CH₂—SiMe₂Ph-Cp)HfMe₂; (Me₄Cp)(3-CH₂—SiMe₂Ph-Cp)HfMe₂; (Me₅Cp)(3-CH₂—SiMe₂Ph-Cp)HfMe₂; (Et₂Cp)(3-CH₂—SiMe₂Ph-Cp)HfMe₂; (Et₃Cp)(3-CH₂—SiMe₂Ph-Cp)HfMe₂; (Et₄Cp)(3-CH₂—SiMe₂Ph-Cp)HfMe₂; (Et₅Cp)(3-CH₂—SiMe₂Ph-Cp)HfMe₂; (Pr₂Cp)(3-CH₂—SiMe₂Ph-Cp)HfMe₂; (Pr₃Cp)(3-CH₂—SiMe₂Ph-Cp)HfMe₂; (Pr₄Cp)(3-CH₂—SiMe₂Ph-Cp)HfMe₂; (Pr₅Cp)(3-CH₂—SiMe₂Ph-Cp)HfMe₂; (Bu₂Cp)(3-CH₂—SiMe₂Ph-Cp)HfMe₂; (Bu₃Cp)(3-CH₂—SiMe₂Ph-Cp)HfMe₂; (Bu₄Cp)(3-CH₂—SiMe₂Ph-Cp)HfMe₂; (Bu₅Cp)(3-CH₂—SiMe₂Ph-Cp)HfMe₂; (Bz₂Cp)(3-CH₂—SiMe₂Ph-Cp)HfMe₂; (Bz₃Cp)(3-CH₂—SiMe₂Ph-Cp)HfMe₂; (Bz₄Cp)(3-CH₂—SiMe₂Ph-Cp)HfMe₂; (Bz₅Cp)(3-CH₂—SiMe₂Ph-Cp)HfMe₂; (EtMe₄Cp)(3-CH₂—SiMe₂Ph-Cp)HfMe₂; (PrMe₄Cp)(3-CH₂—SiMe₂Ph-Cp)HfMe₂; (BuMe₄Cp)(3-CH₂—SiMe₂Ph-Cp)HfMe₂; (BzMe₄Cp)(3-CH₂—SiMe₂Ph-Cp)HfMe₂; (Me₄Cp-CH₂—SiMe₃)(3-CH₂—SiMe₂Ph-Cp)HfMe₂; (Me₄Cp-CH₂—SiMe₂Ph)(3-CH₂—SiMe₂Ph-Cp)HfMe₂; (Me₄Cp-CH₂—SiMePh₂)(3-CH₂—SiMe₂Ph-Cp)HfMe₂; (Me₄Cp-CH₂—SiPh₃)(3-CH₂—SiMe₂Ph-Cp)HfMe₂; (Me₄Cp-CH₂—SiMe₂Cy)(3-CH₂—SiMe₂Ph-Cp)HfCl₂; (Me₄Cp-CH₂—SiMeCy₂)(3-CH₂—SiMe₂Ph-Cp)HfCl₂; (Me₄Cp-CH₂—SiCy₃)(3-CH₂—SiMe₂Ph-Cp)HfMe₂; (EtMe₃Cp)(3-CH₂—SiMe₂Ph-Cp)HfMe₂; (PrMe₃Cp)(3-CH₂—SiMe₂Ph-Cp)HfMe₂; (BuMe₃Cp)(3-CH₂—SiMe₂Ph-Cp)HfMe₂; (BzMe₃Cp)(3-CH₂—SiMe₂Ph-Cp)HfMe₂; (Me₃Cp-CH₂—SiMe₃)(3-CH₂—SiMe₂Ph-Cp)HfMe₂; (Me₃Cp-CH₂—SiMe₂Ph)(3-CH₂—SiMe₂Ph-Cp)HfMe₂; (Me₃Cp-CH₂—SiMePh₂)(3-CH₂—SiMe₂Ph-Cp)HfMe₂; (Me₃Cp-CH₂—SiPh₃)(3-CH₂—SiMe₂Ph-Cp)HfMe₂; (Me₃Cp-CH₂—SiMe₂Cy)(3-CH₂—SiMe₂Ph-Cp)HfMe₂; (Me₃Cp-CH₂—SiMeCy₂)(3-CH₂—SiMe₂Ph-Cp)HfMe₂; (Me₃Cp-CH₂—SiCy₃)(3-CH₂—SiMe₂Ph-Cp)HfMe₂; (MeEtCp)(3-CH₂—SiMe₂Ph-Cp)HfMe₂; (MePrCp)(3-CH₂—SiMe₂Ph-Cp)HfMe₂; (MeBuCp)(3-CH₂—SiMe₂Ph-Cp)HfMe₂; (BzMeCp)(3-CH₂—SiMe₂Ph-Cp)HfMe₂; (EtPrCp)(3-CH₂—SiMe₂Ph-Cp)HfMe₂; (EtBuCp)(3-CH₂—SiMe₂Ph-Cp)HfMe₂; (BzEtCp)(3-CH₂—SiMe₂Ph-Cp)HfMe₂; (PrBuCp)(3-CH₂—SiMe₂Ph-Cp)HfMe₂; (BzPrCp)(3-CH₂—SiMe₂Ph-Cp)HfMe₂; (BuBzCp)(3-CH₂—SiMe₂Ph-Cp)HfMe₂; (Cp)(3-CH₂—SiMePh₂-Cp)HfMe₂; (MeCp)(3-CH₂—SiMePh₂-Cp)HfMe₂; (EtCp)(3-CH₂—SiMePh₂-Cp)HfMe₂; (PrCp)(3-CH₂—SiMePh₂-Cp)HfMe₂; (BuCp)(3-CH₂—SiMePh₂-Cp)HfMe₂; ((BzCp)(3-CH₂—SiMePh₂-Cp)HfMe₂; (3-CH₂—SiMePh₂-Cp)₂HfMe₂; (Me₂Cp)(3-CH₂—SiMePh₂-Cp)HfMe₂; (Me₃Cp)(3-CH₂—SiMePh₂-Cp)HfMe₂; (Me₄Cp)(3-CH₂—SiMePh₂-Cp)HfMe₂; (Me₅Cp)(3-CH₂—SiMePh₂-Cp)HfMe₂; (Et₂Cp)(3-CH₂—SiMePh₂-Cp)HfMe₂; (Et₃Cp)(3-CH₂—SiMePh₂-Cp)HfMe₂; (Et₄Cp)(3-CH₂—SiMePh₂-Cp)HfMe₂; (Et₅Cp)(3-CH₂—SiMePh₂-Cp)HfMe₂; (Pr₂Cp)(3-CH₂—SiMePh₂-Cp)HfMe₂; (Pr₃Cp)(3-CH₂—SiMePh₂-Cp)HfMe₂; (Pr₄Cp)(3-CH₂—SiMePh₂-Cp)HfMe₂; (Pr₅Cp)(3-CH₂—SiMePh₂-Cp)HfMe₂; (Bu₂Cp)(3-CH₂—SiMePh₂-Cp)HfMe₂; (Bu₃Cp)(3-CH₂—SiMePh₂-Cp)HfMe₂; (Bu₄Cp)(3-CH₂—SiMePh₂-Cp)HfMe₂; (Bu₅Cp)(3-CH₂—SiMePh₂-Cp)HfMe₂; (Bz₂Cp)(3-CH₂—SiMePh₂-Cp)HfMe₂; (Bz₃Cp)(3-CH₂—SiMePh₂-Cp)HfMe₂; (Bz₄Cp)(3-CH₂—SiMePh₂-Cp)HfMe₂; (Bz₅Cp)(3-CH₂—SiMePh₂-Cp)HfMe₂; (EtMe₄Cp)(3-CH₂—SiMePh₂-Cp)HfMe₂; (PrMe₄Cp)(3-CH₂—SiMePh₂-Cp)HfMe₂; (BuMe₄Cp)(3-CH₂—SiMePh₂-Cp)HfMe₂; (PnMe₄Cp)(3-CH₂—SiMePh₂-Cp)HfMe₂; (HxMe₄Cp)(3-CH₂—SiMePh₂-Cp)HfMe₂; (BzMe₄Cp)(3-CH₂—SiMePh₂-Cp)HfMe₂; (Me₄Cp-CH₂—SiMe₃)(3-CH₂—SiMePh₂-Cp)HfMe₂; (Me₄Cp-CH₂—SiMe₂Ph)(3-CH₂—SiMePh₂-Cp)HfMe₂; (Me₄Cp-CH₂—SiMePh₂)(3-CH₂—SiMePh₂-Cp)HfMe₂; (Me₄Cp-CH₂—SiPh₃)(3-CH₂—SiMePh₂-Cp)HfMe₂; (Me₄Cp-CH₂—SiMe₂Cy)(3-CH₂—SiMePh₂-Cp)HfMe₂; (Me₄Cp-CH₂—SiMeCy₂)(3-CH₂—SiMePh₂-Cp)HfMe₂; (Me₄Cp-CH₂—SiCy₃)(3-CH₂—SiMePh₂-Cp)HfMe₂; (EtMe₃Cp)(3-CH₂—SiMePh₂-Cp)HfMe₂; (PrMe₃Cp)(3-CH₂—SiMePh₂-Cp)HfMe₂; (BuMe₃Cp)(3-CH₂—SiMePh₂-Cp)HfMe₂; (BzMe₃Cp)(3-CH₂—SiMePh₂-Cp)HfMe₂; (Me₃Cp-CH₂—SiMe₃)(3-CH₂—SiMePh₂-Cp)HfMe₂; (Me₃Cp-CH₂—SiMe₂Ph)(3-CH₂—SiMePh₂-Cp)HfMe₂; (Me₃Cp-CH₂—SiMePh₂)(3-CH₂—SiMePh₂-Cp)HfMe₂; (Me₃Cp-CH₂—SiPh₃)(3-CH₂—SiMePh₂-Cp)HfMe₂; (Me₃Cp-CH₂—SiMe₂Cy)(3-CH₂—SiMePh₂-Cp)HfMe₂; (Me₃Cp-CH₂—SiMeCy₂)(3-CH₂—SiMePh₂-Cp)HfMe₂; (Me₃Cp-CH₂—SiCy₃)(3-CH₂—SiMePh₂-Cp)HfMe₂; (MeEtCp)(3-CH₂—SiMePh₂-Cp)HfMe₂; (MePrCp)(3-CH₂—SiMePh₂-Cp)HfMe₂; (MeBuCp)(3-CH₂—SiMePh₂-Cp)HfMe₂; (BzMeCp)(3-CH₂—SiMePh₂-Cp)HfMe₂; (EtPrCp)(3-CH₂—SiMePh₂-Cp)HfMe₂; (EtBuCp)(3-CH₂—SiMePh₂-Cp)HfMe₂; (BzEtCp)(3-CH₂—SiMePh₂-Cp)HfMe₂; (PrBuCp)(3-CH₂—SiMePh₂-Cp)HfMe₂; (BzPrCp)(3-CH₂—SiMePh₂-Cp)HfMe₂; (BuBzCp)(3-CH₂—SiMePh₂-Cp)HfMe₂; (Cp)(3-CH₂—SiPh₃-Cp)HfMe₂; (MeCp)(3-CH₂—SiPh₃-Cp)HfMe₂; (EtCp)(3-CH₂—SiPh₃-Cp)HfMe₂; (PrCp)(3-CH₂—SiPh₃-Cp)HfMe₂; (BuCp)(3-CH₂—SiPh₃-Cp)HfMe₂; (BzCp)(3-CH₂—SiPh₃-Cp)HfMe₂; (3-CH₂—SiPh₃-Cp)₂HfMe₂; (Me₂Cp)(3-CH₂—SiPh₃-Cp)HfMe₂; (Me₃Cp)(3-CH₂—SiPh₃-Cp)HfMe₂; (Me₄Cp)(3-CH₂—SiPh₃-Cp)HfMe₂; (Me₅Cp)(3-CH₂—SiPh₃-Cp)HfMe₂; (Et₂Cp)(3-CH₂—SiPh₃-Cp)HfMe₂; (Et₃Cp)(3-CH₂—SiPh₃-Cp)HfMe₂; (Et₄Cp)(3-CH₂—SiPh₃-Cp)HfMe₂; (Et₅Cp)(3-CH₂—SiPh₃-Cp)HfMe₂; (Pr₂Cp)(3-CH₂—SiPh₃-Cp)HfMe₂; (Pr₃Cp)(3-CH₂—SiPh₃-Cp)HfMe₂;

(Pr₄Cp)(3-CH₂—SiPh₃-Cp)HfMe₂; (Pr₅Cp)(3-CH₂—SiPh₃-Cp)HfMe₂; (Bu₂Cp)(3-CH₂—SiPh₃-Cp)HfMe₂; (Bu₃Cp)(3-CH₂—SiPh₃-Cp)HfMe₂; (Bu₄Cp)(3-CH₂—SiPh₃-Cp)HfMe₂; (Bu₅Cp)(3-CH₂—SiPh₃-Cp)HfMe₂; (Bz₂Cp)(3-CH₂—SiPh₃-Cp)HfMe₂; (Bz₃Cp)(3-CH₂—SiPh₃-Cp)HfMe₂; (Bz₄Cp)(3-CH₂—SiPh₃-Cp)HfMe₂; (Bz₅Cp)(3-CH₂—SiPh₃-Cp)HfMe₂; (EtMe₄Cp)(3-CH₂—SiPh₃-Cp)HfMe₂; (PrMe₄Cp)(3-CH₂—SiPh₃-Cp)HfMe₂; (BuMe₄Cp)(3-CH₂—SiPh₃-Cp)HfMe₂; (BzMe₄Cp)(3-CH₂—SiPh₃-Cp)HfMe₂; (Me₄Cp-CH₂—SiMe₃)(3-CH₂—SiPh₃-Cp)HfMe₂; (Me₄Cp-CH₂—SiMe₂Ph)(3-CH₂—SiPh₃-Cp)HfMe₂; (Me₄Cp-CH₂—SiMePh₂)(3-CH₂—SiPh₃-Cp)HfMe₂; (Me₄Cp-CH₂—SiPh₃)(3-CH₂—SiPh₃-Cp)HfMe₂; (Me₄Cp-CH₂—SiMe₂Cy)(3-CH₂—SiPh₃-Cp)HfMe₂; (Me₄Cp-CH₂—SiMeCy₂)(3-CH₂—SiPh₃-Cp)HfMe₂; (Me₄Cp-CH₂—SiCy₃)(3-CH₂—SiPh₃-Cp)HfMe₂; (EtMe₃Cp)(3-CH₂—SiPh₃-Cp)HfMe₂; (PrMe₃Cp)(3-CH₂—SiPh₃-Cp)HfMe₂; (BuMe₃Cp)(3-CH₂—SiPh₃-Cp)HfMe₂; (BzMe₃Cp)(3-CH₂—SiPh₃-Cp)HfMe₂; (Me₃Cp-CH₂—SiMe₃)(3-CH₂—SiPh₃-Cp)HfMe₂; (Me₃Cp-CH₂—SiMe₂Ph)(3-CH₂—SiPh₃-Cp)HfMe₂; (Me₃Cp-CH₂—SiMePh₂)(3-CH₂—SiPh₃-Cp)HfMe₂; (Me₃Cp-CH₂—SiPh₃)(3-CH₂—SiPh₃-Cp)HfMe₂; (Me₃Cp-CH₂—SiMe₂Cy)(3-CH₂—SiPh₃-Cp)HfMe₂; (Me₃Cp-CH₂—SiMeCy₂)(3-CH₂—SiPh₃-Cp)HfMe₂; (Me₃Cp-CH₂—SiCy₃)(3-CH₂—SiPh₃-Cp)HfMe₂; (MeEtCp)(3-CH₂—SiPh₃-Cp)HfMe₂; (MePrCp)(3-CH₂—SiPh₃-Cp)HfMe₂; (MeBuCp)(3-CH₂—SiPh₃-Cp)HfMe₂; (BzMeCp)(3-CH₂—SiPh₃-Cp)HfMe₂; (EtPrCp)(3-CH₂—SiPh₃-Cp)HfMe₂; (EtBuCp)(3-CH₂—SiPh₃-Cp)HfMe₂; (BzEtCp)(3-CH₂—SiPh₃-Cp)HfMe₂; (PrBuCp)(3-CH₂—SiPh₃-Cp)HfMe₂; (BzPrCp)(3-CH₂—SiPh₃-Cp)HfMe₂; (BuBzCp)(3-CH₂—SiPh₃-Cp)HfMe₂; (Cp)(3-CH₂—SiCyMe₂-Cp)HfMe₂; (MeCp)(3-CH₂—SiCyMe₂-Cp)HfMe₂; (EtCp)(3-CH₂—SiCyMe₂-Cp)HfMe₂; (PrCp)(3-CH₂—SiCyMe₂-Cp)HfMe₂; (BuCp)(3-CH₂—SiCyMe₂-Cp)HfMe₂; (BzCp)(3-CH₂—SiCyMe₂-Cp)HfMe₂; (3-CH₂—SiCyMe₂-Cp)₂HfMe₂; (Me₂Cp)(3-CH₂—SiCyMe₂-Cp)HfMe₂; (Me₃Cp)(3-CH₂—SiCyMe₂-Cp)HfMe₂; (Me₄Cp)(3-CH₂—SiCyMe₂-Cp)HfMe₂; (Me₅Cp)(3-CH₂—SiCyMe₂-Cp)HfMe₂; (Et₂Cp)(3-CH₂—SiCyMe₂-Cp)HfMe₂; (Et₃Cp)(3-CH₂—SiCyMe₂-Cp)HfMe₂; (Et₄Cp)(3-CH₂—SiCyMe₂-Cp)HfMe₂; (Et₅Cp)(3-CH₂—SiCyMe₂-Cp)HfMe₂; (Pr₂Cp)(3-CH₂—SiCyMe₂-Cp)HfMe₂; (Pr₃Cp)(3-CH₂—SiCyMe₂-Cp)HfMe₂; (Pr₄Cp)(3-CH₂—SiCyMe₂-Cp)HfMe₂; (Pr₅Cp)(3-CH₂—SiCyMe₂-Cp)HfMe₂; (Bu₂Cp)(3-CH₂—SiCyMe₂-Cp)HfMe₂; (Bu₃Cp)(3-CH₂—SiCyMe₂-Cp)HfMe₂; (Bu₄Cp)(3-CH₂—SiCyMe₂-Cp)HfMe₂; (Bu₅Cp)(3-CH₂—SiCyMe₂-Cp)HfMe₂; (Bz₂Cp)(3-CH₂—SiCyMe₂-Cp)HfMe₂; (Bz₃Cp)(3-CH₂—SiCyMe₂-Cp)HfMe₂; (Bz₄Cp)(3-CH₂—SiCyMe₂-Cp)HfMe₂; (Bz₅Cp)(3-CH₂—SiCyMe₂-Cp)HfMe₂; (EtMe₄Cp)(3-CH₂—SiCyMe₂-Cp)HfMe₂; (PrMe₄Cp)(3-CH₂—SiCyMe₂-Cp)HfMe₂; (BuMe₄Cp)(3-CH₂—SiCyMe₂-Cp)HfMe₂; (BzMe₄Cp)(3-CH₂—SiCyMe₂-Cp)HfMe₂; (Me₄Cp-CH₂—SiMe₃)(3-CH₂—SiCyMe₂-Cp)HfMe₂; (Me₄Cp-CH₂—SiCyMe₂Ph)(3-CH₂—SiCyMe₂-Cp)HfMe₂; (Me₄Cp-CH₂—SiMePh₂)(3-CH₂—SiCyMe₂-Cp)HfMe₂; (Me₄Cp-CH₂—SiPh₃)(3-CH₂—SiCyMe₂-Cp)HfMe₂; (Me₄Cp-CH₂—SiMe₂Cy)(3-CH₂—SiCyMe₂-Cp)HfMe₂; (Me₄Cp-CH₂—SiMeCy₂)(3-CH₂—SiCyMe₂-Cp)HfMe₂; (Me₄Cp-CH₂—SiCy₃)(3-CH₂—SiCyMe₂-Cp)HfMe₂; (EtMe₃Cp)(3-CH₂—SiCyMe₂-Cp)HfMe₂; (PrMe₃Cp)(3-CH₂—SiCyMe₂-Cp)HfMe₂; (BuMe₃Cp)(3-CH₂—SiCyMe₂-Cp)HfMe₂; (BzMe₃Cp)(3-CH₂—SiCyMe₂-Cp)HfMe₂; (Me₃Cp-CH₂—SiMe₃)(3-CH₂—SiCyMe₂-Cp)HfMe₂; (Me₃Cp-CH₂—SiMe₂Ph)(3-CH₂—SiCyMe₂-Cp)HfMe₂; (Me₃Cp-CH₂—SiMePh₂)(3-CH₂—SiCyMe₂-Cp)HfMe₂; (Me₃Cp-CH₂—SiPh₃)(3-CH₂—SiCyMe₂-Cp)HfMe₂; (Me₃Cp-CH₂—SiMe₂Cy)(3-CH₂—SiCyMe₂-Cp)HfMe₂; (Me₃Cp-CH₂—SiMeCy₂)(3-CH₂—SiCyMe₂-Cp)HfMe₂; (Me₃Cp-CH₂—SiCy₃)(3-CH₂—SiCyMe₂-Cp)HfMe₂; (MeEtCp)(3-CH₂—SiCyMe₂-Cp)HfMe₂; (MePrCp)(3-CH₂—SiCyMe₂-Cp)HfMe₂; (MeBuCp)(3-CH₂—SiCyMe₂-Cp)HfMe₂; (BzMeCp)(3-CH₂—SiCyMe₂-Cp)HfMe₂; (EtPrCp)(3-CH₂—SiCyMe₂-Cp)HfMe₂; (EtBuCp)(3-CH₂—SiCyMe₂-Cp)HfMe₂; (BzEtCp)(3-CH₂—SiCyMe₂-Cp)HfMe₂; (PrBuCp)(3-CH₂—SiCyMe₂-Cp)HfMe₂; (BzPrCp)(3-CH₂—SiCyMe₂-Cp)HfMe₂; (BuBzCp)(3-CH₂—SiCyMe₂-Cp)HfMe₂; (Cp)(3-CH₂—SiCy₂Me-Cp)HfMe₂; (MeCp)(3-CH₂—SiCy₂Me-Cp)HfMe₂; (EtCp)(3-CH₂—SiCy₂Me-Cp)HfMe₂; (PrCp)(3-CH₂—SiCy₂Me-Cp)HfMe₂; (BuCp)(3-CH₂—SiCy₂Me-Cp)HfMe₂; (BzCp)(3-CH₂—SiCy₂Me-Cp)HfMe₂; (3-CH₂—SiCy₂Me-Cp)₂HfMe₂; (Me₂Cp)(3-CH₂—SiCy₂Me-Cp)HfMe₂; (Me₃Cp)(3-CH₂—SiCy₂Me-Cp)HfMe₂; (Me₄Cp)(3-CH₂—SiCy₂Me-Cp)HfMe₂; (Me₅Cp)(3-CH₂—SiCy₂Me-Cp)HfMe₂; (Et₂Cp)(3-CH₂—SiCy₂Me-Cp)HfMe₂; (Et₃Cp)(3-CH₂—SiCy₂Me-Cp)HfMe₂; (Et₄Cp)(3-CH₂—SiCy₂Me-Cp)HfMe₂; (Et₅Cp)(3-CH₂—SiCy₂Me-Cp)HfMe₂; (Pr₂Cp)(3-CH₂—SiCy₂Me-Cp)HfMe₂; (Pr₃Cp)(3-CH₂—SiCy₂Me-Cp)HfMe₂; (Pr₄Cp)(3-CH₂—SiCy₂Me-Cp)HfMe₂; (Pr₅Cp)(3-CH₂—SiCy₂Me-Cp)HfMe₂; (Bu₂Cp)(3-CH₂—SiCy₂Me-Cp)HfMe₂; (Bu₃Cp)(3-CH₂—SiCy₂Me-Cp)HfCl₂; (Bu₄Cp)(3-CH₂—SiCy₂Me-Cp)HfCl₂; (Bu₅Cp)(3-CH₂—SiCy₂Me-Cp)HfCl₂; (Bz₂Cp)(3-CH₂—SiCy₂Me-Cp)HfMe₂; (Bz₃Cp)(3-CH₂—SiCy₂Me-Cp)HfMe₂; (Bz₄Cp)(3-CH₂—SiCy₂Me-Cp)HfCl₂; (Bz₅Cp)(3-CH₂—SiCy₂Me-Cp)HfCl₂; (EtMe₄Cp)(3-CH₂—SiCy₂Me-Cp)HfCl₂; (PrMe₄Cp)(3-CH₂—SiCy₂Me-Cp)HfMe₂; (BuMe₄Cp)(3-CH₂—SiCy₂Me-Cp)HfMe₂; (BzMe₄Cp)(3-CH₂—SiCy₂Me-Cp)HfMe₂; (Me₄Cp-CH₂—SiMe₃)(3-CH₂—SiCy₂Me-Cp)HfMe₂; (Me₄Cp-CH₂—SiMe₂Ph)(3-CH₂—SiCy₂Me-Cp)HfMe₂; (Me₄Cp-CH₂—SiMePh₂)(3-CH₂—SiCy₂Me-Cp)HfMe₂; (Me₄Cp-CH₂—SiPh₃)(3-CH₂—SiCy₂Me-Cp)HfMe₂; (Me₄Cp-CH₂—SiMe₂Cy)(3-CH₂—SiCy₂Me-Cp)HfMe₂; (Me₄Cp-CH₂—SiMeCy₂)(3-CH₂—SiCy₂Me-Cp)HfMe₂; (Me₄Cp-CH₂—SiCy₃)(3-CH₂-Cy₂Me-Cp)HfMe₂; (EtMe₃Cp)(3-CH₂—SiCy₂Me-Cp)HfMe₂; (PrMe₃Cp)(3-CH₂—SiCy₂Me-Cp)HfMe₂; (BuMe₃Cp)(3-CH₂—SiCy₂Me-Cp)HfMe₂; (BzMe₃Cp)(3-CH₂—SiCy₂Me-Cp)HfMe₂; (Me₃Cp-CH₂—SiMe₃)(3-CH₂—SiCy₂Me-Cp)HfMe₂; (Me₃Cp-CH₂—SiMe₂Ph)(3-CH₂—SiCy₂Me-Cp)HfMe₂; (Me₃Cp-CH₂—SiMePh₂)(3-CH₂—SiCy₂Me-Cp)HfMe₂; (Me₃Cp-CH₂—SiPh₃)(3-CH₂—SiCy₂Me-Cp)HfMe₂; (Me₃Cp-CH₂—SiMe₂Cy)(3-CH₂—SiCy₂Me-Cp)HfMe₂; (Me₃Cp-CH₂—SiMeCy₂)(3-CH₂—SiCy₂Me-Cp)HfMe₂; (Me₃Cp-CH₂—SiCy₃)(3-CH₂—SiCy₂Me-Cp)HfMe₂; (MeEtCp)(3-CH₂—SiCy₂Me-Cp)HfMe₂; (MePrCp)(3-CH₂—SiCy₂Me-Cp)HfMe₂; (MeBuCp)(3-CH₂—SiCy₂Me-Cp)HfMe₂; (BzMeCp)(3-CH₂—SiCy₂Me-Cp)HfMe₂; (EtPrCp)(3-CH₂—SiCy₂Me-Cp)HfMe₂; (EtBuCp)(3-CH₂—SiCy₂Me-Cp)HfMe₂; (BzEtCp)(3-CH₂—SiCy₂Me-Cp)HfMe₂; (PrBuCp)(3-CH₂—SiCy₂Me-Cp)HfMe₂; (BzPrCp)(3-CH₂—SiCy₂Me-Cp)HfMe₂; (BuBzCp)(3-CH₂—SiCy₂Me-Cp)HfMe₂; (Cp)(3-CH₂—SiCy₃-Cp)HfMe₂; (MeCp)(3-CH₂—SiCy₃-Cp)HfMe₂; (EtCp)(3-CH₂—SiCy₃-Cp)HfMe₂; (PrCp)(3-CH₂—SiCy₃-Cp)HfMe₂; (BuCp)(3-CH₂—SiCy₃-Cp)HfMe₂ (BzCp)(3-CH₂—SiCy₃-Cp)HfMe₂; (3-CH₂—SiCy₃-Cp)₂HfMe₂; (Me₂Cp)(3-CH₂—SiCy₃-Cp)HfMe₂; (Me₃Cp)(3-CH₂—SiCy₃-Cp)HfMe₂; (Me₄Cp)(3-CH₂—SiCy₃-Cp)HfMe₂; (Me₅Cp)(3-CH₂—SiCy₃-Cp)HfMe₂; (Et₂Cp)(3-CH₂—SiCy₃-Cp)HfMe₂; (Et₃Cp)(3-CH₂—SiCy₃-Cp)HfMe₂; (Et₄Cp)(3-CH₂—SiCy₃-Cp)HfMe₂; (Et₅Cp)(3-

CH$_2$—SiCy$_3$-Cp)HfMe$_2$; (Pr$_2$Cp)(3-CH$_2$—SiCy$_3$-Cp)HfMe$_2$; (Pr$_3$Cp)(3-CH$_2$—SiCy$_3$-Cp)HfMe$_2$; (Pr$_4$Cp)(3-CH$_2$—SiCy$_3$-Cp)HfMe$_2$; (Pr$_5$Cp)(3-CH$_2$—SiCy$_3$-Cp)HfMe$_2$; (Bu$_2$Cp)(3-CH$_2$—SiCy$_3$-Cp)HfMe$_2$; (Bu$_3$Cp)(3-CH$_2$—SiCy$_3$-Cp)HfMe$_2$; (Bu$_4$Cp)(3-CH$_2$—SiCy$_3$-Cp)HfMe$_2$; (Bu$_5$Cp)(3-CH$_2$—SiCy$_3$-Cp)HfMe$_2$; (Bz$_2$Cp)(3-CH$_2$—SiCy$_3$-Cp)HfMe$_2$; (Bz$_3$Cp)(3-CH$_2$—SiCy$_3$-Cp)HfMe$_2$; (Bz$_4$Cp)(3-CH$_2$—SiCy$_3$-Cp)HfMe$_2$; (Bz$_5$Cp)(3-CH$_2$—SiCy$_3$-Cp)HfMe$_2$; (EtMe$_4$Cp)(3-CH$_2$—SiCy$_3$-Cp)HfMe$_2$; (PrMe$_4$Cp)(3-CH$_2$—SiCy$_3$-Cp)HfMe$_2$; (BuMe$_4$Cp)(3-CH$_2$—SiCy$_3$-Cp)HfMe$_2$; (BzMe$_4$Cp)(3-CH$_2$—SiCy$_3$-Cp)HfMe$_2$; (Me$_4$Cp-CH$_2$—SiMe$_3$)(3-CH$_2$—SiCy$_3$-Cp)HfMe$_2$; (Me$_4$Cp-CH$_2$—SiMe$_2$Ph)(3-CH$_2$—SiCy$_3$-Cp)HfMe$_2$; (Me$_4$Cp-CH$_2$—SiMePh$_2$)(3-CH$_2$—SiCy$_3$-Cp)HfMe$_2$; (Me$_4$Cp-CH$_2$—SiPh$_3$)(3-CH$_2$—SiCy$_3$-Cp)HfMe$_2$; (Me$_4$Cp-CH$_2$—SiMe$_2$Cy)(3-CH$_2$—SiCy$_3$-Cp)HfMe$_2$; (Me$_4$Cp-CH$_2$—SiMeCy$_2$)(3-CH$_2$—SiCy$_3$-Cp)HfMe$_2$; (Me$_4$Cp-CH$_2$—SiCy$_3$)(3-CH$_2$—SiCy$_3$-Cp)HfMe$_2$; (EtMe$_3$Cp)(3-CH$_2$—SiCy$_3$-Cp)HfMe$_2$; (PrMe$_3$Cp)(3-CH$_2$—SiCy$_3$-Cp)HfMe$_2$; (BuMe$_3$Cp)(3-CH$_2$—SiCy$_3$-Cp)HfMe$_2$; (BzMe$_3$Cp)(3-CH$_2$—SiCy$_3$-Cp)HfMe$_2$; (Me$_3$Cp-CH$_2$—SiMe$_3$)(3-CH$_2$—SiCy$_3$-Cp)HfMe$_2$; (Me$_3$Cp-CH$_2$—SiMe$_2$Ph)(3-CH$_2$—SiCy$_3$-Cp)HfMe$_2$; (Me$_3$Cp-CH$_2$—SiMePh$_2$)(3-CH$_2$—SiCy$_3$-Cp)HfMe$_2$; (Me$_3$Cp-CH$_2$—SiPh$_3$)(3-CH$_2$—SiCy$_3$-Cp)HfMe$_2$; (Me$_3$Cp-CH$_2$—SiMe$_2$Cy)(3-CH$_2$—SiCy$_3$-Cp)HfMe$_2$; (Me$_3$Cp-CH$_2$—SiMeCy$_2$)(3-CH$_2$—SiCy$_3$-Cp)HfMe$_2$; (Me$_3$Cp-CH$_2$—SiCy$_3$)(3-CH$_2$—SiCy$_3$-Cp)HfMe$_2$; (MeEtCp)(3-CH$_2$—SiCy$_3$-Cp)HfMe$_2$; (MePrCp)(3-CH$_2$—SiCy$_3$-Cp)HfMe$_2$; (MeBuCp)(3-CH$_2$—SiCy$_3$-Cp)HfMe$_2$; (BzMeCp)(3-CH$_2$—SiCy$_3$-Cp)HfMe$_2$; (EtPrCp)(3-CH$_2$—SiPCy-Cp)HfMe$_2$; (EtBuCp)(3-CH$_2$—SiCy$_3$-Cp)HfMe$_2$; (BzEtCp)(3-CH$_2$—SiCy$_3$-Cp)HfMe$_2$; (PrBuCp)(3-CH$_2$—SiCy$_3$-Cp)HfMe$_2$; (BzPrCp)(3-CH$_2$—SiCy$_3$-Cp)HfMe$_2$; (BuBzCp)(3-CH$_2$—SiCy$_3$-Cp)HfMe$_2$; (2-Me, 3-CH$_2$—SiMe$_3$-Ind)$_2$HfMe$_2$; (2-Et, 3-CH$_2$—SiMe$_3$-Ind)$_2$HfMe$_2$; (2-Pr, 3-CH$_2$—SiMe$_3$-Ind)$_2$HfMe$_2$; (2-Bu, 3-CH$_2$—SiMe$_3$-Ind)$_2$HfMe$_2$; (2-Ph, 3-CH$_2$—SiMe$_3$-Ind)$_2$HfMe$_2$; (2-Bz, 3-CH$_2$—SiMe$_3$-Ind)$_2$HfMe$_2$; (2-Me, 3-CH$_2$—SiMe$_2$Ph-Ind)$_2$HfMe$_2$; (2-Et, 3-CH$_2$—SiMe$_2$Ph-Ind)$_2$HfMe$_2$; (2-Pr, 3-CH$_2$—SiMe$_2$Ph-Ind)$_2$HfMe$_2$; (2-Bu, 3-CH$_2$—SiMe$_2$Ph-Ind)$_2$HfMe$_2$; (2-Ph, 3-CH$_2$—SiMe$_2$Ph-Ind)$_2$HfMe$_2$; (2-Bz, 3-CH$_2$—SiMe$_2$Ph-Ind)$_2$HfMe$_2$; (2-Me, 3-CH$_2$—SiMePh$_2$-Ind)$_2$HfMe$_2$; (2-Et, 3-CH$_2$—SiMePh$_2$-Ind)$_2$HfMe$_2$; (2-Pr, 3-CH$_2$—SiMePh$_2$-Ind)$_2$HfMe$_2$; (2-Bu, 3-CH$_2$—SiMePh$_2$-Ind)$_2$HfMe$_2$; (2-Ph, 3-CH$_2$—SiMePh$_2$-Ind)$_2$HfMe$_2$; (2-Bz, 3-CH$_2$—SiMePh$_2$-Ind)$_2$HfMe$_2$; (2-Me, 3-CH$_2$—SiPh$_3$-Ind)$_2$HfMe$_2$; (2-Et, 3-CH$_2$—SiPh$_3$-Ind)$_2$HfMe$_2$; (2-Pr, 3-CH$_2$—SiPh$_3$-Ind)$_2$HfMe$_2$; (2-Bu, 3-CH$_2$—SiPh$_3$-Ind)$_2$HfMe$_2$; (2-Ph, 3-CH$_2$—SiPh$_3$-Ind)$_2$HfMe$_2$; (2-Bz, 3-CH$_2$—SiPh$_3$-Ind)$_2$HfMe$_2$; (2-Me, 3-CH$_2$—SiCyMe$_2$-Ind)$_2$HfMe$_2$; (2-Et, 3-CH$_2$—SiCyMe$_2$-Ind)$_2$HfMe$_2$; (2-Pr, 3-CH$_2$—SiCyMe$_2$-Ind)$_2$HfMe$_2$; (2-Bu, 3-CH$_2$—SiCyMe$_2$-Ind)$_2$HfMe$_2$; (2-Ph, 3-CH$_2$—SiCyMe$_2$-Ind)$_2$HfMe$_2$; (2-Bz, 3-CH$_2$—SiCyMe$_2$-Ind)$_2$HfMe$_2$; (2-Me, 3-CH$_2$—SiCy$_2$Me-Ind)$_2$HfMe$_2$; (2-Et, 3-CH$_2$—SiCy$_2$Me-Ind)$_2$HfMe$_2$; (2-Pr, 3-CH$_2$—SiCy$_2$Me-Ind)$_2$HfMe$_2$; (2-Bu, 3-CH$_2$—SiCy$_2$Me-Ind)$_2$HfMe$_2$; (2-Ph, 3-CH$_2$—SiCy$_2$Me-Ind)$_2$HfMe$_2$; (2-Bz, 3-CH$_2$—SiCy$_2$Me-Ind)$_2$HfMe$_2$; (2-Me, 3-CH$_2$—SiCy$_3$-Ind)$_2$HfMe$_2$; (2-Et, 3-CH$_2$—SiCy$_3$-Ind)$_2$HfMe$_2$; (2-Pr, 3-CH$_2$—SiCy$_3$-Ind)$_2$HfMe$_2$; (2-Bu, 3-CH$_2$—SiCy$_3$-Ind)$_2$HfMe$_2$; (2-Ph, 3-CH$_2$—SiCy$_3$-Ind)$_2$HfMe$_2$; (2-Bz, 3-CH$_2$—SiCy$_3$-Ind)$_2$HfMe$_2$; (2-Me, 3-CH$_2$—SiMe$_3$-Ind)(3-CH$_2$—SiMe$_3$-Cp)HfMe$_2$; (2-Et, 3-CH$_2$—SiMe$_3$-Ind)(3-CH$_2$—SiMe$_3$-Cp)HfMe$_2$; (2-Pr, 3-CH$_2$—SiMe$_3$-Ind)(3-CH$_2$—SiMe$_3$-Cp)HfMe$_2$; (2-Bu, 3-CH$_2$—SiMe$_3$-Ind)(3-CH$_2$—SiMe$_3$-Cp)HfMe$_2$; (2-Pn, 3-CH$_2$—SiMe$_3$-Ind)(3-CH$_2$—SiMe$_3$-Cp)HfMe$_2$; (2-Hx, 3-CH$_2$—SiMe$_3$-Ind)(3-CH$_2$—SiMe$_3$-Cp)HfMe$_2$; (2-Ph, 3-CH$_2$—SiMe$_3$-Ind)(3-CH$_2$—SiMe$_3$-Cp)HfMe$_2$; (2-Me, 3-CH$_2$—SiMe$_2$Ph-Ind)(3-CH$_2$—SiMe$_3$-Cp)HfMe$_2$; (2-Et, 3-CH$_2$—SiMe$_2$Ph-Ind)(3-CH$_2$—SiMe$_3$-Cp)HfMe$_2$; (2-Pr, 3-CH$_2$—SiMe$_2$Ph-Ind)(3-CH$_2$—SiMe$_3$-Cp)HfMe$_2$; (2-Bu, 3-CH$_2$—SiMe$_2$Ph-Ind)(3-CH$_2$—SiMe$_3$-Cp)HfMe$_2$; (2-Pn, 3-CH$_2$—SiMe$_2$Ph-Ind)(3-CH$_2$—SiMe$_2$Ph-Cp)HfMe$_2$; (2-Hx, 3-CH$_2$—SiMe$_2$Ph-Ind)(3-CH$_2$—SiMe$_3$-Cp)HfMe$_2$; (2-Ph, 3-CH$_2$—SiMe$_2$Ph-Ind)(3-CH$_2$—SiMe$_3$-Cp)HfMe$_2$; (2-Me, 3-CH$_2$—SiMePh$_2$-Ind)(3-CH$_2$—SiMe$_3$-Cp)HfMe$_2$; (2-Et, 3-CH$_2$—SiMePh$_2$-Ind)(3-CH$_2$—SiMe$_3$-Cp)HfMe$_2$; (2-Pr, 3-CH$_2$—SiMePh$_2$-Ind)(3-CH$_2$—SiMe$_3$-Cp)HfMe$_2$; (2-Bu, 3-CH$_2$—SiMePh$_2$-Ind)(3-CH$_2$—SiMe$_3$-Cp)HfMe$_2$; (2-Pn, 3-CH$_2$—SiMePh$_2$-Ind)(3-CH$_2$—SiMe$_2$Ph-Cp)HfMe$_2$; (2-Hx, 3-CH$_2$—SiMePh$_2$-Ind)(3-CH$_2$—SiMe$_3$-Cp)HfMe$_2$; (2-Ph, 3-CH$_2$—SiMePh$_2$-Ind)(3-CH$_2$—SiMe$_3$-Cp)HfMe$_2$; (2-Me, 3-CH$_2$—SiPh$_3$-Ind)(3-CH$_2$—SiMe$_3$-Cp)HfMe$_2$; (2-Et, 3-CH$_2$—SiPh$_3$-Ind)(3-CH$_2$—SiMe$_3$-Cp)HfMe$_2$; (2-Pr, 3-CH$_2$—SiPh$_3$-Ind)(3-CH$_2$—SiMe$_3$-Cp)HfMe$_2$; (2-Bu, 3-CH$_2$—SiPh$_3$-Ind)(3-CH$_2$—SiMe$_3$-Cp)HfMe$_2$; (2-Pn, 3-CH$_2$—SiPh$_3$-Ind)(3-CH$_2$—SiMe$_2$Ph-Cp)HfMe$_2$; (2-Hx, 3-CH$_2$—SiPh$_3$-Ind)(3-CH$_2$—SiMe$_3$-Cp)HfMe$_2$; (2-Ph, 3-CH$_2$—Si Ph$_3$-Ind)(3-CH$_2$—SiMe$_3$-Cp)HfMe$_2$; (2-Me, 3-CH$_2$—SiCyMe$_2$-Ind)(3-CH$_2$—SiMe$_3$-Cp)HfMe$_2$; (2-Et, 3-CH$_2$—SiCyMe$_2$-Ind)(3-CH$_2$—SiMe$_3$-Cp)HfMe$_2$; (2-Pr, 3-CH$_2$—SiCyMe$_2$-Ind)(3-CH$_2$—SiMe$_3$-Cp)HfMe$_2$; (2-Bu, 3-CH$_2$—SiCyMe$_2$-Ind)(3-CH$_2$—SiMe$_3$-Cp)HfMe$_2$; (2-Pn, 3-CH$_2$—SiCyMe$_2$-Ind)(3-CH$_2$—SiMe$_2$Ph-Cp)HfMe$_2$; (2-Hx, 3-CH$_2$—SiCyMe$_2$-Ind)(3-CH$_2$—SiMe$_3$-Cp)HfMe$_2$; (2-Ph, 3-CH$_2$—SiCyMe$_2$-Ind)(3-CH$_2$—SiMe$_3$-Cp)HfMe$_2$, and the alkyl or halide versions thereof where the Me$_2$ is replaced with Bz$_2$, Et$_2$, Ph$_2$, Cl$_2$, Br$_2$ or I$_2$.

The Second Unbridged Metallocene

Unbridged zirconium metallocenes useful herein are further represented by the formula (C):

$$Cp_mZrX'_q \quad (C)$$

wherein each Cp is independently a cyclopentadienyl group (such as cyclopentadiene, indene or fluorene) which may be substituted or unsubstituted, X' is a leaving group (such as a halide, a hydride, an alkyl group, an alkenyl group or an arylalkyl group), and m=1 or 2, n=0, 1, 2 or 3, q=0, 1, 2, or 3, and the sum of m+q is equal to the oxidation state of the transition metal, preferably 3 or 4, preferably 4. In some embodiments, m is 2.

In an embodiment each X' may be independently a halide, a hydride, an alkyl group, an alkenyl group or an arylalkyl group.

Alternatively, each X' is independently selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof, (two X's may form a part of a fused ring or a ring system), preferably each X' is independently selected from halides, aryls and $C_1$ to $C_5$ alkyl groups, preferably each X' is a phenyl, methyl, ethyl, propyl, butyl, pentyl, or chloro group.

Typically, each Cp is independently a substituted or unsubstituted cyclopentadiene, a substituted or unsubstituted indene, or a substituted or unsubstituted fluorene.

Independently, each Cp may be substituted with a combination of substituent groups R.

Non-limiting examples of substituent groups R include one or more from the group selected from hydrogen, or linear, branched alkyl radicals, or alkenyl radicals, alkynyl radicals, cycloalkyl radicals or aryl radicals, acyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example, tertiary butyl, isopropyl and the like. Other hydrocarbyl radicals include fluoromethyl, fluoroethyl, difluoroethyl, iodopropyl, bromohexyl chlorobenzyl, and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methylbis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide, and ethylsulfide. Non-hydrogen substituents R include the atoms carbon, silicon, boron, aluminum, nitrogen, phosphorus, oxygen, tin, sulfur, germanium and the like, including olefins such as, but not limited to, olefinically unsaturated substituents including vinyl-terminated ligands, for example but-3-enyl, prop-2-enyl, hex-5-enyl, and the like. Also, at least two R groups, preferably two adjacent R groups, may be joined to form a ring structure having from 3 to 30 atoms selected from carbon, nitrogen, oxygen, phosphorus, silicon, germanium, aluminum, boron, or a combination thereof.

In an embodiment of Cp, the substituent(s) R are independently hydrocarbyl groups, heteroatoms, or heteroatom containing groups, such as methyl, ethyl, propyl, butyl, pentyl, hexyl, heptyl, octyl, nonyl, decyl, undecyl, dodecyl or an isomer thereof, N, O, S, P, or a $C_1$ to $C_{20}$ hydrocarbyl substituted with an N, O, S or P heteroatom or heteroatom containing group (typically having up to 12 atoms, including the N, O, S, and P heteroatoms).

Non-limiting examples of Cp include (substituted or unsubstituted) cyclopentadienyl, cyclopentaphenanthreneyl, indenyl, benzindenyl, fluorenyl, octahydrofluorenyl, cyclooctatetraenyl, cyclopentacyclododecene, azenyl, azulene, pentalene, phosphoyl, phosphinimine (WO 99/40125), pyrrolyl, pyrazolyl, carbazolyl, borabenzene, and the like, including hydrogenated versions thereof, for example tetrahydroindenyl. In another embodiment, each Cp may, independently comprise one or more heteroatoms, for example, nitrogen, silicon, boron, germanium, sulfur and phosphorus, in combination with carbon atoms to form an open, acyclic, or preferably a fused, ring or ring system, for example, a heterocyclopentadienyl ancillary ligand. Other Cp ligands include but are not limited to porphyrins, phthalocyanines, corrins, and other polyazamacrocycles.

In another aspect, the unbridged metallocene catalyst component is represented by the formula (D):

 (D)

wherein X and q are as described above, preferably q is 1 or 2, and each $Cp^A$ and $Cp^B$ in formula (D) is independently as defined for Cp above and may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (D) may be unsubstituted or substituted with any one or combination of substituent groups R. Non-limiting examples of substituent groups R as used in structure (D) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

Preferable examples of alkyl substituents R associated with formula (D) include methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl, and the like; and halocarbyl-substituted organometalloid radicals including tris(trifluoromethyl)silyl, methylbis(difluoromethyl)silyl, bromomethyldimethylgermyl, and the like; and disubstituted boron radicals including dimethylboron, for example; and disubstituted Group 15 radicals including dimethylamine, dimethylphosphine, diphenylamine, methylphenylphosphine, Group 16 radicals including methoxy, ethoxy, propoxy, phenoxy, methylsulfide, and ethylsulfide. Other substituents R include olefins such as, but not limited to, olefinically unsaturated substituents including vinyl-terminated ligands, for example, 3-butenyl, 2-propenyl, 5-hexenyl, and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron, and combinations thereof. Also, a substituent group R, such as 1-butanyl, may form a bonding association to the element M.

The ligands $Cp^A$ and $Cp^B$ of formula (D) are different from each other in one embodiment, and the same in another embodiment.

It is contemplated that the metallocene catalyst components described above include their structural or optical or enantiomeric isomers (racemic mixture), and may be a pure enantiomer in one embodiment.

The unbridged metallocene catalyst component may comprise any combination of any embodiments described herein.

Suitable unbridged metallocenes useful herein include, but are not limited to, the metallocenes disclosed and referenced in the US patents cited above, as well as those disclosed and referenced in U.S. Pat. Nos. 7,179,876; 7,169, 864; 7,157,531; 7,129,302; 6,995,109; 6,958,306; 6,884, 748; 6,689,847; U.S. Patent Publication No. 2007/0055028, and published PCT Application Nos. WO 97/22635; WO 00/699/22; WO 01/30860; WO 01/30861; WO 02/46246; WO 02/50088; WO 04/026921; and WO 06/019494, all fully incorporated herein by reference. Additional catalysts suitable for use herein include those referenced in U.S. Pat. Nos. 6,309,997; 6,265,338; U.S. Patent Publication No. 2006/019925, and the following articles: Chem Rev 2000, 100, 1253; Resconi; Chem Rev 2003, 103, 283; Chem Eur. J. 2006, 12, 7546 Mitsui; J Mol Catal A 2004, 213, 141; Macromol Chem Phys, 2005, 206, 1847; and J Am Chem Soc 2001, 123, 6847.

Exemplary unbridged metallocene compounds represented by formula (B) include: bis(cyclopentadienyl)zirconium dichloride; bis(cyclopentadienyl)zirconium dimethyl; bis(n-butylcyclopentadienyl)zirconium dichloride; bis(n-butylcyclopentadienyl)zirconium dimethyl; bis(pentamethylcyclopentadienyl)zirconium dichloride; bis(pentamethylcyclopentadienyl)zirconium dimethyl; bis (pentamethylcyclopentadienyl)hafnium dichloride; bis (pentamethylcyclopentadienyl)zirconium dimethyl; bis(1-methyl-3-n-butylcyclopentadienyl)zirconium dichloride; bis (1-methyl-3-n-butylcyclopentadienyl)zirconium dimethyl; bis(1-methyl-3-phenylcyclopentadienyl)zirconium dichloride; bis(1-methyl-3-phenylcyclopentadienyl)zirconium dimethyl; bis(1-methyl-3-n-butylcyclopentadienyl)hafnium dichloride; bis(1-methyl-3-n-butylcyclopentadienyl)zirconium dimethyl; bis(indenyl)zirconium dichloride; bis(indenyl)zirconium dimethyl; bis(tetrahydro-1-indenyl)zirconium dichloride; bis(tetrahydro-1-indenyl)zirconium dimethyl; (n-propyl cyclopentadienyl)(pentamethyl cyclopentadienyl)zirconium dichloride; (n-propyl cyclopentadienyl)(pentamethyl cyclopentadienyl)zirconium dimethyl; rac/meso-bis(1-ethylindenyl)zirconium dichloride; rac/meso-bis(1-ethylindenyl)zirconium dimethyl; rac/meso-bis(1-methylindenyl)zirconium dichloride; rac/meso-bis(1-methylindenyl)zirconium dimethyl; rac/meso-bis(1-propylindenyl)zirconium dichloride; rac/meso-bis(1-propylindenyl)zirconium dimethyl; rac/meso-bis(1-butylindenyl)zirconium dichloride; rac/meso-bis(1-butylindenyl)zirconium dimethyl; meso-bis(1-ethylindenyl) zirconium dichloride; meso-bis(1ethylindenyl) zirconium dimethyl; (1-methylindenyl)(pentamethyl cyclopentadienyl) zirconium dichloride; and (1-methylindenyl)(pentamethyl cyclopentadienyl) zirconium dimethyl and the alkyl or halide versions thereof where the $Me_2$ or $Cl_2$ in the list above is replaced with $Bz_2$, $Et_2$, $Ph_2$, $Br_2$ or $I_2$.

Preferred unbridged metallocene compounds useful herein are include: bis(cyclopentadienyl)zirconium dichloride; bis(n-butylcyclopentadienyl)zirconium dichloride; bis (n-butylcyclopentadienyl)zirconium dimethyl; bis(pentamethylcyclopentadienyl)zirconium dichloride; bis (pentamethylcyclopentadienyl)zirconium dimethyl; bis (pentamethylcyclopentadienyl)hafnium dichloride; bis (pentamethylcyclopentadienyl)zirconium dimethyl; bis(1-methyl-3-n-butylcyclopentadienyl)zirconium dichloride; bis (1-methyl-3-n-butylcyclopentadienyl)zirconium dimethyl; bis(1-methyl-3-n-butylcyclopentadienyl)hafnium dichloride; bis(1-methyl-3-n-butylcyclopentadienyl)zirconium dimethyl; bis(indenyl)zirconium dichloride, bis(indenyl)zirconium dimethyl; bis(tetrahydro-1-indenyl)zirconium dichloride; bis(tetrahydro-1-indenyl)zirconium dimethyl; (n-propyl cyclopentadienyl)(pentamethyl cyclopentadienyl) zirconium dichloride; (n-propyl cyclopentadienyl)(pentamethyl cyclopentadienyl)zirconium dimethyl; rac/meso-bis(1-ethylindenyl)zirconium dichloride; rac/meso-bis(1-methylindenyl)zirconium dichloride; rac/meso-bis(1-propylindenyl)zirconium dichloride; meso-bis (1ethylindenyl) zirconium dichloride, and (1-methylindenyl)(pentamethyl cyclopentadienyl)zirconium dichloride, and the alkyl or halide versions thereof where the $Me_2$ or $Cl_2$ in the list above is replaced with $Bz_2$, $Et_2$, $Ph_2$, $Br_2$, or $I_2$.

Support Material

In embodiments of the present invention, the catalyst systems comprise a support material. Preferably, the support material is a porous support material, for example, talc, and inorganic oxides. Other support materials include zeolites, clays, organoclays, or any other organic or inorganic support material, or mixtures thereof. As used herein, "support" and "support material" are used interchangeably.

Preferably, the support material is an inorganic oxide in a finely divided form. Suitable inorganic oxide materials for use in the supported catalyst systems herein include Groups 2, 4, 13, and 14 metal oxides such as silica, alumina, and mixtures thereof. Other inorganic oxides that may be employed, either alone or in combination, with the silica or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably, $SiO_2$, $Al_2O_3$, or $SiO_2/Al_2O_3$.

It is preferred that the support material, most preferably, an inorganic oxide, has a surface area in the range of from about 10 $m^2/g$ to about 700 $m^2/g$, pore volume in the range of from about 0.1 cc/g to about 4.0 cc/g, and average particle size in the range of from about 5 m to about 500 m. More preferably, the surface area of the support material is in the range of from about 50 $m^2/g$ to about 500 $m^2/g$, pore volume of from about 0.5 cc/g to about 3.5 cc/g, and average particle size of from about 10 m to about 200 m. Most preferably, the surface area of the support material is in the range of from about 100 $m^2/g$ to about 400 $m^2/g$, pore volume from about 0.8 cc/g to about 3.0 cc/g, and average particle size is from about 5 m to about 100 μm. The average pore size of the support material can be from 10 to 1,000 Å, preferably, 50 to about 500 Å, and most preferably, 75 to about 350 Å. In some embodiments, the support material is a high surface area, amorphous silica (surface area ≥300 $m^2/gm$, pore volume ≥1.65 $cm^3/gm$), and is marketed under the tradenames of DAVISON 952 or DAVISON 955 by the Davison Chemical Division of W. R. Grace and Company, are particularly useful. In other embodiments, DAVIDSON 948 is used.

In some embodiments of the present invention, the support material may be dry, that is, free of absorbed water. Drying of the support material can be achieved by heating or calcining at about 100° C. to about 1000° C., preferably, at least about 600° C. When the support material is silica, it is typically heated to at least 200° C., preferably, about 200° C. to about 850° C., and most preferably, at about 600° C.; and for a time of about 1 minute to about 100 hours, from about 12 hours to about 72 hours, or from about 24 hours to about 60 hours. The calcined support material, preferably, has at least some reactive hydroxyl (OH) groups.

In a particularly useful embodiment, the support material is fluorided. Fluoriding agent containing compounds may be any compound containing a fluorine atom. Particularly desirable are inorganic fluorine containing compounds are selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF5$, $IF_7$, $NF_3$, $HF$, $BF_3$, $NHF_2$ and $NH_4HF_2$. Of these, ammonium hexafluorosilicate and ammonium tetrafluoroborate are useful. Combinations of these compounds may also be used.

Ammonium hexafluorosilicate and ammonium tetrafluoroborate fluorine compounds are typically solid particulates as are the silicon dioxide supports. A desirable method of treating the support with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to a vessel for dehydration or calcining the support. Accordingly, the fluorine concentration present on the support is in the range of from 0.1 to 25 wt %, alternatively from 0.19 to 19 wt %, alternatively from 0.6 to 3.5 wt %, based upon the weight of the support.

The above two metal catalyst components described herein are generally deposited on the support material at a loading level of 10-100 micromoles of metal per gram of solid support; alternatively 20-80 micromoles of metal per gram of solid support; or 40-60 micromoles of metal per gram of support. But greater or lesser values may be used provided that the total amount of solid complex does not exceed the support's pore volume.

In at least one embodiment, the support material comprises a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

The electron-withdrawing component used to treat the support material can be any component that increases the Lewis or Brønsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, and the like, or any combination thereof, at least one embodiment of this invention. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present invention can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In at least one embodiment, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, any of these activator-supports optionally can be treated with a metal ion.

Non-limiting examples of cations suitable for use in the present disclosure in the salt of the electron-withdrawing anion include ammonium, trialkyl ammonium, tetraalkyl ammonium, tetraalkyl phosphonium, H+, $[H(OEt_2)_2]$+, or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in at least one embodiment, two or more electron-withdrawing anion source compounds in two or more separate contacting steps.

In one embodiment of the present invention, one example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, typically a salt or an acid of an electron-withdrawing anion, can include, but is not limited to, gelling, co-gelling, impregnation of one compound onto another, and the like, or combinations thereof. Following a contacting method, the contacted mixture of the support material, electron-withdrawing anion, and optional metal ion, can be calcined.

According to another embodiment of the present invention, the support material can be treated by a process comprising: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Activators

The supported catalyst systems may be formed by combining the above two metal catalyst components with activators in any manner known from the literature including by supporting them for use in slurry or gas phase polymerization. Activators are defined to be any compound which can activate any one of the catalyst compounds described above by converting the neutral metal catalyst compound to a catalytically active metal catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal compound cationic and providing a charge-balancing non-coordinating or weakly coordinating anion.

Alumoxane Activators

Alumoxane activators are utilized as activators in the catalyst systems described herein. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator typically at up to a 5000-fold molar excess Al/M over the catalyst (per metal catalytic site). The minimum activator-to-catalyst-compound is a 1:1 molar ratio. Alternate preferred ranges include from 1:1 to 500:1, alternatively from 1:1 to 200:1, alternatively from 1:1 to 100:1, or alternatively from 1:1 to 50:1.

In an alternate embodiment, little or no alumoxane is used in the polymerization processes described herein. Preferably, alumoxane is present at zero mol %, alternatively the alumoxane is present at a molar ratio of aluminum to catalyst compound transition metal less than 500:1, preferably less than 300:1, preferably less than 100:1, preferably less than 1:1.

Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with embodiments of the present disclosure are those that are compatible, stabilize the transition metal cation in the sense of balancing its ionic charge at +1, and yet retain sufficient lability to permit displacement during polymerization.

It is within the scope of the present invention to use an ionizing activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of the present invention to use neutral or ionic activators alone or in combination with alumoxane or modified alumoxane activators.

For descriptions of useful activators please see U.S. Pat. Nos. 8,658,556 and 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [$Me_3NH^+$][B($C_6F_5$)$_4^-$], 1-(4-(tris(pentafluorophenyl)borate)-2,3,5,6-tetrafluorophenyl)pyrrolidinium; and [$Me_3NH^+$][B($C_6F_5$)$_4^-$], 1-(4-(tris(pentafluorophenyl)borate)-2,3,5,6-tetrafluorophenyl) pyrrolidinium; and sodium tetrakis(pentafluorophenyl)borate, potassium tetrakis(pentafluorophenyl)borate, 4-(tris (pentafluorophenyl)borate)-2,3,5,6-tetrafluoropyridinium, solidium tetrakis(perfluorophenyl)aluminate, potassium terakis(pentafluorophenyl), and N,N-dimethylanilinium tetrakis(perfluorophenyl)aluminate.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl) ammonium tetrakis(pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate preferred ranges include from 0.1:1 to 100:1, alternatively from 0.5:1 to 200:1, alternatively from 1:1 to 500:1 alternatively from 1:1 to 1000:1. A particularly useful range is from 0.5:1 to 10:1, preferably 1:1 to 5:1.

Optional Scavengers or Co-Activators

In addition to the activator compounds, scavengers, chain transfer agents or co-activators may be used. Aluminum alkyl or organoaluminum compounds which may be utilized as co-activators include, for example, trimethylaluminum, triethylaluminum, triisobutylaluminum, tri-n-hexylaluminum, tri-n-octylaluminum, diethyl zinc, tri-n-butyl aluminum, di-isobutyl aluminum hydride, or combinations thereof.

In some embodiments, the catalyst systems will additionally comprise one or more scavenging compounds. Here, the term "scavenger" means a compound that removes polar impurities from the reaction environment. These impurities adversely affect catalyst activity and stability. Typically, the scavenging compound will be an organometallic compound such as the Group-13 organometallic compounds of U.S. Pat. Nos. 5,153,157; 5,241,025; and PCT Publication Nos. WO 91/09882; WO 94/03506; WO 93/14132; and WO 95/07941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethyl aluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$).

Preferred aluminum scavengers include those where there is oxygen present. That is, the material per se or the aluminum mixture used as a scavenger, includes an aluminum/oxygen species, such as an alumoxane or alkylaluminum oxides, e.g., dialkyaluminum oxides, such as bis(di-isobutylaluminum) oxide. In one aspect, aluminum containing scavengers can be represented by the formula $((R_z\text{—}Al\text{—})_yO\text{—})_x$, wherein z is 1-2, y is 1-2, x is 1-100, and R is a $C_1$-$C_{12}$ hydrocarbyl group. In another aspect, the scavenger has an oxygen to aluminum (O/Al) molar ratio of from about 0.25 to about 1.5, more particularly from about 0.5 to about 1.

Preparation of Mixed Catalyst Systems

The above two metal catalyst compounds can be combined to form a mixed catalyst system.

The two or more metal catalyst compounds can be added together in a desired ratio when combined, contacted with an activator, or contacted with a support material or a supported activator. The metal catalyst compounds may be added to the mixture sequentially or at the same time.

The ratio of catalyst (A):(B) can vary depending on the balance of processability versus physical characteristics of the desired polymer. For example, the ratio (A):(B) can range from 1:10 to 10:1, such as 5:1 to 1:5 or 1:1.

Alternative preparations can include addition of a first metal catalyst compound to a slurry including a support or a supported activator mixture for a specified reaction time, followed by the addition of the second metal catalyst compound solution, mixed for another specified time, after which the mixture may be recovered for use in a polymerization reactor, such as by spray drying. Lastly, another additive, such as 1-hexene in about 10 vol % can be present in the mixture prior to the addition of the first metal catalyst compound.

The first metal catalyst compound may be supported via contact with a support material for a reaction time. The resulting supported catalyst composition may then be mixed with mineral oil to form a slurry, which may or may not include an activator. The slurry may then be admixed with a second metal catalyst compound prior to introduction of the resulting mixed catalyst system to a polymerization reactor. The second metal catalyst compound may be admixed at any point prior to introduction to the reactor, such as in a polymerization feed vessel or in-line in a catalyst delivery system.

The mixed catalyst system may be formed by combining a first metal catalyst compound (for example a metal catalyst compound useful for producing a first polymer attribute, such as a high molecular weight polymer fraction or high comonomer content) with a support and activator, desirably in a first diluent such as an alkane or toluene, to produce a supported, activated catalyst compound. The supported activated catalyst compound, either isolated from the first diluent or not, is then combined in one embodiment with a high viscosity diluent such as mineral or silicon oil, or an alkane diluent comprising from 5 to 99 wt % mineral or silicon oil to form a slurry of the supported metal catalyst compound, followed by, or simultaneous to combining with a second metal catalyst compound (for example, a metal catalyst compound useful for producing a second polymer attribute, such as a low molecular weight polymer fraction or low comonomer content), either in a diluent or as the dry solid compound, to form a supported activated mixed catalyst system ("mixed catalyst system"). The mixed catalyst system thus produced may be a supported and activated first metal catalyst compound in a slurry, the slurry comprising mineral or silicon oil, with a second metal catalyst compound that is not supported and not combined with additional activator, where the second metal catalyst compound may or may not be partially or completely soluble in the slurry. In one embodiment, the diluent consists of mineral oil.

Mineral oil, or "high viscosity diluents," as used herein refers to petroleum hydrocarbons and mixtures of hydrocarbons that may include aliphatic, aromatic, and/or paraffinic components that are liquids at 23° C. and above, and typically have a molecular weight of at least 300 amu to 500 amu or more, and a viscosity at 40° C. of from 40 to 300 cSt or greater, or from 50 to 200 cSt in a particular embodiment. The term "mineral oil" includes synthetic oils or liquid polymers, polybutenes, refined naphthenic hydrocarbons, and refined paraffins known in the art, such as disclosed in BLUE BOOK 2001, MATERIALS, COMPOUNDING INGREDIENTS, MACHINERY AND SERVICES FOR RUBBER 189 247 (J. H. Lippincott, D. R. Smith, K. Kish & B. Gordon eds. Lippincott & Peto Inc. 2001). Preferred mineral and silicon oils are those that exclude moieties that are reactive with metallocene catalysts, examples of which include hydroxyl and carboxyl groups.

The diluent may comprise a blend of a mineral, silicon oil, and/or and a hydrocarbon selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof. When the diluent is a blend comprising mineral oil, the diluent may comprise from 5 to 99 wt % mineral oil. In some embodiments, the diluent may consist essentially of mineral oil.

In one embodiment, the first metal catalyst compound is combined with an activator and a first diluent to form a catalyst slurry that is then combined with a support material. Until such contact is made, the support particles are preferably not previously activated. The first metal catalyst compound can be in any desirable form such as a dry powder, suspension in a diluent, solution in a diluent, liquid, etc. The catalyst slurry and support particles are then mixed thoroughly, in one embodiment at an elevated temperature, so that both the first metal catalyst compound and the activator are deposited on the support particles to form a support slurry.

After the first metal catalyst compound and activator are deposited on the support, a second metal catalyst compound may then be combined with the supported first metal catalyst compound, wherein the second is combined with a diluent comprising mineral or silicon oil by any suitable means either before, simultaneous to, or after contacting the second metal catalyst compound with the supported first metal catalyst compound. In one embodiment, the first metal catalyst compound is isolated form the first diluent to a dry state before combining with the second metal catalyst compound. Preferably, the second metal catalyst compound is not activated, that is, not combined with any activator, before being combined with the supported first metal catalyst compound. The resulting solids slurry (including both the supported first and second metal catalyst compounds) is then preferably, mixed thoroughly at an elevated temperature.

A wide range of mixing temperatures may be used at various stages of making the mixed catalyst system. For example, in a specific embodiment, when the first metal catalyst compound and at least one activator, such as methylalumoxane, are combined with a first diluent to form a mixture, the mixture is preferably, heated to a first temperature of from 25° C. to 150° C., preferably, from 50° C. to 125° C., more preferably, from 75° C. to 100° C., most preferably, from 80° C. to 100° C. and stirred for a period of time from 30 seconds to 12 hours, preferably, from 1 minute to 6 hours, more preferably, from 10 minutes to 4 hours, and most preferably, from 30 minutes to 3 hours.

Next, that mixture is combined with a support material to provide a first support slurry. The support material can be heated, or dehydrated if desired, prior to combining. In one or more embodiments, the first support slurry is mixed at a temperature greater than 50° C., preferably, greater than 70° C., more preferably, greater than 80° C. and most preferably, greater than 85° C., for a period of time from 30 seconds to 12 hours, preferably, from 1 minute to 6 hours, more preferably, from 10 minutes to 4 hours, and most preferably, from 30 minutes to 3 hours. Preferably, the support slurry is mixed for a time sufficient to provide a collection of activated support particles that have the first metal catalyst compound deposited thereto. The first diluent can then be removed from the first support slurry to provide a dried supported first catalyst compound. For example, the first diluent can be removed under vacuum or by nitrogen purge.

Next, the second metal catalyst compound is combined with the activated first metal catalyst compound in the presence of a diluent comprising mineral or silicon oil in one embodiment. Preferably, the second metal catalyst compound is added in a molar ratio to the first metal catalyst compound in the range from 1:1 to 3:1. Most preferably, the molar ratio is approximately 1:1. The resultant slurry (or first support slurry) is preferably, heated to a first temperature from 25° C. to 150° C., preferably, from 50° C. to 125° C., more preferably, from 75° C. to 100° C., most preferably, from 80° C. to 100° C. and stirred for a period of time from 30 seconds to 12 hours, preferably, from 1 minute to 6 hours, more preferably, from 10 minutes to 4 hours, and most preferably, from 30 minutes to 3 hours.

The first diluent is an aromatic or alkane, preferably, hydrocarbon diluent having a boiling point of less than 200° C. such as toluene, xylene, hexane, etc., may be removed from the supported first metal catalyst compound under vacuum or by nitrogen purge to provide a supported mixed catalyst system. Even after addition of the oil and/or the second (or other) catalyst compound, it may be desirable to treat the slurry to further remove any remaining solvents such as toluene. This can be accomplished by an $N_2$ purge or vacuum, for example. Depending upon the level of mineral oil added, the resultant mixed catalyst system may still be a slurry or may be a free flowing powder that comprises an amount of mineral oil. Thus, the mixed catalyst system, while a slurry of solids in mineral oil in one embodiment, may take any physical form such as a free flowing solid. For example, the mixed catalyst system may range from 1 to 99 wt % solids content by weight of the mixed catalyst system (mineral oil, support, all catalyst compounds and activator(s)) in one embodiment. The metallocene compound may be the first or second compound, typically the second compound.

Polymerization Process

In at least one embodiment, a polymerization process includes contacting, in a reaction zone, a monomer (such as ethylene), and, optionally, comonomer (such as hexene), with a supported catalyst system comprising an unbridged group 4 (such as Hf) metallocene compound represented by formula A, an unbridged group 4 (such as Zr) metallocene compound represented by formula B, an activator, and a support material as described above. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone. Useful reaction zones include gas phase reactors, tubular reactors, continuous stirred tank reactors, etc.

Monomers useful herein include substituted or unsubstituted $C_2$ to $C_{40}$ alpha olefins, preferably, $C_2$ to $C_{20}$ alpha olefins, preferably, $C_2$ to $C_{12}$ alpha olefins, preferably, ethylene, propylene, butene, pentene, hexene, heptene, octene, nonene, decene, undecene, dodecene and isomers thereof. In a preferred embodiment of the invention, the monomers comprise ethylene and, optional, comonomers comprising one or more $C_3$ to $C_{40}$ olefins, preferably, $C_4$ to $C_{20}$ olefins, or preferably, $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may, optionally, include heteroatoms and/or one or more functional groups.

Exemplary $C_3$ to $C_{40}$ comonomers include propylene, butene, pentene, hexene, heptene, octene, nonene, decene, undecene, dodecene, norbornene, norbomadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably, hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbomadiene, and their respective homologs and derivatives.

In a preferred embodiment, one or more dienes are present in the polymer produced herein at up to 10 wt %, preferably, at 0.00001 to 1.0 wt %, preferably, 0.002 to 0.5 wt %, even more preferably, 0.003 to 0.2 wt %, based upon the total weight of the composition. In some embodiments 500 ppm or less of diene is added to the polymerization, preferably, 400 ppm or less, preferably, or 300 ppm or less. In other embodiments, at least 50 ppm of diene is added to the polymerization, or 100 ppm or more, or 150 ppm or more.

Preferred diolefin monomers include any hydrocarbon structure, preferably, $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably, those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a particularly preferred embodiment, a process provides polymerization of ethylene and at least one comonomer having from 3 to 8 carbon atoms, preferably, 4 to 8 carbon atoms. Particularly, the comonomers are propylene, 1-butene, 4-methyl-1-pentene, 3-methyl-1-pentene, 1-hexene and 1-octene, the most preferred being 1-hexene, 1-butene and 1-octene.

In a particularly preferred embodiment, a process provides polymerization of one or more monomers selected from the group consisting of propylene, 1-butene, 1-pentene, 3-methyl-1-pentene, 4-methyl-1-pentene, 1-hexene, 1-octene, 1-decene, and combinations thereof.

Polymerization processes of the present disclosure can be carried out in any manner known in the art. Any suspension, homogeneous, bulk, solution, slurry, or gas phase polymerization process known in the art can be used. Such processes can be run in a batch, semi-batch, or continuous mode. Gas phase polymerization processes and slurry processes are preferred. (A homogeneous polymerization process is preferably a process where at least 90 wt % of the product is soluble in the reaction media.) A bulk homogeneous process is particularly preferred. (A bulk process is preferably a process where monomer concentration in all feeds to the reactor is 70 volume % or more.) Alternatively, no solvent or diluent is present or added in the reaction medium (except for the small amounts used as the carrier for the catalyst system or other additives, or amounts typically found with the monomer; e.g., propane in propylene).

In another embodiment, the process is a slurry process. As used herein, the term "slurry polymerization process" preferably means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorided $C_{4-10}$ alkanes, chlorobenzene, and aromatic and alkylsubstituted aromatic compounds, such as benzene, toluene, mesitylene, and xylene. Suitable solvents also include liquid olefins, which may act as monomers or comonomers, including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably, aromatics are present in the solvent at less than 1 wt %, preferably, less than 0.5 wt %, preferably, less than 0 wt % based upon the weight of the solvents.

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers, along with catalysts, are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used, the process must be operated above the reaction diluent critical temperature and pressure. Preferably, a hexane or an isobutane medium is employed.

Polyolefin Products

The present invention further provides compositions of matter produced by the methods described herein.

In a preferred embodiment, the process described herein produces ethylene homopolymers or ethylene copolymers, such as ethylene-alpha-olefin (preferably $C_3$ to $C_{20}$) copolymers (such as ethylene-butene copolymers, ethylene-hexene and/or ethylene-octene copolymers) having an Mw/Mn of greater than 1 to 40 (preferably greater than 1 to 4, preferably greater than 1 to 3).

Likewise, processes of the present invention can form ethylene copolymers. In a preferred embodiment, the copolymers produced herein have from 0 to 25 mol % (alternatively from 0.5 to 20 mol %, alternatively from 1 to 15 mol %, preferably from 3 to 10 mol %) of one or more $C_3$ to $C_{20}$ olefin comonomer, such as a $C_3$-$C_{20}$ alpha-olefin, (preferably $C_3$ to $C_{12}$ alpha-olefin, preferably propylene, butene, hexene, octene, decene, dodecene, preferably propylene, butene, hexene, octene).

In a preferred embodiment, the monomer is ethylene and the comonomer is hexene, preferably from 1 to 15 mol % hexene, alternatively 1 to 10 mol %.

In particular, the present invention provides an in-situ ethylene polymer composition having: 1) at least 50 mol % ethylene; and 2) a density of 0.89 g/cc or more, preferably 0.935 g/cc or more (ASTM 1505). Preferably, the copolymer has higher comonomer (e.g., hexene) content in the higher molecular weight (Mw) component of the resin as compared to the lower molecular weight (Mw) component, preferably at least 10% higher, preferably at least 20% higher, preferably at least 30% higher as determined by GPC-4D. The dividing line between higher and lower Mw is the midpoint between the Mw's of two polymers each made using the same polymerization conditions as the product made using the two catalysts on a support, except that the first polymer is made without the catalyst represented by formula (A) and the second polymer is made without the catalyst represented by formula (B). In the event a midpoint cannot be determined, an Mw of 150,000 g/mol shall be used.

The copolymer produced herein typically has a composition distribution breadth $T_{75}$-$T_{25}$, as measured by TREF, that is greater than 20° C., preferably greater than 30° C., preferably greater than 40° C. The $T_{75}$-$T_{25}$ value represents the homogeneity of the composition distribution as determined by temperature rising elution fractionation. A TREF curve is produced as described below. Then the temperature at which 75% of the polymer is eluted is subtracted from the temperature at which 25% of the polymer is eluted, as determined by the integration of the area under the TREF curve. The $T_{75}$-$T_{25}$ value represents the difference. The closer these temperatures comes together, the narrower the composition distribution.

Typically, the polymers produced herein have an Mw of 5,000 to 1,000,000 g/mol (preferably 25,000 to 750,000 g/mol, preferably 50,000 to 500,000 g/mol), and/or an Mw/Mn of greater than 1 to 40 (alternatively 1.2 to 20, alternatively 1.3 to 10, alternatively 1.4 to 5, 1.5 to 4, alternatively 1.5 to 3) as determined by GPC-4D. Polymers produced herein typically have an Mz/Mw from about 1 to about 10, such as from about 2 to about 6, such as from about 3 to about 4, such as from about 2 to about 3. Polymers produced herein typically have an Mz/Mn from about 1 to about 10, such as from about 2 to about 6, such as from about 3 to about 5. The ratio of other average molecular weight ratios (e.g., Mz/Mw) can be calculated to highlight how the distribution is affected. For instance, a trace amount of very high MW species in a polymer product can preferentially raise Mz more than Mw and, therefore, result in a significantly higher ratio of Mz/Mw. Such difference in the effect on molecular weight distribution has been discovered to have profound effects on film toughness, such as tear property, through molecular orientation during the fabrication process.

In a preferred embodiment of the invention, the polymer produced herein has a unimodal or multimodal molecular weight distribution as determined by Gel Permeation Chromatography (GPC). By "unimodal" is meant that the GPC trace has one peak or two inflection points. By "multimodal" is meant that the GPC trace has at least two peaks or more than 2 inflection points. An inflection point is that point where the second derivative of the curve changes in sign (e.g., from negative to positive or vice versa).

Usefully, in a preferred embodiment of the invention, the polymer produced herein has a bimodal molecular weight distribution as determined by Gel Permeation Chromatography (GPC). By "bimodal" is meant that the GPC trace has two peaks or at least 4 inflection points.

In another embodiment, the polymer produced herein has two peaks in the TREF measurement (see below). Two peaks in the TREF measurement as used in this specification and the appended claims means the presence of two distinct normalized IR response peaks in a graph of normalized IR response (vertical or y axis) versus elution temperature (horizontal or x axis with temperature increasing from left to right) using the TREF method below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. Preferably, the two distinct peaks are at least 3° C. apart, more preferably at least 4° C. apart, even more preferably at least 5° C. apart. Additionally, both of the distinct peaks occur at a temperature on the graph above 20° C. and below 120° C. where the elution temperature is run to 0° C. or lower. This limitation avoids confusion with the apparent peak on the graph at low temperature caused by material that remains soluble at the lowest elution temperature. Two peaks on such a graph indicates a bi-modal composition distribution (CD). An alternate method for TREF measurement can be used if the TREF method below does not show two peaks, i.e., see B. Monrabal, "Crystallization Analysis Fractionation: A New Technique for the Analysis of Branching Distribution in Polyolefins," Journal of Applied Polymer Science, Vol. 52, 491-499 (1994).

TREF Method

Temperature Rising Elution Fractionation (TREF) analysis is done using a Crystallization Elution Fractionation (CEF) instrument from Polymer Char, S. A., Valencia, Spain. The principles of CEF analysis and a general description of the particular apparatus used are given in the article Monrabal, B. et al. Crystallization Elution Fractionation. A New Separation Process for Polyolefin Resins. *Macromol. Symp.*, 2007, 257, 71. In particular, a process conforming to the "TREF separation process" shown in FIG. 1a of this article, in which Fc=0, was used. Pertinent details of the analysis method and features of the apparatus used are as follows.

The solvent used for preparing the sample solution and for elution was 1,2-Dichlorobenzene (ODCB) which was stabilized by dissolving 1.6 g of 2,6-bis(1,1-dimethylethyl)-4-methylphenol (butylated hydroxytoluene) in a 4-L bottle of fresh solvent at ambient temperature. The stabilized solvent was then filtered using a 0.1-μm Teflon filter (Millipore). The sample (6-10 mg) to be analyzed was dissolved in 8 ml of ODCB metered at ambient temperature by stirring (Medium setting) at 150° C. for 90 min. A small volume of the polymer solution was first filtered by an inline filter (stainless steel, 10 μm), which is back-flushed after every filtration. The filtrate was then used to completely fill a 200-μl injection-valve loop. The volume in the loop was then introduced near the center of the CEF column (15-cm long SS tubing, ⅜" o.d., 7.8 mm i.d.) packed with an inert support (SS balls) at 140° C., and the column temperature was stabilized at 125° C. for 20 min. The sample volume was then allowed to crystallize in the column by reducing the temperature to 0° C. at a cooling rate of 1° C./min. The column was kept at 0° C. for 10 min before injecting the ODCB flow (1 ml/min) into the column for 10 min to elute and measure the polymer that did not crystallize (soluble fraction). The wide-band channel of the infrared detector used (Polymer Char IR5) generates an absorbance signal that is proportional to the concentration of polymer in the eluting flow. A complete TREF curve was then generated by increasing the temperature of the column from 0 to 140° C. at a rate of 2° C./min while maintaining the ODCB flow at 1 ml/min to elute and measure the concentration of the dissolving polymer.

GPC 4D Procedure: Molecular Weight, Comonomer Composition and Long Chain Branching Determination by GPC-IR Hyphenated with Multiple Detectors Unless otherwise indicated, the distributions and the moments of molecular weight (Mw, Mn, Mw/Mn, etc.), the comonomer content ($C_2$, $C_3$, $C_6$, etc.) and the branching index ($g'_{vis}$) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{\alpha+1} + \frac{\alpha_{PS}+1}{\alpha+1}\log M_{PS}$$

where the variables with subscript "PS" stand for polystyrene while those without a subscript are for the test samples. In this method, $\alpha_{PS}$=0.67 and $K_{PS}$=0.000175 while α and K are for other materials as calculated and published in literature (Sun, T. et al. *Macromolecules,* 2001, 34, 6812), except that for purposes of the present invention, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3$/1000TC) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

w2=f*SCB/1000TC.

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk IR ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1000TC (bulk CH3end/1000TC) is obtained by weight-averaging the chain-end correction over the molecular-weight range. Then w2b=f*bulk CH3/1000TC bulk SCB/1000TC=bulk CH3/1000TC−bulk CH3end/1000TC and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and $\lambda$=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1-0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, $[\eta]$, at each point in the chromatogram is calculated from the equation $[\eta]=\eta_S/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as $$g'_{vis} = \frac{[\eta]_{avg}}{KM_V^\alpha},$$

where $M_V$ is the viscosity-average molecular weight based on molecular weights determined by LS analysis and the K and $\alpha$ are for the reference linear polymer, which are, for purposes of the present invention, $\alpha$=0.695 and K=0.000579 for linear ethylene polymers, $\alpha$=0.705 and K=0.0002288 for linear propylene polymers, $\alpha$=0.695 and K=0.000181 for linear butene polymers, $\alpha$ is 0.695 and K is 0.000579*(1-0.0087*w2b+0.000018*(w2b)^) for ethylene-butene copolymer where w2b is a bulk weight percent of butene comonomer, $\alpha$ is 0.695 and K is 0.000579*(1-0.0075*w2b) for ethylene-hexene copolymer where w2b is a bulk weight percent of hexene comonomer, and $\alpha$ is 0.695 and K is 0.000579*(1-0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

The reversed-co-monomer index (RCI,m) is computed from x2 (mol % co-monomer $C_3$, $C_4$, $C_6$, $C_8$, etc.), as a function of molecular weight, where x2 is obtained from the following expression in which n is the number of carbon atoms in the comonomer (3 for $C_3$, 4 for $C_4$, 6 for $C_6$, etc.):

$$x2 = -\frac{200\, w2}{-100\, n - 2\, w2 + nw2}.$$

Then the molecular-weight distribution, W(z) where $z=\log_{10} M$, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W' is renormalized so that $$1 = \int_{-\infty}^{\infty} W' dz$$

and a modified weight-average molecular weight ($M_w'$) is calculated over the effectively reduced range of molecular weights as follows:

$$M_w' = \int_{-\infty}^{\infty} 10^z * W' dz.$$

The RCI,m is then computed as $$\text{RCI},m = \int_{-\infty}^{\infty} x2(10^z - M_w') W' dz.$$

A reversed-co-monomer index (RCI,w) is also defined on the basis of the weight fraction co-monomer signal (w2/100) and is computed as follows:

$$RCI, w = \int_{-\infty}^{\infty} \frac{w2}{100}(10^z - M_w') W' dz.$$

Note that in the above definite integrals the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight (w2) comonomer signal, denoted as CDR-1,w, CDR-2,w, and CDR-3,w, as follows:

$$CDR\text{-}1, w = \frac{w2(Mz)}{w2(Mw)}$$

$$CDR\text{-}2, w = \frac{w2(Mz)}{w2\left(\frac{Mw+Mn}{2}\right)}$$

$$CDR\text{-}3, w = \frac{w2\left(\frac{Mz+Mw}{2}\right)}{w2\left(\frac{Mw+Mn}{2}\right)}$$

where w2(Mw) is the % weight co-monomer signal corresponding to a molecular weight of Mw, w2(Mz) is the % weight co-monomer signal corresponding to a molecular weight of Mz, w2[(Mw+Mn)/2)] is the % weight co-monomer signal corresponding to a molecular weight of (Mw+

Mn)/2, and w2[(Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be also defined utilizing the % mole co-monomer signal, CDR-1,m, CDR-2,m, CDR-3,m, as:

$$CDR\text{-}1, m = \frac{x2(Mz)}{x2(Mw)}$$

$$CDR\text{-}2, m = \frac{x2(Mz)}{x2\left(\frac{Mw+Mn}{2}\right)}$$

$$CDR\text{-}3, m = \frac{x2\left(\frac{Mz+Mw}{2}\right)}{x2\left(\frac{Mw+Mn}{2}\right)}$$

where x2(Mw) is the % mole co-monomer signal corresponding to a molecular weight of Mw, x2(Mz) is the % mole co-monomer signal corresponding to a molecular weight of Mz, x2[(Mw+Mn)/2)] is the % mole co-monomer signal corresponding to a molecular weight of (Mw+Mn)/2, and x2[(Mz+Mw)/2] is the % mole co-monomer signal corresponding to a molecular weight of Mz+Mw/2, where Mw is the weight-average molecular weight, Mn is the number-average molecular weight, and Mz is the z-average molecular weight.

An "in-situ polymer composition" (also referred to as an "in-situ blend" or a "reactor blend") is the composition which is the product of a polymerization with two catalyst compounds in the same reactor described herein. Without wishing to be being bound by theory, it is thought that the two catalyst compounds produce a reactor blend (i.e., an interpenetrating network) of two (or more) components made in the same reactors (or reactions zones) with the two catalysts. These sorts of compositions may be referred to as reactor blends, although the term may not be strictly accurate since there may be polymer species comprising components produced by each catalyst compound that are not technically a blend.

An "ex-situ blend" is a blend which is a physical blend of two or more polymers synthesized independently and then subsequently blended together typically using a melt-mixing process, such as an extruder. An ex-situ blend is distinguished by the fact that the polymer components are collected in solid form after exiting their respective synthesis processes, and then combined to form the blend; whereas for an in-situ polymer composition, the polymer components are prepared within a common synthesis process and only the combination is collected in solid form.

In any embodiment described herein, the polymer composition produced is an in-situ polymer composition.

In at least one embodiment of the present invention, the polymer produced is an in-situ polymer composition having an ethylene content of 70 wt % or more, preferably 80 wt % or more, preferably 90 wt % or more and/or a density of 0.910 or more, alternatively 0.93 g/cc or more; alternatively 0.935 g/cc or more, alternatively 0.938 g/cc or more.

In at least one embodiment of the present invention, the polymer produced is an in-situ polymer composition having a density of 0.890 g/cc or more, alternatively from 0.935 to 0.960 g/cc.

In at least one embodiment of the present invention, the polymer produced by the processes described herein comprises ethylene and one or more comonomers and the polymer has: 1) an RCI,m greater than 30 (alternatively greater than 30 to 50), an Mw/Mn of greater than 1, such as from 1 to 15, or 2.3 to 15, or 3 to 15, and optionally a $T_{75}\text{-}T_{25}$ of 15 to 20° C.; or 2) an RCI,m greater than 50 (alternatively greater than 80), an Mw/Mn of greater than 5 (alternatively from 5 to 10), and optionally a $T_{75}\text{-}T_{25}$ of 25 to 45° C.

In at least one embodiment of the present invention when: 1) the unbridged group 4 metallocene compound (A) is run under the same polymerization conditions as a supported two catalyst composition described herein, except that the unbridged metallocene compound (B) is absent, a polymer having an RCI,m of 20 or more is produced; and
2) the unbridged metallocene compound (B) is run under the same polymerization conditions as step 1), except that the unbridged group 4 metallocene compound (A) is absent, a polymer having an RCI,m of less than zero is produced.

In at least one embodiment of the present disclosure, a linear low density polyethylene may be produced by using the supported catalyst systems (C') described herein (e.g., having activator and two catalysts (A) and (B) supported on the same support) where the LLDPE has: a) an RCI,m greater than 30 (alternatively greater than 30 to 50), an Mw/Mn of greater than 3 to less than 5, and optionally a $T_{75}\text{-}T_{25}$ of 15-20° C.; or b) an RCI,m greater than 50 (alternatively greater than 80) and an Mw/Mn of greater than 5 (optionally of greater than 5 to 10), and optionally a $T_{75}\text{-}T_{25}$ of 25-45° C., provided that:
1) when the supported unbridged group 4 metallocene catalyst compound (A) is run under the same polymerization conditions as the supported catalyst system (C') except that the unbridged metallocene catalyst compound (B) is absent, an ethylene polymer is produced having an RCI,m greater than 20; and
2) when the supported unbridged metallocene catalyst compound (B) is run under the same conditions as step 1) except that the bridged group 4 metallocene catalyst compound (A) is absent, an ethylene polymer is produced having a negative RCI,m.

To obtain polymers having higher RCI,m's (such as 50 and above) select unbridged catalyst compounds represented by formula (A) that produce high comonomer content and/or high Mw/Mn.

End Uses

The multi-modal polyolefin produced by the processes disclosed herein and blends thereof are useful in such forming operations as film, sheet, and fiber extrusion and co-extrusion as well as blow molding, injection molding, and rotary molding. Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc., in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

Specifically, any of the foregoing polymers, such as the foregoing ethylene copolymers or blends thereof, may be used in mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents.

Blends

The polymers produced herein may be further blended with additional ethylene polymers (referred to as "second ethylene polymers" or "second ethylene copolymers") and use in film, molded part and other typical polyethylene applications.

In one aspect of the present disclosure, the second ethylene polymer is selected from ethylene homopolymer, ethylene copolymers, and blends thereof. Useful second ethylene copolymers can comprise one or more comonomers in addition to ethylene and can be a random copolymer, a statistical copolymer, a block copolymer, and/or blends thereof. The method of making the second ethylene polymer is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment, the second ethylene polymers are made by the catalysts, activators and processes described in U.S. Pat. Nos. 6,342,566; 6,384,142; 5,741,563; PCT Publication Nos. WO 03/040201; and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000). Additional useful second ethylene polymers and copolymers are described at paragraph [00118] to [00126] at pages 30 to 34 of PCT/US2016/028271, filed Apr. 19, 2016.

EXPERIMENTAL

Test Methods $^1$H NMR $^1$H NMR data was collected at 120° C. using a 10 mm CryoProbe with a Bruker spectrometer at a $^1$H frequency of 400 MHz (available from Bruker Corporation, United Kingdom). Data were recorded using a maximum pulse width of 45°, 5 seconds between pulses and signal averaging 512 transients. Samples were prepared by dissolving 80 mg of sample in 3 mL of solvent heated at 140° C. Peak assignments are determined referencing the solvent of tetrachloroethane-1,2 D$_2$ at 5.98 ppm.

GPC 4D Procedure

Unless otherwise indicated, the distributions and the moments of molecular weight (Mw, Mn, Mz, Mw/Mn, etc.), the comonomer content (C$_2$, C$_3$, C$_6$, etc.) and the branching index (g') are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. Given amount of polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most polyethylene samples or 2 hours for polypropylene samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with the following equation:

$$\log M = \frac{\log(K_{PS}/K)}{\alpha+1} + \frac{\alpha_{PS}+1}{\alpha+1}\log M_{PS}$$

where the variables with subscript "PS" stand for polystyrene while those without a subscript are for the test samples. In this method, $\alpha_{PS}$=0.67 and $K_{PS}$=0.000175, while α and K for other materials are as calculated and published in literature (Sun, T. et al. *Macromolecules*, 2001, 34, 6812), except that for purposes of the present invention, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1-0.0087*w2b+0.000018*(w2b)^) for ethylene-butene copolymer where w2b is a bulk weight percent of butene comonomer, α is 0.695 and K is 0.000579*(1-0.0075*w2b) for ethylene-hexene copolymer where w2b is a bulk weight percent of hexene comonomer, and α is 0.695 and K is 0.000579*(1-0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to CH$_2$ and CH$_3$ channel calibrated with a series of PE and PP homo/copolymer standards whose nominal values are predetermined by NMR or FTIR. In particular, this provides the methyls per 1000 total carbons (CH$_3$/1000TC) as a function of molecular weight. The short-chain branch (SCB) content per 1000TC (SCB/1000TC) is then computed as a function of molecular weight by applying a chain-end correction to the CH$_3$/1000TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

$$w2=f*SCB/1000TC.$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk } IR \text{ ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1000TC (bulk CH$_3$end/1000TC) is obtained by weight-averaging the chain-end correction over the molecular-weight range. Then $$w2b=f*\text{bulk CH3/1000TC}$$

bulk SCB/1000TC=bulk CH3/1000TC−bulk CH3end/1000TC and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_O$ is the optical constant for the $$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and $\lambda$=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, $[\eta]$, at each point in the chromatogram is calculated from the equation $[\eta]=\eta_S/$ c, where c is concentration and is determined from the IR5 broadband channel output. The viscosity MW at each point is calculated as $M=K_{PS}M^{\alpha_{ps}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as $$g'_{vis} = \frac{[\eta]_{avg}}{KM_v^\alpha},$$

where $M_V$ is the viscosity-average molecular weight based on molecular weights determined by LS analysis and the K and $\alpha$ are for the reference linear polymer, which are, for purposes of the present invention, $\alpha$=0.695 and K=0.000579 for linear ethylene polymers, $\alpha$=0.705 and K=0.0002288 for linear propylene polymers, $\alpha$=0.695 and K=0.000181 for linear butene polymers, $\alpha$ is 0.695 and K is 0.000579*(1−0.0087*w2b+0.000018*(w2b)^) for ethylene-butene copolymer where w2b is a bulk weight percent of butene comonomer, $\alpha$ is 0.695 and K is 0.000579*(1−0.0075*w2b) for ethylene-hexene copolymer where w2b is a bulk weight percent of hexene comonomer, and $\alpha$ is 0.695 and K is 0.000579*(1−0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted. Calculation of the w2b values is as discussed above.

The reversed-co-monomer index (RCI,m) is computed from x2 (mol % co-monomer $C_3$, $C_4$, $C_6$, $C_8$, etc.), as a function of molecular weight, where x2 is obtained from the following expression in which n is the number of carbon atoms in the comonomer (3 for $C_3$, 4 for $C_4$, 6 for $C_6$, etc.):

$$x2 = -\frac{200 \, w2}{-100 \, n - 2 \, w2 + nw2}.$$

Then the molecular-weight distribution, W(z) where z=$\log_{10}$ M, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W' is renormalized so that $$1=\int_{-\infty}^{\infty} W' dz$$

and a modified weight-average molecular weight ($M_w'$) is calculated over the effectively reduced range of molecular weights as follows:

$$M_w'=\int_{-\infty}^{\infty} 10^z *W' dz.$$

The RCI,m is then computed as $$RCI,m=\int_{-\infty}^{\infty} x2(10^z-M_w')W' dz.$$

A reversed-co-monomer index (RCI,w) is also defined on the basis of the weight fraction co-monomer signal (w2/100) and is computed as follows:

$$RCI, w = \int_{-\infty}^{\infty} \frac{w2}{100}(10^z - M'_w) W' dz.$$

Note that in the above definite integrals the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight (w2) comonomer signal, denoted as CDR-1,w, CDR-2,w, and CDR-3,w, as follows:

$$CDR\text{-}1, w = \frac{w2(Mz)}{w2(Mw)}$$

$$CDR\text{-}2, w = \frac{w2(Mz)}{w2\left(\frac{Mw+Mn}{2}\right)}$$

$$CDR\text{-}3, w = \frac{w2\left(\frac{Mz+Mw}{2}\right)}{w2\left(\frac{Mw+Mn}{2}\right)}$$

where w2(Mw) is the % weight co-monomer signal corresponding to a molecular weight of Mw, w2(Mz) is the % weight co-monomer signal corresponding to a molecular weight of Mz, w2[(Mw+Mn)/2)] is the % weight co-monomer signal corresponding to a molecular weight of (Mw+Mn)/2, and w2[(Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be also defined utilizing the % mole co-monomer signal, CDR-1,m, CDR-2,m, CDR-3,m, as $$CDR\text{-}1, m = \frac{x2(Mz)}{x2(Mw)}$$

$$CDR\text{-}2, m = \frac{x2(Mz)}{x2\left(\frac{Mw+Mn}{2}\right)}$$

$$CDR\text{-}3, m = \frac{x2\left(\frac{Mz+Mw}{2}\right)}{x2\left(\frac{Mw+Mn}{2}\right)}$$

where x2(Mw) is the % mole co-monomer signal corresponding to a molecular weight of Mw, x2(Mz) is the % mole co-monomer signal corresponding to a molecular weight of Mz, x2[(Mw+Mn)/2)] is the % mole co-monomer signal corresponding to a molecular weight of (Mw+Mn)/2, and x2[(Mz+Mw)/2] is the % mole co-monomer signal corresponding to a molecular weight of Mz+Mw/2, where Mw is the weight-average molecular weight, Mn is the number-average molecular weight, and Mz is the z-average molecular weight.

All molecular weights are weight average ($M_w$) unless otherwise noted. All molecular weights are reported in g/mol unless otherwise noted.

Melt index (MI) also referred to as I2, reported in g/10 min, is determined according to ASTM D1238, 190° C., 2.16 kg load.

High load melt index (HLMI) also referred to as I21, reported in g/10 min, is determined according to ASTM D1238, 190° C., 21.6 kg load.

Melt index ratio (MIR) is MI divided by HLMI as determined by ASTM D1238.

Room temperature is 23° C. unless otherwise indicated.

Density is determined according to ASTM 1505.

Catalyst Compounds

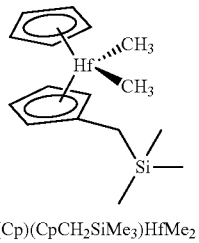

(Cp)(CpCH$_2$SiMe$_3$)HfMe$_2$

Complex 1

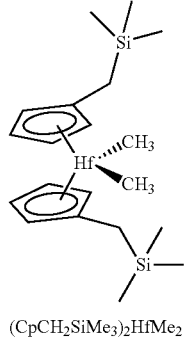

(CpCH$_2$SiMe$_3$)$_2$HfMe$_2$

Complex 2

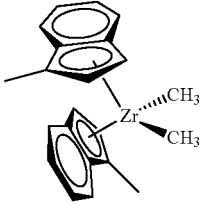

rac,meso(1-methylindenyl)$_2$ZrMe$_2$

Complex 3

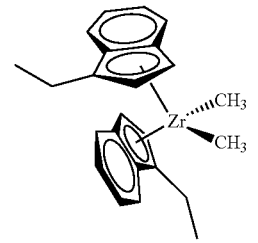

rac,meso(1-ethylindenyl)$_2$ZrMe$_2$

Complex 4

Polymerizations

All reactions were performed in an inert N$_2$ purged glove box unless otherwise stated. All anhydrous solvents were purchased from Fisher Chemical and were degassed and dried over molecular sieves prior to use. Deuterated solvents were purchased from Cambridge Isotope Laboratories and dried over molecular sieves prior to use. n-Butyl lithium (2.5 M solution in hexane), dicyclopentadiene, dimethyl sulfide (Me$_2$S) and tributyltin chloride (Bu$_3$SnCl) were purchased from Sigma-Aldrich. Hafnium tetrachloride (HfCl$_4$) 99+%, and trimethylsilylmethyl trifluoromethanesulfonate were purchased from Strem Chemicals and TCI America respectively, and used as received. (Cyclopentadienyl)trichlorohafnium dimethoxyethane (CpHfCl$_3$(dme))[1], potassium cyclopentadienide (KCp)[2] and tributyltin cyclopentadienyl (Bu$_3$SnCp)[3] were prepared according to the literature methods. The $^1$H NMR measurements were recorded on a 400 MHz Bruker spectrometer.

Synthesis of trimethylsilylmethyl cyclopentadiene, Me$_3$SiCH$_2$CpH

A neat trimethylsilylmethyl trifluoromethanesulfonate (25.0 g, 105.8 mmol) was dissolved in 300 mL of diethyl ether and cooled to −25° C.; to this a solid potassium cyclopentadienide (11.14 g, 106.9 mmol) was slowly added over a period of 10-15 minutes. The resulting mixture was stirred overnight at room temperature. Insoluble materials were filtered out. Volatiles from the reaction mixture were carefully removed under dynamic vacuum to avoid evaporating the volatile trimethylsilylmethyl cyclopentadiene, Me$_3$SiCH$_2$CpH. The reaction flask (250 mL round bottom flask) and frit with celite were weighted to calculate yield of the product after extraction. The crude materials were then extracted into pentane (3×50 mL) and used without any further purification. Based on above mathematical method, the yield is calculated as 15.47 g (95.2%). The $^1$H NMR spectrum was recorded for the crude material to ensure the product formation. $^1$H NMR (400 MHz, C$_6$D$_6$): δ-0.05 (9H, s, Si—CH$_3$), 1.77 (2H, d, J$_{HH}$=1.2 Hz, Me$_3$Si—CH$_2$), 2.83 (1H, sex, J$_{HH}$=1.5 Hz, Cp-CH), 5.80-6.49 (4H, m, Cp-CH) ppm.

Synthesis of lithium trimethylsilylmethyl cyclopentadienide, Me$_3$SiCH$_2$CpLi

A hexane solution of n-butyl lithium (41.5 mL, 103.8 mmol, 2.5 M solution) was added drop wise to a precooled solution (1:1 mixture of pentane and diethyl ether, 200 mL) of Me$_3$SiCH$_2$CpH (15.47 g, 101.7 mmol) over a period of 40-50 minutes at −25° C. The resulting mixture was gradually brought to room temperature and then continuously stirred overnight. Volatiles were removed in vacuo and remaining crude materials were thoroughly washed with pentane. The final materials were dried under vacuum to obtain a colorless crystalline solid of Me$_3$SiCH$_2$CpLi in 13.6 g (84.6%) yield. $^1$H NMR (400 MHz, THF-d$_8$): δ-0.09 (9H, s, Si—CH$_3$), 1.84 (2H, s, Me$_3$Si—CH$_2$), 5.36 (2H, t, J$_{HH}$=2.6 Hz, Cp-CH), 5.47 (2H, t, J$_{HH}$=2.6 Hz, Cp-CH) ppm.

Synthesis of (Cyclopentadienyl)(trimethylsilylmethyl cyclopentadienyl)hafnium dichloride, (Cp)(Me$_3$SiCH$_2$Cp)HfCl$_2$ A solid (cyclopentadienyl)trichlorohafnium dimethoxyethane (5.0 g, 11.36 mmol) was slurried in 100 mL of precooled diethyl ether, and to this a solid Me$_3$SiCH$_2$CpLi (1.80 g, 11.36 mmol) was added over a period of 3-5 minutes. The resulting mixture was stirred overnight at room temperature. All volatiles were removed in vacuo and the crude materials were subsequently extracted into dichloromethane. Solvents were removed under reduced pressure and then thoroughly washed with cold hexane to get rid of organic soluble impurities. Spectroscopically pure material of (Cp)(Me$_3$SiCH$_2$Cp)HfCl$_2$ was obtained as a pale yellow solid in 5.2 g (98.1%) yield. $^1$H NMR (400 MHz, CD$_2$Cl$_2$): δ-0.03 (9H, s, SiMe$_3$-CH$_3$), 2.09 (2H, s, Me$_3$Si—CH$_2$), 5.89 (2H, t, J$_{HH}$=2.6 Hz, Cp-CH), 6.20 (2H, t, J$_{HH}$=2.6 Hz, Cp-CH), 6.36 (5H, s, Cp-CH) ppm.

Synthesis of (Cyclopentadienyl)(trimethylsilylmethyl cyclopentadienyl)hafnium dimethyl, (Cp)(Me$_3$SiCH$_2$Cp)HfMe$_2$ An ethereal solution of MeLi (14.1 mL, 22.6 mmol) was added drop wise to a precooled diethyl ether solution of (Cp)(Me$_3$SiCH$_2$Cp)HfCl$_2$ (5.2 g, 11.2 mmol) over a period of 10-15 minutes at −25° C. The resulting mixture was stirred overnight at room temperature to ensure completion of the reaction. Insoluble materials were filtered through a pad of celite. Volatiles from the filtrate were removed under vacuum. The crude materials were triturated with pentane and then extracted into pentane, followed by solvent removal afforded a colorless crystalline material of (Cp)(Me$_3$SiCH$_2$Cp)HfMe$_2$ in 4.7 g (98.7%) yield. $^1$H NMR (400 MHz, C$_6$D$_6$): δ-0.27 (6H, s, Hf—CH$_3$), −0.01 (9H, s, SiMe$_3$-CH3), 1.79 (2H, s, Me$_3$Si—CH$_2$), 5.44-5.39 (4H, m, Cp-CH), 5.73 (5H, s, Cp-CH) ppm.

Synthesis of Bis-(trimethylsilylmethyl cyclopentadienide)hafnium dichloride, (Me$_3$SiCH$_2$Cp)$_2$HfCl$_2$ A solid HfCl$_4$ (1.011 g, 3.16 mmol) was slurried in precooled diethyl ether (30 mL) at −25° C., and to this a solid Me$_3$SiCH$_2$CpLi (1.0 g, 6.3 mmol) was added over a period of 3-5 minutes. The resulting mixture was stirred overnight at room temperature. All volatiles were removed in vacuo and the crude materials were subsequently extracted into dichloromethane. Solvents were removed under reduced pressure resulted spectroscopically pure (Me$_3$SiCH$_2$Cp)$_2$HfCl$_2$ as a colorless solid in 1.13 g (70%) yield. $^1$H NMR (400 MHz C$_6$D$_6$): δ-0.11 (18H, s, SiMe$_3$-CH$_3$), 2.18 (4H, s, Me$_3$Si—CH$_2$), 5.68 (8H, s, Cp-CH) ppm.

Synthesis of Bis-(trimethylsilylmethyl cyclopentadienyl)hafnium dimethyl, (Me$_3$SiCH$_2$Cp)$_2$HfMe$_2$ An ethereal solution of MeLi (2.56 mL, 4.1 mmol) was added drop wise to a precooled diethyl ether solution of (Me$_3$SiCH$_2$Cp)$_2$HfCl$_2$ (1.12 g, 2.03 mmol) over a period of 3-5 minutes at −25° C. The resulting mixture was stirred overnight at room temperature to ensure completion of the reaction. Insoluble materials were filtered through a pad of celite. Volatiles from the filtrate were removed under vacuum. The crude materials were triturated with pentane and then extracted into pentane, followed by solvent removal afforded a colorless crystalline material of (Me$_3$SiCH$_2$Cp)$_2$HfMe$_2$ in 875 mg (84.2%) yield. $^1$H NMR (400 MHz, C$_6$D$_6$): δ-0.23 (6H, s, Hf—CH$_3$), 0.02 (18H, s, SiMe$_3$-CH3), 1.89 (4H, s, Me$_3$Si—CH$_2$), 5.54-5.48 (8H, m, Cp-CH) ppm.

Supported Catalyst Syntheses

ES-70 875C SMAO is methylalumoxane supported on silica ES-70 (PQ Corporation, Conshohocken, Pa.) that has been calcined at 875° C. and was prepared as follows.

In a 4 L stirred vessel in the drybox methylaluminoxane (MAO) (30 wt % in toluene) is added along with 2400 g of toluene. This solution is then stirred at 60 RPM for 5 minutes. ES-70 silica that has been calcined at 875° C. was then added to the vessel. This slurry is heated at 100° C. and stirred at 120 RPM for 3 hours. The temperature was then lowered and the mixture was allowed to cool to ambient temperature over 2 hours. The stirrer was then set to 8 RPM and placed under vacuum for 72 hours. After emptying the vessel and sieving the supported MAO, 1014 g was obtained.

Supported Catalyst Pair A (Bis(trimethylsilylmethyl-cyclopentadienide)hafnium(IV) dimethyl):(bis(1-methylindenyl)zirconium (IV) dimethyl)

A 1.0 g amount of prepared ES-70 875C SMAO was stirred in 10 mL of toluene using a Celstir™ flask. Bis(trimethylsilylmethyl-cyclopentadienide)hafnium(IV) dimethyl (16.3 mg, 32 µmol) and bis(1-methylindenyl)zirconium(IV) dimethyl (3.0 mg, 8 µmol) were added to the slurry and stirred for three hours. The mixture was filtered, washed with several 10 mL portions of hexane and then dried under vacuum, yielding 0.86 g of light yellow silica.

Supported Catalyst Pair B (Trimethylsilylmethylcyclopentadienide(cyclopentadienide)hafnium(IV) dimethyl):(bis(1-methylindenyl)zirconium(IV) dimethyl); Ratio: 6:1

A 1.0 g amount of prepared ES-70 875C SMAO was stirred in 10 mL of toluene using a Celstir™ flask. Trimethylsilylmethylcyclopentadienide(cyclopentadienide)hafnium(IV) dimethyl (14.4 mg, 34.4 µmol) and bis(1-methylindenyl)zirconium(IV) dimethyl (2.2 mg, 5.6 mol) were added to the slurry and stirred for three hours. The mixture was filtered, washed with several 10 mL portions of hexane and then dried under vacuum, yielding 0.90 g of off-white silica.

Supported Catalyst Pair C (Bis-trimethylsilylmethylcyclopentadienide hafnium (IV) dimethyl):(bis-ethylindenyl zirconium (IV) dimethyl); Ratio: 4:1

To a stirred vessel 1400 g of toluene was added along with 925 g of methylaluminoxane (30 wt % in toluene). To this solution 734 g of ES 70 silica, available from PQ Corporation (calcined at 875° C.) was added. The mixture was stirred for three hours at 100° C. after which the temperature was reduced and the reaction was allowed to cool to ambient temperature.

Bis-trimethylsilylmethylcyclopentadienide hafnium (IV) dimethyl (16.35 g, 32.00 mmol) and bis-ethylindenyl zirconium (IV) dimethyl (3.26 g, 8.00 mmol) were then dissolved in toluene (250 g) and added to the vessel, which was stirred for two more hours. The mixing speed was then reduced and stirred slowly while drying under vacuum for 60 hours, after which 1038 g of light yellow silica was obtained.

Polymerization with Organosilica Support Catalyst Systems

A 2 L autoclave was heated to 110° C. and purged with $N_2$ for at least 30 minutes. It was charged with dry NaCl (350 g; Fisher, S271-10 dehydrated at 180° C. and subjected to several pump/purge cycles and finally passed through a 16 mesh screen prior to use) and ES-70 875C SMAO (5 g) at 105° C. and stirred for 30 minutes. The temperature was adjusted to 85° C. At a pressure of 2 psig $N_2$, dry, degassed 1-hexene (2.0 mL) was added to the reactor with a syringe then the reactor was charged with $N_2$ to a pressure of 20 psig. A mixture of $H_2$ and $N_2$ was flowed into reactor (120 SCCM; 10% $H_2$ in $N_2$) while stirring the bed.

Catalysts indicated in Table 1 were injected into the reactor with ethylene at a pressure of 220 psig; ethylene flow was allowed over the course of the run to maintain constant pressure in the reactor. 1-hexene was fed into the reactor as a ratio to ethylene flow (0.1 g/g). Hydrogen was fed to the reactor as a ratio to ethylene flow (0.5 mg/g). The hydrogen and ethylene ratios were measured by on-line GC analysis. Polymerizations were halted after 1 hour by venting the reactor, cooling to room temperature then exposing to air. The salt was removed by washing with water two times; the polymer was isolated by filtration, briefly washed with acetone and dried in air for at least two days.

TABLE 1

Gas Phase Polymerization of Ethylene and 1-Hexene

| Supported Catalyst | MI dg/min | MIR | Mw g/mol | Mn g/mol | Mz g/mol | Mw/Mn | Mz/Mw | Hexene wt % | Activity gP/gsup. Cat. | g'(vis) | RCI, m | CDR-2 m |
|---|---|---|---|---|---|---|---|---|---|---|---|---|
| bis-(nPrCp)HfMe$_2$ | 1.23 | 18 | 102,605 | 34,368 | 179,343 | 2.99 | 1.75 | 11.1 | 8000 | 0.984 | 52.0 | 1.23 |
| Supported Catalyst Pair B | 0.466 | 26 | 147,198 | 24,000 | 544,487 | 6.13 | 3.70 | 8.78 | 4364 | 0.941 | 188.3 | 1.97 |
| Supported Catalyst Pair A | 1.4 | 36 | 85,570 | 22,393 | 172,891 | 3.82 | 2.02 | 9.91 | 10752 | 0.950 | 52.4 | 1.29 |

Gas Phase Pilot Run for Supported Catalyst Pair C

Polymerization was performed in an 18.5 foot tall gas-phase fluidized bed reactor with a 10 foot body and an 8.5 foot expanded section. Cycle and feed gases were fed into the reactor body through a perforated distributor plate, and the reactor was controlled at 300 psi and 70 mol % ethylene. The reactor temperature was maintained at 185° F. throughout the polymerization by controlling the temperature of the cycle gas loop. Hydrogen was lowered and hexene was roughly the same compared to a standard bis-(nPrCp)HfMe$_2$ catalyst. This indicates that the supported catalyst pair C had less overall molecular weight capability than the standard, but a similar level of comonomer incorporation. These responses could be varied by adjusting the ratio of the two catalyst pairs. Roughly a 65% increase in activity was also observed for the supported catalyst pair C compared to the (nPr)HfMe$_2$ catalyst.

TABLE 2

Gas Phase Pilot Run for Supported Catalyst Pair C

| Data Point Catalyst | (nPr)HfMe$_2$ | Cat Pair C |
|---|---|---|
| Process Data | | |
| H$_2$ conc. (molppm) | 348 | 250 |
| Hydrogen flow (mlb/hr) | 2.96 | 4.21 |
| C$_6$/C$_2$ Ratio (mol %/mol %) | 0.013 | 0.014 |
| Comonomer conc. (mol %) | 0.90 | 0.95 |
| C$_2$ conc. (mol %) | 70 | 70 |
| Comonomer/C$_2$ Flow Ratio | 0.079 | 0.080 |
| C$_2$ flow (lb/hr) | 107 | 117 |
| H$_2$/C$_2$ Ratio (ppm/mol %) | 5.0 | 3.6 |
| Rx. Pressure (psig) | 300 | 300 |
| Reactor Temp (F) | 185 | 185 |
| Avg. Bedweight (lb) | 322 | 383 |
| Production (lb/hr) | 70 | 72 |
| Residence Time (hr) | 4.6 | 5.3 |
| Avg Velocity (ft/s) | 2.25 | 2.25 |
| Catalyst Feed (g/hr) | 5.015 | 3.111 |
| Cat Activity (g poly/g cat) | 6314 | 10477 |
| Product Data | | |
| Melt Index (MI) dg/min | 1.04 | 0.98 |
| HLMI dg/min | 23.32 | 22.56 |
| HLMI/MI Ratio | 22.43 | 22.96 |
| Density g/cc | 0.9180 | 0.9178 |

Overall, catalyst systems of the present invention can provide increased activity or enhanced polymer properties, to increase conversion or comonomer incorporation, or to alter comonomer distribution. Catalyst systems and processes of the present invention can also provide ethylene polymers having the unique properties of high stiffness, high toughness and good processability.

All documents described herein are incorporated by reference herein, including any priority documents and/or testing procedures to the extent they are not inconsistent with this text. As is apparent from the foregoing general description and the specific embodiments, while forms of the embodiments have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of."

What is claimed is:

1. A supported catalyst system comprising:
   an unbridged hafnium metallocene compound;
   an unbridged zirconium metallocene compound;
   a support material; and
   an activator;
   wherein the unbridged hafnium metallocene compound is represented by formula (A):

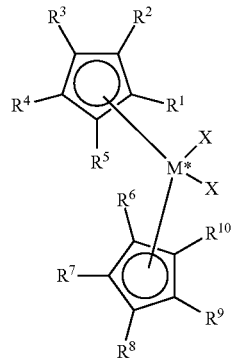

(A)

where:
   M* is Hf;
   each of R$^1$, R$^2$, R$^4$, and R$^5$ is independently hydrogen, alkoxide, or C$_1$ to C$_{40}$ substituted or unsubstituted hydrocarbyl;
   R$^3$ is independently hydrogen, alkoxide, C$_1$ to C$_{40}$ substituted or unsubstituted hydrocarbyl, or —R$^{11}$—SiR'$_3$ or —R$^{11}$—CR'$_3$ where R$^{11}$ is a C$_1$ to C$_4$ hydrocarbyl, and each R' is independently C$_1$ to C$_{20}$ substituted or unsubstituted hydrocarbyl;
   each R$^6$, R$^7$, R$^8$, and R$^{10}$ is independently hydrogen, halide, alkoxide, or C$_1$ to C$_{40}$ substituted or unsubstituted hydrocarbyl;
   R$^9$ is —CH$_2$—SiMe$_3$, —CH$_2$—SiEt$_3$, —CH$_2$—SiPr$_3$, —CH$_2$—SiBu$_3$, —CH$_2$—SiCy$_3$, —CH$_2$—SiH(CH$_3$)$_2$, —CH$_2$SiPh$_3$, —CH$_2$—Si(CH$_3$)$_2$Ph, —CH$_2$—Si(CH$_3$)Ph$_2$, —CH$_2$—Si(Et)$_2$Ph, —CH$_2$—Si(Et)Ph$_2$, —CH$_2$—Si(CH$_2$)$_3$Ph, —CH$_2$—Si(CH$_2$)$_4$Ph, —CH$_2$—Si(Cy)Ph$_2$, —CH$_2$—Si(Cy)$_2$Ph; —CH$_2$—Si(CH$_3$)$_2$Cy, or —CH$_2$—Si(CH$_3$)Cy$_2$;
   each X is independently a univalent anionic ligand, or two Xs are joined to form a metallocyclic ring, or two Xs are joined to form a chelating ligand, a diene ligand, or an alkylidene ligand;
   and the unbridged zirconium metallocene compound is represented by formula (B):

$$Cp^A Cp^B ZrX'_n \qquad (B)$$

wherein
Cp$^A$ is selected from the group consisting of cyclopentadienyl, substituted cyclopentadieny, indenyl, and substituted indenyl;
Cp$^B$ is substituted indenyl;
each X' is independently a halide, a hydride, an alkyl group, an alkenyl group or an arylalkyl group; and
n is 1 or 2.

2. The supported catalyst system of claim 1, wherein M* of formula (A) is Hf, each R$^1$, R$^2$, R$^3$, R$^4$ and R$^5$ is C$_1$ to C$_{20}$ alkyl.

3. The supported catalyst system of claim 1, wherein R$^9$ is —CH$_2$—SiMe$_3$, —CH$_2$—SiEt$_3$, —CH$_2$—SiPr$_3$, —CH$_2$—SiBu$_3$, —CH$_2$—SiCy$_3$, —CH$_2$—SiH(CH$_3$)$_2$, —CH$_2$SiPh$_3$, —CH$_2$—Si(CH$_3$)$_2$Ph, —CH$_2$—Si(CH$_3$)Ph$_2$, —CH$_2$—Si(Et)$_2$Ph, —CH$_2$—Si(Et)Ph$_2$, —CH$_2$—Si(CH$_2$)$_3$Ph, —CH$_2$—Si(CH$_2$)$_4$Ph, —CH$_2$—Si(Cy)Ph$_2$, or —CH$_2$—Si(Cy)$_2$Ph.

4. The supported catalyst system of claim 1, wherein the unbridged zirconium metallocene compound is selected from the group consisting of: rac/meso-bis(1-ethylindenyl)zirconium dimethyl, rac/meso-bis(1-methylindenyl)zirconium dichloride, rac/meso-bis(1-methylindenyl)zirconium dimethyl, rac/meso-bis(1-propylindenyl)zirconium dichloride, rac/meso-bis(1-propylindenyl)zirconium dimethyl, rac/meso-bis(1-butylindenyl)zirconium dichloride, rac/meso-bis(1-butylindenyl)zirconium dimethyl, meso-bis(1ethylindenyl) zirconium dichloride, meso-bis(1-ethylindenyl) zirconium dimethyl, (1-methylindenyl)(pentamethylcyclopentadienyl) zirconium dichloride, and (1-methylindenyl)(pentamethyl cyclopentadienyl) zirconium dimethyl, and the alkyl or halide versions thereof where the dimethyl is replaced with $Bz_2$, $Et_2$, $Ph_2$, $Br_2$, or $I_2$.

5. The supported catalyst system of claim 1, wherein the support material has a surface area from 10 $m^2/g$ to 700 $m^2/g$ and an average particle diameter from 10 μm to 500 μm.

6. The supported catalyst system of claim 1, wherein the support material is selected from the group consisting of silica, alumina, silica-alumina, and combinations thereof.

7. The supported catalyst system of claim 1, wherein the support material is fluorided, or sulfated.

8. The supported catalyst system of claim 7, wherein the support material has a fluorine concentration in the range of 0.6 wt % to 3.5 wt %, based upon the weight of the support material.

9. The supported catalyst system of claim 1, wherein the activator comprises alumoxane or a noncoordinating anion.

10. The supported catalyst system of claim 1, wherein the activator is methylalumoxane.

11. The supported catalyst system of claim 1, wherein the support is a silica aluminate and is treated with an electron withdrawing anion such as fluoride or sulphate.

12. The supported catalyst system of claim 1, wherein the electron withdrawing anion treated supported is treated with an alkyl aluminum.

13. The supported catalyst system of claim 1, wherein the electron withdrawing anion treated supported is treated with an alkyl aluminum and is substantially free of methyl alumoxane or a noncoordinating anion.

14. The supported catalyst system of claim 1, wherein the unbridged metallocene compound represented by formula (B) is present in the catalyst system as at least two isomers.

15. The supported catalyst system of claim 1, wherein the activator comprises one or more of: N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Me_3NH^+][B(C_6F_5)^{4-}]$, 1-(4-(tris(pentafluorophenyl)borate)-2,3,5,6-tetrafluorophenyl) pyrrolidinium; $[Me_3NH^+][B(C_6F_5)^{4-}]$, 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, 4-(tris(pentafluorophenyl)borate)-2,3,5,6-tetrafluoropyridinium, solidium tetrakis(perfluorophenyl)aluminate, potassium terakis(pentafluorophenyl), and N,N-dimethylanilinium tetrakis(perfluorophenyl)aluminate.

16. A supported catalyst system comprising:
an unbridged hafnium metallocene compound;
an unbridged zirconium metallocene compound;
a support material; and
an activator;
wherein the unbridged zirconium metallocene compound is represented by formula (B):

$Cp^A Cp^B ZrX'_n$ (B)

wherein
$Cp^A$ is selected from the group consisting of cyclopentadienyl, substituted cyclopentadieny, indenyl, and substituted indenyl,
$Cp^B$ is substituted indenyl,
each X' is independently a halide, a hydride, an alkyl group, an alkenyl group or an arylalkyl group, and
n is 1 or 2; and
the unbridged hafnium metallocene compound is one or more of:
$(Cp)(3-CH_2—SiMe_3-Cp)HfMe_2$; $(MeCp)(3-CH_2—SiMe_3-Cp)HfMe_2$; $(EtCp)(3-CH_2—SiMe_3-Cp)HfMe_2$; $(PrCp)(3-CH_2—SiMe_3-Cp)HfMe_2$; $(BuCp)(3-CH_2—SiMe_3-Cp)HfMe_2$; $(BzCp)(3-CH_2—SiMe_3-Cp)HfMe_2$; $(3-CH_2—SiMe_3-Cp)_2HfMe_2$; $(Me_3Cp)(3-CH_2—SiMe_3-Cp)HfMe_2$; $(Me_4Cp)(3-CH_2—SiMe_3-Cp)HfMe_2$; $(Me_5Cp)(3-CH_2—SiMe_3-Cp)HfMe_2$; (1-Me, 3-Bu-Cp)(3-CH_2—SiMe_3-Cp)HfMe_2$; (1-Me, 3-Ph-Cp)(3-CH_2—SiMe_3-Cp)HfMe_2$; $(Me_4Cp-Pr)(3-CH_2—SiMe_3-Cp)HfMe_2$; $(Me_4Cp-CH_2—SiMe_3)(3-CH_2—SiMe_3-Cp)HfMe_2$; (2-Me,3-CH_2—SiMe_3-Ind)_2HfMe_2$; (2-Et,3-CH_2—SiMe_3-Ind)_2HfMe_2$; (2-Pr,3-CH_2—SiMe_3-Ind)_2HfMe_2$; (2-Bu,3-CH_2—SiMe_3-Ind)_2HfMe_2$; (2-Ph,3-CH_2—SiMe_3-Ind)_2HfMe_2$; $(3-CH_2—SiMe_3-Ind)_2HfMe_2$; $(3-CH_2—SiMe_3-Ind)(3-CH_2—SiMe_3-Cp)HfMe_2$; (3-Me-Ind)(3-CH_2—SiMe_3-Cp)HfMe_2$; (3-Et-Ind)(3-CH_2—SiMe_3-Cp)HfMe_2$; (3-Pr-Ind)(3-CH_2—SiMe_3-Cp)HfMe_2$; (3-Bu-Ind)(3-CH_2—SiMe_3-Cp)HfMe_2$; $(Cp)(3-CH_2—SiMe_3-Ind)HfMe_2$; $(MeCp)(3-CH_2—SiMe_3-Ind)HfMe_2$; $(EtCp)(3-CH_2—SiMe_3-Ind)HfMe_2$; $(PrCp)(3-CH_2—SiMe_3-Ind)HfMe_2$; $(BuCp)(3-CH_2—SiMe_3-Ind)HfMe_2$; $(Me_3Cp)(3-CH_2—SiMe_3-Ind)HfMe_2$; $(Me_4Cp)(3-CH_2—SiMe_3-Ind)HfMe_2$; $(Me_5Cp)(3-CH_2—SiMe_3-Ind)HfMe_2$; (1-Me, 3-Bu-Cp)(3-CH_2—SiMe_3-Ind)HfMe_2$; (1-Me, 3-Ph-Cp)(3-CH_2—SiMe_3-Ind)HfMe_2$; $(Cp)(3-CH_2—SiMe_3-Cp)HfMe_2$; $(MeCp)(3-CH_2—SiMe_3-Cp)HfMe_2$; $(EtCp)(3-CH_2—SiMe_3-Cp)HfMe_2$; $(PrCp)(3-CH_2—SiMe_3-Cp)HfMe_2$; $(BuCp)(3-CH_2—SiMe_3-Cp)HfMe_2$; $(BzCp)(3-CH_2—SiMe_3-Cp)HfMe_2$; $(3-CH_2—SiMe_3-Cp)_2HfMe_2$; $(Me_2Cp)(3-CH_2—SiMe_3-Cp)HfMe_2$; $(Me_3Cp)(3-CH_2—SiMe_3-Cp)HfMe_2$; $(Me_4Cp)(3-CH_2—SiMe_3-Cp)HfMe_2$; $(Me_5Cp)(3-CH_2—SiMe_3-Cp)HfMe_2$; $(Et_2Cp)(3-CH_2—SiMe_3-Cp)HfMe_2$; $(Et_3Cp)(3-CH_2—SiMe_3-Cp)HfMe_2$; $(Et_4Cp)(3-CH_2—SiMe_3-Cp)HfMe_2$; $(Et_5Cp)(3-CH_2—SiMe_3-Cp)HfMe_2$; $(Pr_2Cp)(3-CH_2—SiMe_3-Cp)HfMe_2$; $(Pr_3Cp)(3-CH_2—SiMe_3-Cp)HfMe_2$; $(Pr_4Cp)(3-CH_2—SiMe_3-Cp)HfMe_2$; $(Pr_5Cp)(3-CH_2—SiMe_3-Cp)HfMe_2$; $(Bu_2Cp)(3-CH_2—SiMe_3-Cp)HfMe_2$; $(Bu_3Cp)(3-CH_2—SiMe_3-Cp)HfMe_2$; $(Bu_4Cp)(3-CH_2—SiMe_3-Cp)HfMe_2$; $(Bu_5Cp)(3-CH_2—SiMe_3-Cp)HfMe_2$; $(Bz_2Cp)(3-CH_2—SiMe_3-Cp)HfMe_2$; $(Bz_3Cp)(3-CH_2—SiMe_3-Cp)HfMe_2$; $(Bz_4Cp)(3-CH_2—SiMe_3-Cp)HfMe_2$; $(Bz_5Cp)(3-CH_2—SiMe_3-Cp)HfMe_2$; $(EtMe_4Cp)(3-CH_2—SiMe_3-Cp)HfMe_2$; $(PrMe_4Cp)(3-CH_2—SiMe_3-Cp)HfMe_2$; $(BuMe_4Cp)(3-CH_2—SiMe_3-Cp)HfMe_2$; $(PnMe_4Cp)(3-CH_2—SiMe_3-Cp)HfMe_2$; $(HxMe_4Cp)(3-CH_2—SiMe_3-Cp)HfMe_2$; $(BzMe_4Cp)(3-CH_2—SiMe_3-Cp)HfMe_2$; $(Me_4Cp-CH_2—SiMe_3)(3-CH_2—SiMe_3-Cp)HfMe_2$; $(Me_4Cp-CH_2—SiMe_2Ph)(3-CH_2—SiMe_3-Cp)HfMe_2$; $(Me_4Cp-CH_2—SiMe_2Ph)(3-CH_2—SiMe_3-Cp)HfMe_2$; $(Me_4Cp-CH_2—SiMePh_2)(3-CH_2—SiMe_3-Cp)HfMe_2$; $(Me_4Cp-CH_2—SiPh_3)(3-CH_2—SiMe_3-Cp)HfMe_2$; $(Me_4Cp-CH_2—SiMe_2Cy)(3-CH_2—SiMe_3-Cp)HfMe_2$; $(Me_4Cp-CH_2—SiMeCy_2)(3-CH_2—SiMe_3-Cp)HfMe_2$; $(Me_4Cp-CH_2—SiCy_3)(3-CH_2—SiMe_3-Cp)HfMe_2$; $(EtMe_3Cp)(3-CH_2—SiMe_3-Cp)HfMe_2$; $(PrMe_3Cp)(3-CH_2—SiMe_3-Cp)HfMe_2$;

(BuMe₃Cp)(3-CH₂—SiMe₃-Cp)HfMe₂; (BzMe₃Cp)(3-CH₂—SiMe₃-Cp)HfMe₂; (Me₃Cp-CH₂—SiMe₃)(3-CH₂—SiMe₃-Cp)HfMe₂; (Me₃Cp-CH₂—SiMe₂Ph)(3-CH₂—SiPh₃-Cp)HfMe₂; (Me₃Cp-CH₂—SiMePh₂)(3-CH₂—SiMe₃-Cp)HfMe₂; (Me₃Cp-CH₂—SiPh₃)(3-CH₂—SiMe₃-Cp)HfMe₂; (Me₃Cp-CH₂—SiMe₂Cy)(3-CH₂—SiMe₃-Cp)HfMe₂; (Me₃Cp-CH₂—SiMeCy₂)(3—CH₂—SiMe₃-Cp)HfMe₂; (Me₃Cp-CH₂—SiCy₃)(3-CH₂—SiMe₃-Cp)HfMe₂; (MeEtCp)(3-CH₂—SiMe₃-Cp)HfMe₂; (MePrCp)(3-CH₂—SiMe₃-Cp)HfMe₂; (MeBuCp)(3-CH₂—SiMe₃-Cp)HfMe₂; (BzMeCp)(3-CH₂—SiMe₃-Cp)HfMe₂; (EtPrCp)(3-CH₂—SiMe₃-Cp)HfMe₂; (EtBuCp)(3-CH₂—SiMe₃-Cp)HfMe₂; (BzEtCp)(3-CH₂—SiMe₃-Cp)HfMe₂; (PrBuCp)(3-CH₂—SiMe₃-Cp)HfMe₂; (BzPrCp)(3-CH₂—SiMe₃-Cp)HfMe₂; (BuBzCp)(3-CH₂—SiMe₃-Cp)HfMe₂; (Cp)(3-CH₂—SiMe₂Ph-Cp)HfMe₂; (MeCp)(3-CH₂—SiMe₂Ph-Cp)HfMe₂; (EtCp)(3-CH₂—SiMe₂Ph-Cp)HfMe₂; (PrCp)(3-CH₂—SiMe₂Ph-Cp)HfMe₂; (BuCp)(3-CH₂—SiMe₂Ph-Cp)HfMe₂; (BzCp)(3-CH₂—SiMe₂Ph-Cp)HfMe₂; (3-CH₂—SiMe₂Ph-Cp)₂HfMe₂; (Me₂Cp)(3-CH₂—SiMe₂Ph-Cp)HfMe₂; (Me₃Cp)(3-CH₂—SiMe₂Ph-Cp)HfMe₂; (Me₄Cp)(3-CH₂—SiMe₂Ph-Cp)HfMe₂; (Me₅Cp)(3-CH₂—SiMe₂Ph-Cp)HfMe₂; (Et₂Cp)(3-CH₂—SiMe₂Ph-Cp)HfMe₂; (Et₃Cp)(3-CH₂—SiMe₂Ph-Cp)HfMe₂; (Et₄Cp)(3-CH₂—SiMe₂Ph-Cp)HfMe₂; (Et₅Cp)(3-CH₂—SiMe₂Ph-Cp)HfMe₂; (Pr₂Cp)(3-CH₂—SiMe₂Ph-Cp)HfMe₂; (Pr₃Cp)(3-CH₂—SiMe₂Ph-Cp)HfMe₂; (Pr₄Cp)(3-CH₂—SiMe₂Ph-Cp)HfMe₂; (Pr₅Cp)(3-CH₂—SiMe₂Ph-Cp)HfMe₂; (Bu₂Cp)(3-CH₂—SiMe₂Ph-Cp)HfMe₂; (Bu₃Cp)(3-CH₂—SiMe₂Ph-Cp)HfMe₂; (Bu₄Cp)(3-CH₂—SiMe₂Ph-Cp)HfMe₂; (Bu₅Cp)(3-CH₂—SiMe₂Ph-Cp)HfMe₂; (Bz₂Cp)(3-CH₂—SiMe₂Ph-Cp)HfMe₂; (Bz₃Cp)(3-CH₂—SiMe₂Ph-Cp)HfMe₂; (Bz₄Cp)(3-CH₂—SiMe₂Ph-Cp)HfMe₂; (Bz₅Cp)(3-CH₂—SiMe₂Ph-Cp)HfMe₂; (EtMe₄Cp)(3-CH₂—SiMe₂Ph-Cp)HfMe₂; (PrMe₄Cp)(3-CH₂—SiMe₂Ph-Cp)HfMe₂; (BuMe₄Cp)(3-CH₂—SiMe₂Ph-Cp)HfMe₂; (BzMe₄Cp)(3-CH₂—SiMe₂Ph-Cp)HfMe₂; (Me₄Cp-CH₂—SiMe₃)(3-CH₂—SiMe₂Ph-Cp)HfMe₂; (Me₄Cp-CH₂—SiMe₂Ph)(3-CH₂—SiMe₂Ph-Cp)HfMe₂; (Me₄Cp-CH₂—SiMePh₂)(3-CH₂—SiMe₂Ph-Cp)HfMe₂; (Me₄Cp-CH₂—SiPh₃)(3-CH₂—SiMe₂Ph-Cp)HfMe₂; (Me₄Cp-CH₂—SiMe₂Cy)(3-CH₂—SiMe₂Ph-Cp)HfCl₂; (Me₄Cp-CH₂—SiMeCy₂)(3-CH₂—SiMe₂Ph-Cp)HfCl₂; (Me₄Cp-CH₂—SiCy₃)(3-CH₂—SiMe₂Ph-Cp)HfMe₂; (EtMe₃Cp)(3-CH₂—SiMe₂Ph-Cp)HfMe₂; (PrMe₃Cp)(3-CH₂—SiMe₂Ph-Cp)HfMe₂; (BuMe₃Cp)(3-CH₂—SiMe₂Ph-Cp)HfMe₂; (BzMe₃Cp)(3-CH₂—SiMe₂Ph-Cp)HfMe₂; (Me₃Cp-CH₂—SiMe₃)(3-CH₂—SiMe₂Ph-Cp)HfMe₂; (Me₃Cp-CH₂—SiMe₂Ph)(3-CH₂—SiMe₂Ph-Cp)HfMe₂; (Me₃Cp-CH₂—SiMePh₂)(3-CH₂—SiMe₂Ph-Cp)HfMe₂; (Me₃Cp-CH₂—SiPh₃)(3-CH₂—SiMe₂Ph-Cp)HfMe₂; (Me₃Cp-CH₂—SiMe₂Cy)(3-CH₂—SiMe₂Ph-Cp)HfMe₂; (Me₃Cp-CH₂—SiMeCy₂)(3-CH₂—SiMe₂Ph-Cp)HfMe₂; (Me₃Cp-CH₂—SiCy₃)(3-CH₂—SiMe₂Ph-Cp)HfMe₂; (MeEtCp)(3-CH₂—SiMe₂Ph-Cp)HfMe₂; (MePrCp)(3-CH₂—SiMe₂Ph-Cp)HfMe₂; (MeBuCp)(3-CH₂—SiMe₂Ph-Cp)HfMe₂; (BzMeCp)(3-CH₂—SiMe₂Ph-Cp)HfMe₂; (EtPrCp)(3-CH₂—SiMe₂Ph-Cp)HfMe₂; (EtBuCp)(3-CH₂—SiMe₂Ph-Cp)HfMe₂; (BzEtCp)(3-CH₂—SiMe₂Ph-Cp)HfMe₂; (PrBuCp)(3-CH₂—SiMe₂Ph-Cp)HfMe₂; (BzPrCp)(3-CH₂—SiMe₂Ph-Cp)HfMe₂; (BuBzCp)(3-CH₂—SiMe₂Ph-Cp)HfMe₂; (Cp)(3-CH₂—SiMePh₂-Cp)HfMe₂; (MeCp)(3-CH₂—SiMePh₂-Cp)HfMe₂; (EtCp)(3-CH₂—SiMePh₂-Cp)HfMe₂; (PrCp)(3-CH₂—SiMePh₂-Cp)HfMe₂; (BuCp)(3-CH₂—SiMePh₂-Cp)HfMe₂; ((BzCp)(3-CH₂—SiMePh₂-Cp)HfMe₂; (3-CH₂—SiMePh₂-Cp)₂HfMe₂; (Me₂Cp)(3-CH₂—SiMePh₂-Cp)HfMe₂; (Me₃Cp)(3-CH₂—SiMePh₂-Cp)HfMe₂; (Me₄Cp)(3-CH₂—SiMePh₂-Cp)HfMe₂; (Me₅Cp)(3-CH₂—SiMePh₂-Cp)HfMe₂; (Et₂Cp)(3-CH₂—SiMePh₂-Cp)HfMe₂; (Et₃Cp)(3-CH₂—SiMePh₂-Cp)HfMe₂; (Et₄Cp)(3-CH₂—SiMePh₂-Cp)HfMe₂; (Et₅Cp)(3-CH₂—SiMePh₂-Cp)HfMe₂; (Pr₂Cp)(3-CH₂—SiMePh₂-Cp)HfMe₂; (Pr₃Cp)(3-CH₂—SiMePh₂-Cp)HfMe₂; (Pr₄Cp)(3-CH₂—SiMePh₂-Cp)HfMe₂; (Pr₅Cp)(3-CH₂—SiMePh₂-Cp)HfMe₂; (Bu₂Cp)(3-CH₂—SiMePh₂-Cp)HfMe₂; (Bu₃Cp)(3-CH₂—SiMePh₂-Cp)HfMe₂; (Bu₄Cp)(3-CH₂—SiMePh₂-Cp)HfMe₂; (Bu₅Cp)(3-CH₂—SiMePh₂-Cp)HfMe₂; (Bz₂Cp)(3-CH₂—SiMePh₂-Cp)HfMe₂; (Bz₃Cp)(3-CH₂—SiMePh₂-Cp)HfMe₂; (Bz₄Cp)(3-CH₂—SiMePh₂-Cp)HfMe₂; (Bz₅Cp)(3-CH₂—SiMePh₂-Cp)HfMe₂; (EtMe₄Cp)(3-CH₂—SiMePh₂-Cp)HfMe₂; (PrMe₄Cp)(3-CH₂—SiMePh₂-Cp)HfMe₂; (BuMe₄Cp)(3-CH₂—SiMePh₂-Cp)HfMe₂; (PnMe₄Cp)(3-CH₂—SiMePh₂-Cp)HfMe₂; (HxMe₄Cp)(3-CH₂—SiMePh₂-Cp)HfMe₂; (BzMe₄Cp)(3-CH₂—SiMePh₂-Cp)HfMe₂; (Me₄Cp-CH₂—SiMe₃)(3-CH₂—SiMePh₂-Cp)HfMe₂; (Me₄Cp-CH₂—SiMe₂Ph)(3-CH₂—SiMePh₂-Cp)HfMe₂; (Me₄Cp-CH₂—SiMePh₂)(3-CH₂—SiMePh₂-Cp)HfMe₂; (Me₄Cp-CH₂—SiPh₃)(3-CH₂—SiMePh₂-Cp)HfMe₂; (Me₄Cp-CH₂—SiMe₂Cy)(3-CH₂—SiMePh₂-Cp)HfMe₂; (Me₄Cp-CH₂—SiMeCy₂)(3-CH₂—SiMePh₂-Cp)HfMe₂; (Me₄Cp-CH₂—SiCy₃)(3-CH₂—SiMePh₂-Cp)HfMe₂; (EtMe₃Cp)(3-CH₂—SiMePh₂-Cp)HfMe₂; (PrMe₃Cp)(3-CH₂—SiMePh₂-Cp)HfMe₂; (BuMe₃Cp)(3-CH₂—SiMePh₂-Cp)HfMe₂; (BzMe₃Cp)(3-CH₂—SiMePh₂-Cp)HfMe₂; (Me₃Cp-CH₂—SiMe₃)(3-CH₂—SiMePh₂-Cp)HfMe₂; (Me₃Cp-CH₂—SiMe₂Ph)(3-CH₂—SiMePh₂-Cp)HfMe₂; (Me₃Cp-CH₂—SiMePh₂)(3-CH₂—SiMePh₂-Cp)HfMe₂; (Me₃Cp-CH₂—SiPh₃)(3-CH₂—SiMePh₂-Cp)HfMe₂; (Me₃Cp-CH₂—SiMe₂Cy)(3-CH₂—SiMePh₂-Cp)HfMe₂; (Me₃Cp-CH₂—SiMeCy₂)(3-CH₂—SiMePh₂-Cp)HfMe₂; (Me₃Cp-CH₂—SiCy₃)(3-CH₂—SiMePh₂-Cp)HfMe₂; (MeEtCp)(3-CH₂—SiMePh₂-Cp)HfMe₂; (MePrCp)(3-CH₂—SiMePh₂-Cp)HfMe₂; (MeBuCp)(3-CH₂—SiMePh₂-Cp)HfMe₂; (BzMeCp)(3-CH₂—SiMePh₂-Cp)HfMe₂; (EtPrCp)(3-CH₂—SiMePh₂-Cp)HfMe₂; (EtBuCp)(3-CH₂—SiMePh₂-Cp)HfMe₂; (BzEtCp)(3-CH₂—SiMePh₂-Cp)HfMe₂; (PrBuCp)(3-CH₂—SiMePh₂-Cp)HfMe₂; (BzPrCp)(3-CH₂—SiMePh₂-Cp)HfMe₂; (BuBzCp)(3-CH₂—SiMePh₂-Cp)HfMe₂; (Cp)(3-CH₂—SiPh₃-Cp)HfMe₂; (MeCp)(3-CH₂—SiPh₃-Cp)HfMe₂; (EtCp)(3-CH₂—SiPh₃-Cp)HfMe₂; (PrCp)(3-CH₂—SiPh₃-Cp)HfMe₂; (BuCp)(3-CH₂—SiPh₃-Cp)HfMe₂; (BzCp)(3-CH₂—SiPh₃-Cp)HfMe₂; (3-CH₂—SiPh₃-Cp)₂HfMe₂; (Me₂Cp)(3-CH₂—SiPh₃-Cp)HfMe₂; (Me₃Cp)(3-CH₂—SiPh₃-Cp)HfMe₂; (Me₄Cp)(3-CH₂—SiPh₃-Cp)HfMe₂; (Me₅Cp)(3-CH₂—SiPh₃-Cp)HfMe₂; (Et₂Cp)(3-CH₂—SiPh₃-Cp)HfMe₂; (Et₃Cp)(3-CH₂—SiPh₃-Cp)HfMe₂; (Et₄Cp)(3-CH₂—SiPh₃-Cp)HfMe₂; (Et₅Cp)(3-CH₂—SiPh₃-Cp)HfMe₂; (Pr₂Cp)(3-CH₂—SiPh₃-Cp)HfMe₂; (Pr₃Cp)(3-CH₂—SiPh₃-Cp)HfMe₂; (Pr₄Cp)(3-CH₂—SiPh₃-Cp)HfMe₂; (Pr₅Cp)(3-CH₂—SiPh₃-Cp)HfMe₂; (Bu₂Cp)(3-CH₂—SiPh₃-Cp)HfMe₂; (Bu₃Cp)(3-CH₂—SiPh₃-Cp)HfMe₂; (Bu₄Cp)(3-CH₂—SiPh₃-Cp)HfMe₂; (Bu₅Cp)(3-CH₂—SiPh₃-Cp)HfMe₂; (Bz₂Cp)(3-CH₂—SiPh₃-Cp)HfMe₂; (Bz₃Cp)(3-CH₂—SiPh₃-Cp)HfMe₂; (Bz₄Cp)(3-CH₂—SiPh₃-Cp)HfMe₂; (Bz₅Cp)(3-CH₂—SiPh₃-Cp)HfMe₂; (EtMe₄Cp)(3-CH₂—SiPh₃-Cp)HfMe₂; (PrMe₄Cp)(3-CH₂—SiPh₃-Cp)HfMe₂; (BuMe₄Cp)(3-CH₂—SiPh₃-Cp)HfMe₂; (BzMe₄Cp)(3-CH₂—SiPh₃-Cp)HfMe₂; (Me₄Cp-CH₂—SiMe₃)(3-CH₂—SiPh₃-Cp)HfMe₂; (Me₄Cp-CH₂—SiMe₂Ph)(3-CH₂—SiPh₃-Cp)HfMe₂; (Me₄Cp-CH₂—SiMePh₂)(3-CH₂—SiPh₃-Cp)HfMe₂; (Me₄Cp-CH₂—SiPh₃)(3-CH₂—SiPh₃-Cp)HfMe₂; (Me₄Cp-CH₂—SiMe₂Cy)(3-CH₂—SiPh₃-Cp)HfMe₂;

(Me₄Cp-CH₂—SiMeCy₂)(3-CH₂—SiPh₃-Cp)HfMe₂; (Me₄Cp-CH₂—SiCy₃)(3-CH₂—SiPh₃-Cp)HfMe₂; (EtMe₃Cp)(3-CH₂—SiPh₃-Cp)HfMe₂; (PrMe₃Cp)(3-CH₂—SiPh₃-Cp)HfMe₂; (BuMe₃Cp)(3-CH₂—SiPh₃-Cp)HfMe₂; (BzMe₃Cp)(3-CH₂—SiPh₃-Cp)HfMe₂; (Me₃Cp-CH₂—SiMe₃)(3-CH₂—SiPh₃-Cp)HfMe₂; (Me₃Cp-CH₂—SiMe₂Ph)(3-CH₂—SiPh₃-Cp)HfMe₂; (Me₃Cp-CH₂—SiMePh₂)(3-CH₂—SiPh₃-Cp)HfMe₂; (Me₃Cp-CH₂—SiPh₃)(3-CH₂—SiPh₃-Cp)HfMe₂; (Me₃Cp-CH₂—SiMe₂Cy)(3-CH₂—SiPh₃-Cp)HfMe₂; (Me₃Cp-CH₂—SiMeCy₂)(3-CH₂—SiPh₃-Cp)HfMe₂; (Me₃Cp-CH₂—SiCy₃)(3-CH₂—SiPh₃-Cp)HfMe₂; (MeEtCp)(3-CH₂—SiPh₃-Cp)HfMe₂; (MePrCp)(3-CH₂—SiPh₃-Cp)HfMe₂; (MeBuCp)(3-CH₂—SiPh₃-Cp)HfMe₂; (BzMeCp)(3-CH₂—SiPh₃-Cp)HfMe₂; (EtPrCp)(3-CH₂—SiPh₃-Cp)HfMe₂; (EtBuCp)(3-CH₂—SiPh₃-Cp)HfMe₂; (BzEtCp)(3-CH₂—SiPh₃-Cp)HfMe₂; (PrBuCp)(3-CH₂—SiPh₃-Cp)HfMe₂; (BzPrCp)(3-CH₂—SiPh₃-Cp)HfMe₂; (BuBzCp)(3-CH₂—SiPh₃-Cp)HfMe₂; (Cp)(3-CH₂—SiCyMe₂-Cp)HfMe₂; (MeCp)(3-CH₂—SiCyMe₂-Cp)HfMe₂; (EtCp)(3-CH₂—SiCyMe₂-Cp)HfMe₂; (PrCp)(3-CH₂—SiCyMe₂-Cp)HfMe₂; (BuCp)(3-CH₂—SiCyMe₂-Cp)HfMe₂; (BzCp)(3-CH₂—SiCyMe₂-Cp)HfMe₂; (3-CH₂—SiCyMe₂-Cp)₂HfMe₂; (Me₂Cp)(3-CH₂—SiCyMe₂-Cp)HfMe₂; (Me₃Cp)(3-CH₂—SiCyMe₂-Cp)HfMe₂; (Me₄Cp)(3-CH₂—SiCyMe₂-Cp)HfMe₂; (Me₅Cp)(3-CH₂—SiCyMe₂-Cp)HfMe₂; (Et₂Cp)(3-CH₂—SiCyMe₂-Cp)HfMe₂; (Et₃Cp)(3-CH₂—SiCyMe₂-Cp)HfMe₂; (Et₄Cp)(3-CH₂—SiCyMe₂-Cp)HfMe₂; (Et₅Cp)(3-CH₂—SiCyMe₂-Cp)HfMe₂; (Pr₂Cp)(3-CH₂—SiCyMe₂-Cp)HfMe₂; (Pr₃Cp)(3-CH₂—SiCyMe₂-Cp)HfMe₂; (Pr₄Cp)(3-CH₂—SiCyMe₂-Cp)HfMe₂; (Pr₅Cp)(3-CH₂—SiCyMe₂-Cp)HfMe₂; (Bu₂Cp)(3-CH₂—SiCyMe₂-Cp)HfMe₂; (Bu₃Cp)(3-CH₂—SiCyMe₂-Cp)HfMe₂; (Bu₄Cp)(3-CH₂—SiCyMe₂-Cp)HfMe₂; (Bu₅Cp)(3-CH₂—SiCyMe₂-Cp)HfMe₂; (Bz₂Cp)(3-CH₂—SiCyMe₂-Cp)HfMe₂; (Bz₃Cp)(3-CH₂—SiCyMe₂-Cp)HfMe₂; (Bz₄Cp)(3-CH₂—SiCyMe₂-Cp)HfMe₂; (Bz₅Cp)(3-CH₂—SiCyMe₂-Cp)HfMe₂; (EtMe₄Cp)(3-CH₂—SiCyMe₂-Cp)HfMe₂; (PrMe₄Cp)(3-CH₂—SiCyMe₂-Cp)HfMe₂; (BuMe₄Cp)(3-CH₂—SiCyMe₂-Cp)HfMe₂; (BzMe₄Cp)(3-CH₂—SiCyMe₂-Cp)HfMe₂; (Me₄Cp-CH₂—SiMe₃)(3-CH₂—SiCyMe₂-Cp)HfMe₂; (Me₄Cp-CH₂—SiCyMe₂Ph)(3-CH₂—SiCyMe₂-Cp)HfMe₂; (Me₄Cp-CH₂—SiMePh₂)(3-CH₂—SiCyMe₂-Cp)HfMe₂; (Me₄Cp-CH₂—SiPh₃)(3-CH₂—SiCyMe₂-Cp)HfMe₂; (Me₄Cp-CH₂—SiMe₂Cy)(3-CH₂—SiCyMe₂-Cp)HfMe₂; (Me₄Cp-CH₂—SiMeCy₂)(3-CH₂—SiCyMe₂-Cp)HfMe₂; (Me₄Cp-CH₂—SiCy₃)(3-CH₂—SiCyMe₂-Cp)HfMe₂; (EtMe₃Cp)(3-CH₂—SiCyMe₂-Cp)HfMe₂; (PrMe₃Cp)(3-CH₂—SiCyMe₂-Cp)HfMe₂; (BuMe₃Cp)(3-CH₂—SiCyMe₂-Cp)HfMe₂; (BzMe₃Cp)(3-CH₂—SiCyMe₂-Cp)HfMe₂; (Me₃Cp-CH₂—SiMe₃)(3-CH₂—SiCyMe₂-Cp)HfMe₂; (Me₃Cp-CH₂—SiMe₂Ph)(3-CH₂—SiCyMe₂-Cp)HfMe₂; (Me₃Cp-CH₂—SiMePh₂)(3-CH₂—SiCyMe₂-Cp)HfMe₂; (Me₃Cp-CH₂—SiPh₃)(3-CH₂—SiCyMe₂-Cp)HfMe₂; (Me₃Cp-CH₂—SiMe₂Cy)(3-CH₂—SiCyMe₂-Cp)HfMe₂; (Me₃Cp-CH₂—SiMeCy₂)(3-CH₂—SiCyMe₂-Cp)HfMe₂; (Me₃Cp-CH₂—SiCy₃)(3-CH₂—SiCyMe₂-Cp)HfMe₂; (MeEtCp)(3-CH₂—SiCyMe₂-Cp)HfMe₂; (MePrCp)(3-CH₂—SiCyMe₂-Cp)HfMe₂; (MeBuCp)(3-CH₂—SiCyMe₂-Cp)HfMe₂; (BzMeCp)(3-CH₂—SiCyMe₂-Cp)HfMe₂; (EtPrCp)(3-CH₂—SiCyMe₂-Cp)HfMe₂; (EtBuCp)(3-CH₂—SiCyMe₂-Cp)HfMe₂; (BzEtCp)(3-CH₂—SiCyMe₂-Cp)HfMe₂; (PrBuCp)(3-CH₂—SiCyMe₂-Cp)HfMe₂; (BzPrCp)(3-CH₂—SiCyMe₂-Cp)HfMe₂; (BuBzCp)(3-CH₂—SiCyMe₂-Cp)HfMe₂; (Cp)(3-CH₂—SiCy₂Me-Cp)HfMe₂; (MeCp)(3-CH₂—SiCy₂Me-Cp)HfMe₂; (EtCp)(3-CH₂—SiCy₂Me-Cp)HfMe₂; (PrCp)(3-CH₂—SiCy₂Me-Cp)HfMe₂; (BuCp)(3-CH₂—SiCy₂Me-Cp)HfMe₂; (BzCp)(3-CH₂—SiCy₂Me-Cp)HfMe₂; (3-CH₂—SiCy₂Me-Cp)₂HfMe₂; (Me₂Cp)(3-CH₂—SiCy₂Me-Cp)HfMe₂; (Me₃Cp)(3-CH₂—SiCy₂Me-Cp)HfMe₂; (Me₄Cp)(3-CH₂—SiCy₂Me-Cp)HfMe₂; (Me₅Cp)(3-CH₂—SiCy₂Me-Cp)HfMe₂; (Et₂Cp)(3-CH₂—SiCy₂Me-Cp)HfMe₂; (Et₃Cp)(3-CH₂—SiCy₂Me-Cp)HfMe₂; (Et₄Cp)(3-CH₂—SiCy₂Me-Cp)HfMe₂; (Et₅Cp)(3-CH₂—SiCy₂Me-Cp)HfMe₂; (Pr₂Cp)(3-CH₂—SiCy₂Me-Cp)HfMe₂; (Pr₃Cp)(3-CH₂—SiCy₂Me-Cp)HfMe₂; (Pr₄Cp)(3-CH₂—SiCy₂Me-Cp)HfMe₂; (Pr₅Cp)(3-CH₂—SiCy₂Me-Cp)HfMe₂; (Bu₂Cp)(3-CH₂—SiCy₂Me-Cp)HfMe₂; (Bu₃Cp)(3-CH₂—SiCy₂Me-Cp)HfCl₂; (Bu₄Cp)(3-CH₂—SiCy₂Me-Cp)HfCl₂; (Bu₅Cp)(3-CH₂—SiCy₂Me-Cp)HfCl₂; (Bz₂Cp)(3-CH₂—SiCy₂Me-Cp)HfMe₂; (Bz₃Cp)(3-CH₂—SiCy₂Me-Cp)HfMe₂; (Bz₄Cp)(3-CH₂—SiCy₂Me-Cp)HfCl₂; (Bz₅Cp)(3-CH₂—SiCy₂Me-Cp)HfCl₂; (EtMe₄Cp)(3-CH₂—SiCy₂Me-Cp)HfCl₂; (PrMe₄Cp)(3-CH₂—SiCy₂Me-Cp)HfMe₂; (BuMe₄Cp)(3-CH₂—SiCy₂Me-Cp)HfMe₂; (BzMe₄Cp)(3-CH₂—SiCy₂Me-Cp)HfMe₂; (Me₄Cp-CH₂—SiMe₃)(3-CH₂—SiCy₂Me-Cp)HfMe₂; (Me₄Cp-CH₂—SiMe₂Ph)(3-CH₂—SiCy₂Me-Cp)HfMe₂; (Me₄Cp-CH₂—SiMePh₂)(3-CH₂—SiCy₂Me-Cp)HfMe₂; (Me₄Cp-CH₂—SiPh₃)(3-CH₂—SiCy₂Me-Cp)HfMe₂; (Me₄Cp-CH₂—SiMe₂Cy)(3-CH₂—SiCy₂Me-Cp)HfMe₂; (Me₄Cp-CH₂—SiMeCy₂)(3-CH₂—SiCy₂Me-Cp)HfMe₂; (Me₄Cp-CH₂—SiCy₃)(3-CH₂-Cy₂Me-Cp)HfMe₂; (EtMe₃Cp)(3-CH₂—SiCy₂Me-Cp)HfMe₂; (PrMe₃Cp)(3-CH₂—SiCy₂Me-Cp)HfMe₂; (BuMe₃Cp)(3-CH₂—SiCy₂Me-Cp)HfMe₂; (BzMe₃Cp)(3-CH₂—SiCy₂Me-Cp)HfMe₂; (Me₃Cp-CH₂—SiMe₃)(3-CH₂—SiCy₂Me-Cp)HfMe₂; (Me₃Cp-CH₂—SiMe₂Ph)(3-CH₂—SiCy₂Me-Cp)HfMe₂; (Me₃Cp-CH₂—SiMePh₂)(3-CH₂—SiCy₂Me-Cp)HfMe₂; (Me₃Cp-CH₂—SiPh₃)(3-CH₂—SiCy₂Me-Cp)HfMe₂; (Me₃Cp-CH₂—SiMe₂Cy)(3-CH₂—SiCy₂Me-Cp)HfMe₂; (Me₃Cp-CH₂—SiMeCy₂)(3-CH₂—SiCy₂Me-Cp)HfMe₂; (Me₃Cp-CH₂—SiCy₃)(3-CH₂—SiCy₂Me-Cp)HfMe₂; (MeEtCp)(3-CH₂—SiCy₂Me-Cp)HfMe₂; (MePrCp)(3-CH₂—SiCy₂Me-Cp)HfMe₂; (MeBuCp)(3-CH₂—SiCy₂Me-Cp)HfMe₂; (BzMeCp)(3-CH₂—SiCy₂Me-Cp)HfMe₂; (EtPrCp)(3-CH₂—SiCy₂Me-Cp)HfMe₂; (EtBuCp)(3-CH₂—SiCy₂Me-Cp)HfMe₂; (BzEtCp)(3-CH₂—SiCy₂Me-Cp)HfMe₂; (PrBuCp)(3-CH₂—SiCy₂Me-Cp)HfMe₂; (BzPrCp)(3-CH₂—SiCy₂Me-Cp)HfMe₂; (BuBzCp)(3-CH₂—SiCy₂Me-Cp)HfMe₂; (Cp)(3-CH₂—SiCy₃-Cp)HfMe₂; (MeCp)(3-CH₂—SiCy₃-Cp)HfMe₂; (EtCp)(3-CH₂—SiCy₃-Cp)HfMe₂; (PrCp)(3-CH₂—SiCy₃-Cp)HfMe₂; (BuCp)(3-CH₂—SiCy₃-Cp)HfMe₂ (BzCp)(3-CH₂—SiCy₃-Cp)HfMe₂; (3-CH₂—SiCy₃-Cp)₂HfMe₂; (Me₂Cp)(3-CH₂—SiCy₃-Cp)HfMe₂; (Me₃Cp)(3-CH₂—SiCy₃-Cp)HfMe₂; (Me₄Cp)(3-CH₂—SiCy₃-Cp)HfMe₂; (Me₅Cp)(3-CH₂—SiCy₃-Cp)HfMe₂; (Et₂Cp)(3-CH₂—SiCy₃-Cp)HfMe₂; (Et₃Cp)(3-CH₂—SiCy₃-Cp)HfMe₂; (Et₄Cp)(3-CH₂—SiCy₃-Cp)HfMe₂; (Et₅Cp)(3-CH₂—SiCy₃-Cp)HfMe₂; (Pr₂Cp)(3-CH₂—SiCy₃-Cp)HfMe₂; (Pr₃Cp)(3-CH₂—SiCy₃-Cp)HfMe₂; (Pr₄Cp)(3-CH₂—SiCy₃-Cp)HfMe₂; (Pr₅Cp)(3-CH₂—SiCy₃-Cp)HfMe₂; (Bu₂Cp)(3-CH₂—SiCy₃-Cp)HfMe₂; (Bu₃Cp)(3-CH₂—SiCy₃-Cp)HfMe₂; (Bu₄Cp)(3-CH₂—SiCy₃-Cp)HfMe₂; (Bu₅Cp)(3-CH₂—SiCy₃-Cp)HfMe₂; (Bz₂Cp)(3-CH₂—SiCy₃-Cp)HfMe₂; (Bz₃Cp)(3-CH₂—SiCy₃-Cp)HfMe₂; (Bz₄Cp)(3-CH₂—SiCy₃-Cp)HfMe₂; (Bz₅Cp)(3-CH₂—SiCy₃-Cp)HfMe₂; (EtMe₄CP)(3-CH₂—SiCy₃-Cp)HfMe₂; (PrMe₄Cp)(3-CH₂—SiCy₃-Cp)HfMe₂; (BuMe₄Cp)(3-CH₂—SiCy₃-Cp)HfMe₂; (BzMe₄Cp)(3-CH₂—SiCy₃-Cp)HfMe₂; (Me₄Cp-CH₂—SiMe₃)(3-CH₂—SiCy₃-Cp)HfMe₂; (Me₄Cp-CH₂—SiMe₂Ph)(3-CH₂—SiCy₃-Cp)HfMe₂;

(Me₄Cp-CH₂—SiMePh₂)(3-CH₂—SiCy₃-Cp)HfMe₂; (Me₄Cp-CH₂—SiPh₃)(3-CH₂—SiCy₃-Cp)HfMe₂; (Me₄Cp-CH₂—SiMe₂Cy)(3-CH₂—SiCy₃-Cp)HfMe₂; (Me₄Cp-CH₂—SiMeCy₂)(3-CH₂—SiCy₃-Cp)HfMe₂; (Me₄Cp-CH₂—SiCy₃)(3-CH₂—SiCy₃-Cp)HfMe₂; (EtMe₃Cp)(3-CH₂—SiCy₃-Cp)HfMe₂; (PrMe₃Cp)(3-CH₂—SiCy₃-Cp)HfMe₂; (BuMe₃Cp)(3-CH₂—SiCy₃-Cp)HfMe₂; (BzMe₃Cp)(3-CH₂—SiCy₃-Cp)HfMe₂; (Me₃Cp-CH₂—SiMe₃)(3-CH₂—SiCy₃-Cp)HfMe₂; (Me₃Cp-CH₂—SiMe₂Ph)(3-CH₂—SiCy₃-Cp)HfMe₂; (Me₃Cp-CH₂—SiMePh₂)(3-CH₂—SiCy₃-Cp)HfMe₂; (Me₃Cp-CH₂—SiPh₃)(3-CH₂—SiCy₃-Cp)HfMe₂; (Me₃Cp-CH₂—SiMe₂Cy)(3-CH₂—SiCy₃-Cp)HfMe₂; (Me₃Cp-CH₂—SiMeCy₂)(3-CH₂—SiCy₃-Cp)HfMe₂; (Me₃Cp-CH₂—SiCy₃)(3-CH₂—SiCy₃-Cp)HfMe₂; (MeEtCp)(3-CH₂—SiCy₃-Cp)HfMe₂; (MePrCp)(3-CH₂—SiCy₃-Cp)HfMe₂; (MeBuCp)(3-CH₂—SiCy₃-Cp)HfMe₂; (BzMeCp)(3-CH₂—SiCy₃-Cp)HfMe₂; (EtBuCp)(3-CH₂—SiCy₃-Cp)HfMe₂; (BzEtCp)(3-CH₂—SiCy₃-Cp)HfMe₂; (PrBuCp)(3-CH₂—SiCy₃-Cp)HfMe₂; (BzPrCp)(3-CH₂—SiCy₃-Cp)HfMe₂; (BuBzCp)(3-CH₂—SiCy₃-Cp)HfMe₂; (2-Me,3-CH₂—SiMe₃-Ind)₂HfMe₂; (2-Et,3-CH₂—SiMe₃-Ind)₂HfMe₂; (2-Pr,3-CH₂—SiMe₃-Ind)₂HfMe₂; (2-Bu,3-CH₂—SiMe₃-Ind)₂HfMe₂; (2-Ph,3-CH₂—SiMe₃-Ind)₂HfMe₂; (2-Bz,3-CH₂—SiMe₃-Ind)₂HfMe₂; (2-Me,3-CH₂—SiMe₂Ph-Ind)₂HfMe₂; (2-Et,3-CH₂—SiMe₂Ph-Ind)₂HfMe₂; (2-Pr,3-CH₂—SiMe₂Ph-Ind)₂HfMe₂; (2-Bu,3-CH₂—SiMe₂Ph-Ind)₂ HfMe₂; (2-Ph,3-CH₂—SiMe₂Ph-Ind)₂HfMe₂; (2-Bz,3-CH₂—SiMe₂Ph-Ind)₂HfMe₂; (2-Me,3-CH₂—SiMePh₂-Ind)₂HfMe₂; (2-Et,3-CH₂—SiMePh₂-Ind)₂HfMe₂; (2-Pr,3-CH₂—SiMePh₂-Ind)₂HfMe₂; (2-Bu,3-CH₂—SiMePh₂-Ind)₂ HfMe₂; (2-Ph,3-CH₂—SiMePh₂-Ind)₂HfMe₂; (2-Bz,3-CH₂—SiMePh₂-Ind)₂HfMe₂; (2-Me,3-CH₂—SiPh₃-Ind)₂HfMe₂; (2-Et,3-CH₂—SiPh₃-Ind)₂HfMe₂; (2-Pr,3-CH₂—SiPh₃-Ind)₂HfMe₂; (2-Bu,3-CH₂—SiPh₃-Ind)₂HfMe₂; (2-Ph,3-CH₂—SiPh₃-Ind)₂HfMe₂; (2-Bz,3-CH₂—SiPh₃-Ind)₂HfMe₂; (2-Me,3-CH₂—SiCyMe₂-Ind)₂HfMe₂; (2-Et,3-CH₂—SiCyMe₂-Ind)₂HfMe₂; (2-Pr,3-CH₂—SiCyMe₂-Ind)₂HfMe₂; (2-Bu,3-CH₂—SiCyMe₂-Ind)₂HfMe₂; (2-Ph,3-CH₂—SiCyMe₂-Ind)₂HfMe₂; (2-Bz,3-CH₂—SiCyMe₂-Ind)₂HfMe₂; (2-Me,3-CH₂—SiCy₂Me-Ind)₂HfMe₂; (2-Et,3-CH₂—SiCy₂Me-Ind)₂HfMe₂; (2-Pr,3-CH₂—SiCy₂Me-Ind)₂HfMe₂; (2-Bu,3-CH₂—SiCy₂Me-Ind)₂HfMe₂; (2-Ph,3-CH₂—SiCy₂Me-Ind)₂HfMe₂; (2-Bz,3-CH₂—SiCy₂Me-Ind)₂HfMe₂; (2-Me,3-CH₂—SiCy₃-Ind)₂HfMe₂; (2-Et,3-CH₂—SiCy₃-Ind)₂HfMe₂; (2-Pr,3-CH₂—SiCy₃-Ind)₂HfMe₂; (2-Bu,3-CH₂—SiCy₃-Ind)₂HfMe₂; (2-Ph,3-CH₂—SiCy₃-Ind)₂HfMe₂; (2-Bz,3-CH₂—SiCy₃-Ind)₂HfMe₂; (2-Me,3-CH₂—SiMe₃-Ind)(3-CH₂—SiMe₃-Cp)HfMe₂; (2-Et,3-CH₂—SiMe₃-Ind)(3-CH₂—SiMe₃-Cp)HfMe₂; (2-Pr,3-CH₂—SiMe₃-Ind)(3-CH₂—SiMe₃-Cp)HfMe₂; (2-Bu,3-CH₂—SiMe₃-Ind)(3-CH₂—SiMe₃-Cp)HfMe₂; (2-Pn,3-CH₂—SiMe₃-Ind)(3-CH₂—SiMe₃-Cp)HfMe₂; (2-Hx,3-CH₂—SiMe₃-Ind)(3-CH₂—SiMe₃-Cp)HfMe₂; (2-Ph,3-CH₂—SiMe₃-Ind)(3-CH₂—SiMe₃-Cp)HfMe₂; (2-Me,3-CH₂—SiMe₂Ph-Ind)(3-CH₂—SiMe₃-Cp)HfMe₂; (2-Et,3-CH₂—SiMe₂Ph-Ind)(3-CH₂—SiMe₃-Cp)HfMe₂; (2-Pr,3-CH₂—SiMe₂Ph-Ind)(3-CH₂—SiMe₃-Cp)HfMe₂; (2-Bu,3-CH₂—SiMe₂Ph-Ind)(3-CH₂—SiMe₃-Cp)HfMe₂; (2-Pn,3-CH₂—SiMe₂Ph-Ind)(3-CH₂—SiMe₂Ph-Cp) HfMe₂; (2-Hx,3-CH₂—SiMe₂Ph-Ind)(3-CH₂—SiMe₃-Cp) HfMe₂; (2-Ph,3-CH₂—SiMe₂Ph-Ind)(3-CH₂—SiMe₃-Cp) HfMe₂; (2-Me,3-CH₂—SiMePh₂-Ind)(3-CH₂—SiMe₃-Cp) HfMe₂; (2-Et,3-CH₂—SiMePh₂-Ind)(3-CH₂—SiMe₃-Cp) HfMe₂; (2-Pr,3-CH₂—SiMePh₂-Ind)(3-CH₂—SiMe₃-Cp) HfMe₂; (2-Bu,3-CH₂—SiMePh₂-Ind)(3-CH₂—SiMe₃-Cp) HfMe₂; (2-Pn,3-CH₂—SiMePh₂-Ind)(3-CH₂—SiMe₂Ph-Cp)HfMe₂; (2-Hx,3-CH₂—SiMePh₂-Ind)(3-CH₂—SiMe₃-Cp)HfMe₂; (2-Ph,3-CH₂—SiMePh₂-Ind)(3-CH₂—SiMe₃-Cp)HfMe₂; (2-Me,3-CH₂—SiPh₃-Ind)(3-CH₂—SiMe₃-Cp) HfMe₂; (2-Et,3-CH₂—SiPh₃-Ind)(3-CH₂—SiMe₃-Cp) HfMe₂; (2-Pr,3-CH₂—SiPh₃-Ind)(3-CH₂—SiMe₃-Cp) HfMe₂; (2-Bu,3-CH₂—SiPh₃-Ind)(3-CH₂—SiMe₃-Cp) HfMe₂; (2-Pn,3-CH₂—SiPh₃-Ind)(3-CH₂—SiMe₂Ph-Cp) HfMe₂; (2-Hx,3-CH₂—SiPh₃-Ind)(3-CH₂—SiMe₃-Cp) HfMe₂; (2-Ph,3-CH₂—SiPh₃-Ind)(3-CH₂—SiMe₃-Cp) HfMe₂; (2-Me,3-CH₂—SiCyMe₂-Ind)(3-CH₂—SiMe₃-Cp) HfMe₂; (2-Et,3-CH₂—SiCyMe₂-Ind)(3-CH₂—SiMe₃-Cp) HfMe₂; (2-Pr,3-CH₂—SiCyMe₂-Ind)(3-CH₂—SiMe₃-Cp) HfMe₂; (2-Bu,3-CH₂—SiCyMe₂-Ind)(3-CH₂—SiMe₃-Cp) HfMe₂; (2-Pn,3-CH₂—SiCyMe₂-Ind)(3-CH₂—SiMe₂Ph-Cp)HfMe₂; (2-Hx,3-CH₂—SiCyMe₂-Ind)(3-CH₂—SiMe₃-Cp)HfMe₂; (2-Ph,3-CH₂—SiCyMe₂-Ind)(3-CH₂—SiMe₃-Cp)HfMe₂, and the alkyl or halide versions thereof where the Me₂ is replaced with Bz₂, Et₂, Ph₂, Cl₂, Br₂, or I₂.

17. A process for polymerization of olefin monomers comprising contacting one or more olefin monomers with the supported catalyst system of claim 1.

18. The process of claim 17, wherein polymerization of the olefin monomers forms linear low density polyethylene.

19. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with the supported catalyst of claim 1 in at least one gas phase reactor at a reactor pressure of from 0.7 to 70 bar and a reactor temperature of from 20° C. to 150° C. to form an ethylene alpha-olefin copolymer.

20. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with the supported catalyst of claim 1 in at least one slurry phase reactor at a reactor pressure of from 0.7 to 70 bar and a reactor temperature of from 60° C. to 130° C. to form an ethylene alpha-olefin copolymer.

21. An ethylene alpha-olefin copolymer obtained by contacting ethylene, at least one $C_3$-$C_{20}$ alpha-olefin, and the supported catalyst of claim 1 in at least one gas-phase reactor, the copolymer having a density of 0.890 g/cc or more, a melt index from 0.1 to 80 g/10 min, and an Mw/Mn value from 1 to 15.

22. The ethylene alpha-olefin copolymer of claim 21, wherein the copolymer has a density from 0.900 to 0.940 g/cc.

23. The ethylene alpha-olefin copolymer of claim 21, wherein the copolymer has an Mz/Mw between 2 and 3.

24. The ethylene alpha-olefin copolymer of claim 21, wherein the copolymer has an Mw value of 50,000 to 250,000 g/mol; an Mw/Mn value of 2.5 to 12.5; a density of from 0.900 to 0.940 g/cc; and an Mz/Mw between 2 and 3.

25. An ethylene alpha-olefin copolymer obtained by contacting ethylene, at least one $C_3$-$C_{20}$ alpha-olefin, and the supported catalyst of claim 1 in at least one slurry phase reactor, the copolymer having a density of 0.890 g/cc or more, a melt flow index from 0.1 g/10 min to 80 g/10 min, and a Mw/Mn from 2.5 to 12.5.

26. An ethylene alpha-olefin copolymer obtained by contacting ethylene, at least one $C_3$-$C_{20}$ alpha-olefin, and the supported catalyst of claim 1 in at least one gas phase reactor, the copolymer having a density of 0.890 g/cc or more, a melt flow index from 0.1 g/10 min to 80 g/10 min, and a Mw/Mn from 2.5 to 12.5, and a RCI,m between 100 and 200 and a CDR-2 m between 1.5 and 2.5.

27. An ethylene alpha-olefin copolymer obtained by contacting ethylene, at least one $C_3$-$C_{20}$ alpha-olefin, and the supported catalyst of claim 1 in at least one gas phase reactor, the copolymer having a density of 0.890 g/cc or more, a melt flow index from 0.1 g/10 min to 80 g/10 min, a Mw/Mn of from 2.0 to 5.0, a Mz/Mw between 2 and 3, a RCI,m between 30 and 100, and a CDR-2 m between 1 and 2.

* * * * *